US008656048B2

(12) United States Patent
Payne et al.

(10) Patent No.: US 8,656,048 B2
(45) Date of Patent: *Feb. 18, 2014

(54) SYSTEM AND METHOD FOR TRANSMISSION OF DATA

(71) Applicant: SimpleAir, Inc., Plano, TX (US)

(72) Inventors: John M. Payne, Newport Beach, CA (US); Tim Von Kaenel, Coto de Casa, CA (US); Jeffrey Wang, Horsham, PA (US); Jeffrey Odell, Newport Beach, CA (US); David Starr, New York, NY (US); Jason Katz, New York, NY (US)

(73) Assignee: SimpleAir, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,393

(22) Filed: May 30, 2013

(65) Prior Publication Data

US 2013/0282872 A1    Oct. 24, 2013

Related U.S. Application Data

(63) Continuation of application No. 11/409,396, filed on Apr. 21, 2006, now Pat. No. 8,489,707, which is a continuation of application No. 09/350,467, filed on Jul. 9, 1999, now Pat. No. 7,035,914, which is a continuation of application No. 08/788,613, filed on Jan. 24, 1997, now Pat. No. 6,021,433.

(60) Provisional application No. 60/040,651, filed on Jan. 26, 1996, provisional application No. 60/014,341, filed on Mar. 29, 1996, provisional application No. 60/014,735, filed on Apr. 1, 1996, provisional application No. 60/026,471, filed on Sep. 23, 1996.

(51) Int. Cl.
G06F 15/16    (2006.01)
G08B 5/22    (2006.01)

(52) U.S. Cl.
USPC .......................................... 709/236; 340/7.29

(58) Field of Classification Search
USPC .......................................... 709/236; 340/7.29
See application file for complete search history.

(56) References Cited

U.S. PATENT DOCUMENTS 4,388,645 A    6/1983    Cox et al.
4,473,824 A    9/1984    Claytor (Continued)

FOREIGN PATENT DOCUMENTS

EP    0503813    9/1992
EP    0514360 A2    11/1992

(Continued)

OTHER PUBLICATIONS

Civil Action No. 2:09-CV-289-CE,Defendants Apple Inc., Facebook, Inc., American Broadcasting,Companies, Inc., AWS Convergence Technologies, Inc., Disney,Online, ESPN Enterpris.

(Continued)

Primary Examiner — Larry Donaghue
(74) Attorney, Agent, or Firm — SoCal IP Law Group LLP; Steven C. Sereboff; Jonathan Pearce

(57) ABSTRACT

A system and method for data communication connecting on-line networks with on-line and off-line computers. The present system provides for broadcast of up to the minute notification centric information thereby providing an instant call to action for users who are provided with the ability to instantaneously retrieve further detailed information. The notification centric portions of information is wirelessly broadcast to wireless receiving devices which are attached to computing devices. Upon receipt of the information at the personal computer, the user is notified through different multimedia alerts that there is an incoming message. Wirelessly broadcasted URL's, associated with the data, are embedded in data packets and provide an automated wired or wireless connection back to the information source for obtaining detailed data.

30 Claims, 30 Drawing Sheets

(56) References Cited

U.S. PATENT DOCUMENTS

| | | |
|---|---|---|
| 4,525,779 A | 6/1985 | Davids et al. |
| 4,531,184 A | 7/1985 | Wigan et al. |
| 4,554,418 A | 11/1985 | Toy |
| 4,642,425 A | 2/1987 | Guinn, Jr. et al. |
| 4,644,351 A | 2/1987 | Zabarsky et al. |
| 4,829,558 A | 5/1989 | Welsh |
| 4,845,491 A | 7/1989 | Fascenda et al. |
| 4,951,039 A | 8/1990 | Schwendeman |
| RE33,417 E | 10/1990 | Bhagat et al. |
| 5,014,125 A | 5/1991 | Pocock et al. |
| 5,043,721 A | 8/1991 | May |
| 5,045,850 A | 9/1991 | Andros et al. |
| 5,090,051 A | 2/1992 | Muppidi et al. |
| 5,117,449 A | 5/1992 | Metroka et al. |
| 5,138,653 A | 8/1992 | Le Clercq |
| 5,140,419 A | 8/1992 | Galumbeck et al. |
| 5,151,929 A | 9/1992 | Wolf |
| 5,175,758 A | 12/1992 | Levanto et al. |
| 5,245,656 A | 9/1993 | Loeb et al. |
| 5,247,347 A | 9/1993 | Litteral et al. |
| 5,263,195 A | 11/1993 | Panther et al. |
| 5,281,962 A | 1/1994 | Vanden Heuvel et al. |
| 5,289,497 A | 2/1994 | Jacobson et al. |
| 5,307,399 A | 4/1994 | Dai et al. |
| 5,311,570 A | 5/1994 | Grimes et al. |
| 5,327,486 A | 7/1994 | Wolff et al. |
| 5,327,558 A | 7/1994 | Burke et al. |
| 5,335,276 A | 8/1994 | Thompson et al. |
| 5,337,044 A | 8/1994 | Folger et al. |
| 5,392,452 A | 2/1995 | Davis et al. |
| 5,396,537 A | 3/1995 | Schwendeman |
| 5,398,280 A | 3/1995 | MacConnell |
| 5,410,343 A | 4/1995 | Coddington et al. |
| 5,414,750 A | 5/1995 | Bhagat et al. |
| 5,416,473 A | 5/1995 | Dulaney, III et al. |
| 5,418,908 A | 5/1995 | Keller et al. |
| 5,423,086 A | 6/1995 | Cannon et al. |
| 5,426,422 A | 6/1995 | Vanden Heuvel et al. |
| 5,436,900 A | 7/1995 | Hammar et al. |
| 5,438,611 A | 8/1995 | Campana, Jr. et al. |
| 5,442,652 A | 8/1995 | Jacobson |
| 5,465,401 A | 11/1995 | Thompson |
| 5,487,100 A | 1/1996 | Kane |
| 5,493,692 A | 2/1996 | Theimer et al. |
| 5,506,902 A | 4/1996 | Kubota |
| 5,509,000 A | 4/1996 | Oberlander |
| 5,512,935 A | 4/1996 | Majeti et al. |
| 5,519,506 A | 5/1996 | D'Avello et al. |
| 5,541,976 A | 7/1996 | Ghisler |
| 5,548,814 A | 8/1996 | Lorang et al. |
| 5,555,241 A | 9/1996 | Lazaridis et al. |
| 5,555,446 A | 9/1996 | Jasinski |
| 5,559,800 A | 9/1996 | Mousseau et al. |
| 5,559,859 A | 9/1996 | Dai et al. |
| 5,559,860 A | 9/1996 | Mizikovsky |
| 5,559,862 A | 9/1996 | Bhagat et al. |
| 5,561,703 A | 10/1996 | Arledge et al. |
| 5,570,084 A | 10/1996 | Ritter et al. |
| 5,576,952 A | 11/1996 | Stutman et al. |
| 5,581,594 A | 12/1996 | McAfee |
| 5,588,009 A | 12/1996 | Will |
| 5,600,573 A | 2/1997 | Hendricks et al. |
| 5,608,786 A | 3/1997 | Gordon |
| 5,623,589 A | 4/1997 | Needham et al. |
| 5,625,670 A | 4/1997 | Campana, Jr. et al. |
| 5,631,946 A | 5/1997 | Campana, Jr. et al. |
| 5,649,186 A | 7/1997 | Ferguson |
| 5,652,789 A | 7/1997 | Miner et al. |
| 5,657,345 A | 8/1997 | Lazaridis |
| 5,663,717 A | 9/1997 | DeLuca |
| 5,673,299 A | 9/1997 | Fuller et al. |
| 5,675,507 A | 10/1997 | Bobo, II |
| 5,680,615 A | 10/1997 | Marlin et al. |
| 5,689,641 A | 11/1997 | Ludwig et al. |
| 5,694,546 A | 12/1997 | Reisman |
| 5,699,053 A | 12/1997 | Jonsson |
| 5,701,302 A | 12/1997 | Geiger |
| 5,701,580 A | 12/1997 | Yamane et al. |
| 5,706,211 A | 1/1998 | Beletic et al. |
| 5,714,943 A | 2/1998 | Rasor |
| 5,717,725 A | 2/1998 | Campana, Jr. |
| 5,732,074 A | 3/1998 | Spaur et al. |
| 5,732,338 A | 3/1998 | Schwob |
| 5,737,595 A | 4/1998 | Cohen et al. |
| 5,740,549 A | 4/1998 | Reilly et al. |
| 5,742,668 A | 4/1998 | Pepe et al. |
| 5,742,905 A | 4/1998 | Pepe et al. |
| 5,742,906 A | 4/1998 | Foladare et al. |
| 5,752,191 A | 5/1998 | Fuller et al. |
| 5,754,939 A | 5/1998 | Herz et al. |
| 5,758,088 A | 5/1998 | Bezaire et al. |
| 5,761,006 A | 6/1998 | Sri-Jayantha et al. |
| 5,761,606 A | 6/1998 | Wolzien |
| 5,761,662 A | 6/1998 | Dasan |
| 5,768,509 A | 6/1998 | Gunluk |
| 5,781,614 A | 7/1998 | Brunson |
| 5,784,608 A | 7/1998 | Meske, Jr. et al. |
| 5,790,958 A | 8/1998 | McCoy et al. |
| 5,802,312 A | 9/1998 | Lazaridis et al. |
| 5,808,566 A | 9/1998 | Behr et al. |
| 5,809,128 A | 9/1998 | McMullin |
| 5,809,415 A | 9/1998 | Rossmann |
| 5,819,172 A | 10/1998 | Campana, Jr. et al. |
| 5,862,325 A | 1/1999 | Reed et al. |
| 5,870,680 A | 2/1999 | Guerlin et al. |
| 5,903,262 A | 5/1999 | Ichihashi et al. |
| 5,905,777 A | 5/1999 | Foladare et al. |
| 5,905,865 A | 5/1999 | Palmer et al. |
| 5,905,944 A | 5/1999 | Goldman et al. |
| 5,907,793 A | 5/1999 | Reams |
| 5,907,811 A | 5/1999 | Foladare et al. |
| 5,909,651 A | 6/1999 | Chander et al. |
| 5,913,040 A | 6/1999 | Rakavy et al. |
| 5,933,478 A | 8/1999 | Ozaki et al. |
| 5,946,322 A | 8/1999 | Moura et al. |
| 5,954,793 A | 9/1999 | Stutman et al. |
| 5,956,521 A | 9/1999 | Wang |
| 5,978,837 A | 11/1999 | Foladare et al. |
| 5,987,321 A | 11/1999 | Miyake |
| 5,987,432 A | 11/1999 | Zusman et al. |
| 6,021,433 A | 2/2000 | Payne et al. |
| 6,035,104 A | 3/2000 | Zahariev |
| 6,047,327 A | 4/2000 | Tso et al. |
| 6,049,291 A | 4/2000 | Kikinis |
| 6,065,047 A | 5/2000 | Carpenter et al. |
| 6,065,048 A | 5/2000 | Higley |
| 6,067,082 A | 5/2000 | Enmei |
| 6,067,451 A | 5/2000 | Campana, Jr. et al. |
| 6,104,912 A | 8/2000 | Fuller et al. |
| 6,108,704 A | 8/2000 | Hutton et al. |
| 6,167,426 A | 12/2000 | Payne et al. |
| 6,243,398 B1 | 6/2001 | Kahane et al. |
| 6,278,862 B1 | 8/2001 | Henderson |
| 6,289,337 B1 | 9/2001 | Davies et al. |
| 6,317,592 B1 | 11/2001 | Campana, Jr. et al. |
| 6,343,115 B1 | 1/2002 | Foladare et al. |
| 6,411,684 B1 | 6/2002 | Cohn et al. |
| 6,430,607 B1 | 8/2002 | Kavner |
| 6,473,609 B1 | 10/2002 | Schwartz et al. |
| 6,571,296 B1 | 5/2003 | Dillon |
| 6,711,158 B1 | 3/2004 | Kahane et al. |
| 6,807,588 B2 | 10/2004 | Hoang et al. |
| 6,870,523 B1 | 3/2005 | Ben-David et al. |
| 7,035,914 B1 | 4/2006 | Payne et al. |
| 7,113,152 B1 | 9/2006 | Ben-David et al. |
| 7,145,898 B1 | 12/2006 | Elliott |
| 7,268,757 B2 | 9/2007 | Ben-David et al. |
| 7,417,799 B2 | 8/2008 | Roth |
| 7,471,822 B2 | 12/2008 | Roth et al. |
| 7,483,871 B2 | 1/2009 | Herz |
| 7,577,745 B2 | 8/2009 | Mason et al. |
| 2003/0167300 A1 | 9/2003 | Ullman et al. |

(56) References Cited

U.S. PATENT DOCUMENTS

FOREIGN PATENT DOCUMENTS

| | | |
|---|---|---|
| EP | 0733983 | 9/1996 |
| EP | 0798899 A1 | 10/1997 |
| EP | 0897632 B1 | 2/1999 |
| EP | 0872128 B1 | 1/2005 |
| EP | 0212761 | 8/2007 |
| JP | 5-503619 | 6/1993 |
| JP | 4944 | 6/1993 |
| JP | 5-505285 | 8/1993 |
| WO | 9214330 | 8/1992 |
| WO | 9323930 | 11/1993 |
| WO | 9415431 | 7/1994 |
| WO | 9420916 | 9/1994 |
| WO | 9526113 | 9/1995 |
| WO | 9609714 | 3/1996 |
| WO | 9611542 | 4/1996 |
| WO | 9619068 | 6/1996 |
| WO | 9636142 | 11/1996 |
| WO | 9710558 | 3/1997 |
| WO | 9717682 | 5/1997 |
| WO | 9728518 | 8/1997 |
| WO | 9734410 | 9/1997 |
| WO | 9749251 | 12/1997 |
| WO | 9800787 | 1/1998 |
| WO | 9818237 | 4/1998 |

OTHER PUBLICATIONS

Exhibit 2C: U.S. Patent No. 5,905,865 (Palmer), issued on May 18, 1999, Claim Chart.
Exhibit 2D: U.S. Patent No. 5,905,865 (Palmer), issued on May 18, 1999, Claim Chart.
Exhibit 3A: European Patent No. EP 0872128 B1 (Winbladh), Claim Chart.
Exhibit 3B: European Patent Spec. 0872128 B1 (Winbladh), Claim Chart.
Exhibit 8A: U.S. Patent No. 6,278,862 (Henderson), issued Aug. 21, 2001, Claim Chart.
Exhibit 8B: U.S. Patent No. 6,278,862 (Henderson), Issued Aug. 21, 2001, Claim Chart.
Exhibit 13A: United States Patent No. 5,043,721 (May)1, issued on Aug. 27, 1991, Claim Chart.
Exhibit 13B: U.S. Patent No. 5,043,721 (May), issued on Aug. 27, 1991, Claim Chart.
Exhibit 13C: United States Patent No. 5,043,721 (May), issued on Aug. 27, 1991, Claim Chart.
Exhibit 13D: U.S. Patent No. 5,043,721 (May), issued on Aug. 27, 1991, Claim Chart.
Exhibit 14A: U.S. Patent No. 5,588,009 (Will), issued on Dec. 24, 1996, Claim Chart.
Exhibit 14B: U.S. Patent No. 5,588,009 (Will), issued on Dec. 24, 1996, Claim Chart.
Exhibit 17A: U.S. Patent No. 6,343,115 (Foladare), issued on Jan. 29, 2002, Claim Chart.
Exhibit 17B: U.S. Patent No. 6,343,115 (Foladare), issued on Jan. 29, 2002, Claim Chart.
Exhibit 18A: U.S. Patent No. 5,327,486 (Wolff), issued on Jul. 5, 1994, Claim Chart.
Exhibit 18B: U.S. Patent No. 5,327,486 (Wolff), issued on Jul. 5, 1994, Claim Chart.
Exhibit 18C: U.S. Patent No. 5,327,486 (Wolff), issued on Jul. 5, 1994, Claim Chart.
Exhibit 18D: U.S. Patent No. 5,327,486 (Wolff), issued on Jul. 5, 1994, Claim Chart.
Exhibit 19A: U.S. Patent No. 5,140,419 (Galumbeck, et al.), issued Aug. 18, 1992, Claim Chart.
Exhibit 19B: U.S. Patent No. 5,140,419 (Galumbeck, et al.), issued Aug. 18, 1992, Claim Chart.
Exhibit 19C: U.S. Patent No. 5,140,419 (Galumbeck, et al.), issued Aug. 18, 1992, Claim Chart.
Exhibit 19D: U.S. Patent No. 5,140,419 (Galumbeck et al.), issued Aug. 18, 1992, Claim Chart.
Exhibit 20A: US Patent No. 5,761,662 (Dasan issued on Jun. 2, 1998), Claim Chart.
Exhibit 20B: US Patent No. 5,761,662 (Dasan issued on Jun. 2, 1998), Claim Chart.
Exhibit 21A: U PCT Patent Application No. WO97/17682 (Laflin et al.), issued May 15, 1997, Claim Chart.
Exhibit 21B: PCT Patent Application No. WO97/17682 (Laflin, et al.), Published May 15, 1997, Claim Chart.
Exhibit 22A: U.S. Patent No. 5,737,595 (Cohen), § 102(e) date Jul. 18, 1995, PCT publication Jun. 9, 1994, Claim Chart.
Exhibit 22B: U.S. Patent No. 5,737,595 (Cohen), § 102(e) date Jul. 18, 1995, PCT publication Jun. 9, 1994, Claim Chart.
Exhibit 23A: US Patent No. 5,701,580 (Yamane et al.), issued on Dec. 23, 1997 (filed on Dec. 1, 1995), Claim Chart.
Exhibit 23B: US Patent No. 5,701,580 (Yamane et al.), issued on Dec. 23, 1997 (filed on Dec. 1, 1995), Claim Chart.
Exhibit 24A: US Patent No. 5,418,908 (Keller et al.), issued on May 23, 1995 (filed on Oct. 15, 1992), Claim Chart.
Exhibit 24B: US Patent No. 5,418,908 (Keller et al.), issued on May 23, 1995 (filed on Oct. 15, 1992), Claim Chart.
Exhibit 25A: US Patent No. 5,426,422 (Vanden Heuvel et al)1, issued on Jul. 20, 1995, Claim Chart.
Exhibit 25B: US Patent No. 5,426,422 (Vanden Heuvel et al)1, issued on Jul. 20, 1995, Claim Chart.
Exhibit 29A: United States Patent No. 6,047,327 (Tso)1, issued on Apr. 4, 2000, Claim Chart.
Exhibit 29B: United States Patent No. 6,047,327 (Tso)1, issued on Apr. 4, 2000, Claim Chart.
Exhibit 30A: U.S. Patent No. 5,907,793 (Reams), issued May 25, 1999, Claim Chart.
Exhibit 30B: U.S. Patent No. 5,907,793 (Reams), issued May 25, 1999, Claim Chart.
Exhibit 31A: US Patent No. 5,909,651 (Chander et al.), issued on Jun. 1, 1999, Claim Chart.
Exhibit 31B: US Patent No. 5,909,651 (Chander et al.), issued on Jun. 1, 1999, Claim Chart.
Exhibit 32A: U.S. Patent No. 5,954,793 (Strutman et al.), issued Sep. 21, 1999, Claim Chart.
Exhibit 32B: U.S. Patent No. 5,954,793 (Stutman, et al.), Issued Sep. 21, 1999, Claim Chart.
Exhibit 32C: U.S. Patent No. 5,954,793 (Stutman et al.), issued Sep. 21, 1999, Claim Chart.
Exhibit 32D: U.S. Patent No. 5,954,793 (Stutman, Miller), issued Sep. 21, 1999, Claim Chart.
Exhibit 33A: U.S. Patent No. 5,754,939 (Herz), issued on May 19, 1998, Claim Chart.
Exhibit 33B: U.S. Patent No. 5,754,939 (Herz), issued on May 19, 1998, Claim Chart.
Exhibit 34A: US Patent No. 7,483,871 (Herz), issued on Jan. 27, 2009 (claims priority to application filed Nov. 29, 1994), Claim Chart.
Exhibit 34B: US Patent No. 7,483,871 (Herz), issued on Jan. 27, 2009 (claims priority to application filed Nov. 29, 1994), Claim Chart.
Exhibit 35A: U.S. Patent No. 5,555,446 (Jasinski), earliest effective filed Oct. 1, 1992, issued Sep. 10, 1996, Claim Chart.
Exhibit 35B: U.S. Patent No. 5,555,446 (Jasinski), earliest effective filed Oct. 1, 1992, issued Sep. 10, 1996, Claim Chart.
Exhibit 36A: U.S. Patent No. EP0212761 (Sharpe), issued on Mar. 4, 1987, Claim Chart.
Exhibit 36B: U.S. Patent No. EP0212761 (Sharpe), issued on Mar. 4, 1987, Claim Chart.
Exhibit 37A: U.S. Patent No. 5,398,280 (MacConnell), issued Mar. 14, 1995, Claim Chart.
Exhibit 37B: U.S. Patent No. 5,398,280 (MacConnell), issued Mar. 14, 1995, Claim Chart.
Exhibit 38A: European Patent Application EPO 0514360 (Ghisler), issued Nov. 19, 1992, Claim Chart.
Exhibit 38B: European Patent Application EPO 0514360 (Ghisler), issued Nov. 19, 1992, Claim Chart.
Exhibit 39A: U.S. Patent No. 5,575,507 (Bobo), published on Oct. 7, 1997, Claim Chart.

(56) References Cited

OTHER PUBLICATIONS

Exhibit 39B: U.S. Patent No. 5,575,507 (Bobo), published on Oct. 7, 1997, Claim Chart.
Exhibit 40A: PCT Patent Application No. WO 94/20916 (Strutman et al.), issued Sep. 15, 1994, Claim Chart.
Exhibit 40B: PCT Patent Application No. WO 94/20916 (Strutman et al.), issued Sep. 15, 1994, Claim Chart.
Exhibit 40C: PCT Patent Application No. WO 94/20916 (Strutman et al.), issued Sep. 15, 1994, Claim Chart.
Exhibit 40D: PCT Patent Application No. WO 94/20916 (Strutman et al.), issued Sep. 15, 1994, Claim Chart.
Exhibit 41A: U.S. Patent No. 6,108,704 (Hutton, et al.), issued Aug. 22, 2000, Claim Chart.
Exhibit 41B: U.S. Patent No. 6,108,704 (Hutton, et al.), issued Aug. 22, 2000, Claim Chart.
Exhibit 42A: U.S. Patent No. 4,829,558 (Welsh), issued May 9, 1989, Claim Chart.
Exhibit 42B: U.S. Patent No. 4,829,558 (Welsh), issued May 9, 1989, Claim Chart.
Exhibit 43A: Published EP Application 0 503 813 A2 (Miska), published Sep. 16, 1992, Claim Chart.
Exhibit 43B: Published EP Application 0 503 813 A2 (Miska), published Sep. 16, 1992, Claim Chart.
Exhibit 43C: U.S. Patent No. EP0503,813 (Miska, Willcock), issued Sep. 16, 1992, Claim Chart.
Exhibit 43D: U.S. Patent No. EPO503,813 (Miska, Willcock), issued Sep. 16, 1992, Claim Chart.
Exhibit 44A: U.S. Patent No. 5,761,606 (Wolzien), issued Jun. 2, 1998.
Exhibit 44B: U.S. Patent No. 5,761,606 (Wolzien), issued Jun. 2, 1998, Claim Chart.
Claim Chart.Exhibit 45A: US Patent No. 5,307,399 (Dai), issued on Apr. 26, 1994.
Exhibit 45B: US Patent No. 5,307,399 (Dai), issued on Apr. 26, 1994, Claim Chart.
Exhibit 46A: U.S. Patent No. 5,978,837 (Foladare), issued Nov. 2, 1999, Claim Chart.
Exhibit 46B: U.S. Patent No. 5,978,837 (Foladare, et al.), issued Nov. 2, 1999, Claim Chart.
Exhibit 47A: US Patent No. 6,104,912 (Fuller), issued on Aug. 15, 2000, Claim Chart.
Exhibit 47B: US Patent No. 6,104,912 (Fuller), issued on Aug. 15, 2000, Claim Chart.
Exhibit 48A: US Patent No. 5,752,191 (Fuller), issued on May. 12, 1998, Claim Chart.
Exhibit 48B: US Patent No. 5,752,191 (Fuller), issued on May. 12, 1998, Claim Chart.
Exhibit 49A: US Patent No. 5,608,786 (Gordon), issued on Mar. 4, 1997 (filed on Feb. 13, 1995, claiming priority to Canadian application 2139081 filed Dec. 23, 1994, Claim Cha.
Exhibit 49B: US Patent No. 5,608,786 (Gordon), issued on Mar. 4, 1997 (filed on Feb. 13, 1995, claiming priority to Canadian application 2139081 filed Dec. 23, 1994), Claim Ch.
Exhibit 50A: US Patent No. 4,642,425 (Guinn), issued on Feb. 10, 1987, Claim Chart.
Exhibit 50B: US Patent No. 4,642,425 (Guinn), issued on Feb. 10, 1987, Claim Chart.
Exhibit 51A: International Patent Application Publication No. WO 93/23930 (Vanden Heuvel, Halley), issued Nov. 25, 1993, Claim Chart.
Exhibit 51B: International Patent Application Publication No. WO 93/23930 (Vanden Heuvel, Halley), issued Nov. 25, 1993, Claim Chart.
Exhibit 53A: WO 95/26113 (Hays), published on Sep. 28, 1995, Claim Chart.
Exhibit 53B: WO 95/26113 (Hays), published on Sep. 28, 1995, Claim Chart.
Exhibit 54A: US Patent No. 5,809,128 (McMullin), issued on Sep. 15, 1998, Claim Chart.
Exhibit 54B: US Patent No. 5,809,128 (McMullin), issued on Sep. 15, 1998, Claim Chart.
Exhibit 55A: US Patent No. 5,652,789 (Miner), issued on Jul. 29, 1997, Claim Chart.
Exhibit 55B: US Patent No. 5,652,789 (Miner), issued on Jul. 29, 1997, Claim Chart.
Exhibit 56A: US Patent No. 5,151,929 (Wolf), issued on Sep. 29, 1992, Claim Chart.
Exhibit 56B: US Patent No. 5,151,929 (Wolf), issued on Sep. 29, 1992, Claim Chart.
Exhibit 58A: PCT Patent Application WO 96/36142 (Bezaire et al.), issued Nov. 14, 1996, Claim Chart.
Exhibit 58B: PCT Patent Application WO 96/36142 (Bezaire et al.), issued Nov. 14, 1996, Claim Chart.
Exhibit 58C: PCT Patent Application WO 96/36142 (Bezaire et al.), issued Nov. 14, 1996, Claim Chart.
Exhibit 58D: PCT Patent Application WO 96/36142 (Bezaire et al.), issued Nov. 14, 1996, Claim Chart.
Exhibit 59A:S. Shekhar and D. Liu, Genesis and Advanced Traveler Information Systems (ATIS): Killer Applications for Mobile Computing?, published Nov. 1994, Claim Chart.
Exhibit 59B: S. Shekhar and D. Liu, Genesis and Advanced Traveler Information Systems (ATIS): Killer Applications for Mobile Computing?, published Nov. 1994, Claim Chart.
Exhibit 61A: News On-Demand for Multimedia Networks, publication date Aug. 1993, Claim Chart.
Exhibit 61B: News On-Demand for Multimedia Networks, publication date Aug. 1993, Claim Chart.
Exhibit 62A: U.S. Patent No. 4,473,824 (Claytor), published on Sep. 25, 1984, Claim Chart.
Exhibit 62B: U.S. Patent No. 4,473,824 (Claytor), published on Sep. 25, 1984, Claim Chart.
Exhibit 63A: U.S. Patent No. 6,411,684 (Cohn), published on Jun. 25, 2002, Claim Chart.
Exhibit 63B: U.S. Patent No. 6,411,684 (Cohn), published on Jun. 25, 2002, Claim Chart.
Exhibit 64A: RIM Freedom PCS Network Adapter for Mobitex: Installation & User's Guide, Claim Chart.
Exhibit 64B: RIM Freedom PCS Network Adapter for Mobitex: Installation & User's Guide, Claim Chart.
Exhibit 65A: US Patent No. 5,245,656 (Loeb et al.), issued on Sep. 14, 1993, Claim Chart.
Exhibit 65B: US Patent No. 5,245,656 (Loeb et al.), issued on Sep. 14, 1993, Claim Chart.
Exhibit 66A: US Patent No. 5,781,614 (Brunson), issued on Jul. 14, 1998 (filed on Jan. 19, 1996), Claim Chart.
Exhibit 66B: US Patent No. 5,781,614 (Brunson), issued on Jul. 14, 1998 (filed on Jan. 19, 1996), Claim Chart.
Exhibit 67A: US Patent No. 5,327,558 (Burke et al.), issued on Jul. 5, 1994, Claim Chart.
Exhibit 67B: US Patent No. 5,327,558 (Burke et al.), issued on Jul. 5, 1994, Claim Chart.
Exhibit 68A: US Patent No. 5,465,401 (Thompson), issued on Nov. 7, 1995 (filed on Dec. 15, 1992), Claim Chart.
Exhibit 68B: US Patent No. 5,465,401 (Thompson), issued on Nov. 7, 1995 (filed on Dec. 15, 1992), Claim Chart.
Exhibit 69A: US Patent No. 6,430,607 (Kavner), issued on Aug. 6, 2002 (divisional of application filed on Aug. 18, 1995), Claim Chart.
Exhibit 69B: US Patent No. 6,430,607 (Kavner), issued on Aug. 6, 2002 (divisional of application filed on Aug. 18, 1995), Claim Chart.
Exhibit 70A: RIM User's Handbook for Wireless Computing, Jun. 1993 ("Handbook for Wireless Computing"), Claim Chart.
Exhibit 70B: RIM User's Handbook for Wireless Computing, Jun. 1993 ("Handbook for Wireless Computing"), Claim Chart.
Exhibit 71A: RIM Mobitex Made Easy: A Guide to Wireless Computing (1994), Claim Chart.
Exhibit 71B: RIM Mobitex Made Easy: A Guide to Wireless Computing (1994), Claim Chart.
Exhibit 75A: U.S. Patent No. 7,577,745 (Mason et al.), issued Aug. 18, 2009, Claim Chart.
Exhibit 75B: U.S. Patent No. 7,577,745 (Mason et al.), issued Aug. 18, 2009, Claim Chart.

(56) References Cited

OTHER PUBLICATIONS

Exhibit 83A: The AirMedia Live! System: Air Media Jan. 29, 1996 Press Release, Claim Chart.
Exhibit 83B: The AirMedia Live! System: Air Media Jan. 29, 1996 Press Release, Claim Chart.
Exhibit 84A: The AirMedia Live! System: Air Media Jun. 3, 1996 The AirMedia Live! System, Claim Chart.
Exhibit 84B: The AirMedia Live! System: Air Media Jun. 3, 1996 The AirMedia Live! System, Claim Chart.
Exhibit 86A: U.S. Patent No. 5,410,343 (Coddington, et al.), issued Apr. 25, 1995, Claim Chart.
Exhibit 86B: U.S. Patent No. 5,410,343 (Coddington, et al.), issued Apr. 25, 1995, Claim Chart.
Exhibit 88A: The AirMobile System: AirMobile Wireless Comm Client for cc:Mail User Guide, Claim Chart.
Exhibit 88B: The AirMobile System: AirMobile Wireless Comm Client for cc:Mail User Guide, Claim Chart.
Exhibit 90A: The SkyTel System: SkyTel Feb. 1996 Article and SkyTel MailScout Product Description Exemplar Teachings, Claim Chart.
Exhibit 90B: The SkyTel System: SkyTel Feb. 1996 Article and SkyTel MailScout Product Description Exemplar Teachings, Claim Chart.
Exhibit 92A: The SkyTel System: "SkyTel Turns on 2-Way" Article Exemplar Teachings, Claim Chart.
Exhibit 92B: The SkyTel System: "SkyTel Turns on 2-Way" Article Exemplar Teachings, Claim Chart.
Exhibit 95A: U.S. Patent No. 5,600,573 (Hendricks et al.), filed Dec. 2, 1994, issued Feb. 4, 1997, Claim Chart.
Exhibit 95B: U.S. Patent No. 5,600,573 (Hendricks et al.), filed Dec. 2, 1994, issued Feb. 4, 1997, Claim Chart.
Exhibit 96A: U.S. Patent No. 4,644,351 (Zabarsky, et al.), issued Feb. 17, 1987, Claim Chart.
Exhibit 96B: U.S. Patent No. 4,644,351 (Zabarsky, et al.), issued Feb. 17, 1987, Claim Chart.
Exhibit 96C: U.S. Patent No. 4,644,351 (Zabarsky, et al.), issued Feb. 17, 1987, Claim Chart.
Exhibit 96D: U.S. Patent No. 4,644,351 (Zabarsky, et al.), issued Feb. 17, 1987, Claim Chart.
Exhibit 97A: U.S. Patent No. 5,311,570 (Grimes), issued May 10, 1994, Claim Chart.
Exhibit 97B: U.S. Patent No. 5,311,570 (Grimes), issued May 10, 1994, Claim Chart.
Exhibit 98A: U.S. Patent No. 4,531,184 (Wigan), issued Jul. 23, 1985, Claim Chart.
Exhibit 98B: U.S. Patent No. 4,531,184 (Wigan), issued Jul. 23, 1985, Claim Chart.
Exhibit 99A: United States Patent No. 5,913,040 (Rakavy), issued Jun. 15, 1999, Claim Chart.
Exhibit 99B: United States Patent No. 5,913,040 (Rakavy), issued Jun. 15, 1999, Claim Chart.
Exhibit 100A: U.S. Patent No. 5,289,497 (Jacobson), issued Feb. 22, 1994, Claim Chart.
Exhibit 100B: U.S. Patent No. 5,289,497 (Jacobson), issued Feb. 22, 1994, Claim Chart.
Exhibit 101A: U.S. Patent No. 5,090,051 (Muppidi), issued Feb. 18, 1992, Claim Chart.
Exhibit 101B: U.S. Patent No. 5,090,051 (Muppidi), issued Feb. 18, 1992, Claim Chart.
Exhibit 102A: U.S. Patent No. 5,175,7581 (Levanto), issued Dec. 29, 1992, Claim Chart.
Exhibit 102B: U.S. Patent No. 5,175,7581 (Levanto), issued Dec. 29, 1992, Claim Chart.
Exhibit 103A: US Patent No. 5,247,347 (Litteral), issued on Sep. 21, 1993, Claim Chart.
Exhibit 103B: US Patent No. 5,247,347 (Litteral), issued on Sep. 21, 1993, Claim Chart.
Exhibit 104A: US Patent No. 5,689,641 (Ludwig), issued on Nov. 18, 1997, Claim Chart.
Exhibit 104B: US Patent No. 5,689,641 (Ludwig), issued on Nov. 18, 1997, Claim Chart.
Exhibit 105A: US Patent No. 5,045,850 (Andros et al.), issued on Sep. 3, 1991, Claim Chart.
Exhibit 105B: US Patent No. 5,045,850 (Andros et al.), issued on Sep. 3, 1991, Claim Chart.
Exhibit 106A: US Patent No. 6,243,398 (Kahane), issued on Jun. 5, 2001, Claim Chart.
Exhibit 106B: US Patent No. 6,243,398 (Kahane), issued on Jun. 5, 2001, Claim Chart.
Exhibit 108A: U.S. Patent No. Re 33,417 (Bhagat, Hays), issued Oct. 30, 1990, Claim Chart.
Exhibit 108B: U.S. Patent No. RE 33,417 (Bhagat, Hays), issued Oct. 30, 1990, Claim Chart.
Exhibit 109A: U.S. Patent No. 5,699,053 (Jonsson), issued Dec. 16, 1997, Claim Chart.
Exhibit 109B: U.S. Patent No. 5,699,053 (Jonsson), issued Dec. 16, 1997, Claim Chart.
Exhibit 110A: U.S. Patent No. 5,559,859 (Dai, et al.), issued Sep. 24, 1996, Claim Chart.
Exhibit 110B: U.S. Patent No. 5,559,859 (Dai, et al.), issued Sep. 24, 1996, Claim Chart.
Exhibit 111A: U.S. Patent No. 6,571,296 (Dillon), issued May 27, 2003, Claim Chart.
Exhibit 111B: U.S. Patent No. 6,571,296 (Dillon), issued May 27, 2003, Claim Chart.
Exhibit 112A: U.S. Patent No. 5,423,086 (Cannon, et al.), issued Jun. 6, 1995, Claim Chart.
Exhibit 112B: U.S. Patent No. 5,423,086 (Cannon, et al.), issued Jun. 6, 1995, Claim Chart.
Exhibit 113A: U.S. Patent No. 5,392,452 (Davis), issued Feb. 21, 1995, Claim Chart.
Exhibit 113B: U.S. Patent No. 5,392,452 (Davis), issued Feb. 21, 1995, Claim Chart.
Exhibit 114A: U.S. Patent No. 5,663,717 (DeLuca), issued Sep. 2, 1997, Claim Chart.
Exhibit 114B: U.S. Patent No. 5,663,717 (DeLuca), issued Sep. 2, 1997, Claim Chart.
Exhibit 115A: U.S. Patent No. 5,548,814 (Lorang, Lindquist), issued Aug. 20, 1996, Claim Chart.
Exhibit 115B: U.S. Patent No. 5,548,814 (Lorang, Lindquist), issued Aug. 20, 1996, Claim Chart.
Exhibit 115C: U.S. Patent No. 5,548,814 (Lorang, Lindquist), issued Aug. 20, 1996, Claim Chart.
Exhibit 115D: U.S. Patent No. 5,548,814 (Lorang, Lindquist), issued Aug. 20, 1996, Claim Chart.
Exhibit 116A: U.S. Patent No. 5,414,750 (Bhagat, et al.), issued May 9, 1995, Claim Chart.
Exhibit 116B: U.S. Patent No. 5,414,750 (Bhagat, et al.), issued May 9, 1995, Claim Chart.
Exhibit 116C: U.S. Patent No. 5,414,750 (Bhagat, et al.), issued May 9, 1995, Claim Chart.
Exhibit 116D: U.S. Patent No. 5,414,750 (Bhagat, et al.), issued May 9, 1995, Claim Chart.
Exhibit 117A: U.S. Patent No. 5,559,862 (Bhagat, et al.), issued Sep. 24, 1996, Claim Chart.
Exhibit 117B: U.S. Patent No. 5,559,862 (Bhagat, et al.), issued Sep. 24, 1996, Claim Chart.
Exhibit 118A: U.S. Patent No. 4,554,418 (Toy), issued Nov. 19, 1985, Claim Chart.
Exhibit 118B: U.S. Patent No. 4,554,418 (Toy), issued Nov. 19, 1985, Claim Chart.
Exhibit 119A: U.S. Patent No. 5,493,692 (Theimer, et al.), issued Feb. 20, 1996, Claim Chart.
Exhibit 119B: U.S. Patent No. 5,493,692 (Theimer, et al.), issued Feb. 20, 1996, Claim Chart.
Exhibit 119C: U.S. Patent No. 5,493,692 (Theimer, et al.), issued Feb. 20, 1996, Claim Chart.
Exhibit 119D: U.S. Patent No. 5,493,692 (Theimer, et al.), issued Feb. 20, 1996, Claim Chart.
Exhibit 120A: U.S. Patent No. 5,946,322 (Moura et al.), issued Aug. 31, 1999, Claim Chart.

(56) References Cited

OTHER PUBLICATIONS

Exhibit 120B: U.S. Patent No. 5,946,322 (Moura et al.), issued Aug. 31, 1999, Claim Chart.
Exhibit 120C: U.S. Patent No. 5,946,322 (Moura et al.), issued Aug. 31, 1999, Claim Chart.
Exhibit 120D: U.S. Patent No. 5,946,322 (Moura et al.), issued Aug. 31, 1999, Claim Chart.
Exhibit 121A: U.S. Patent No. 5,570,084 (Ritter, et al.), issued Oct. 29, 1996, Claim Chart.
Exhibit 121B: U.S. Patent No. 5,570,084 (Ritter, et al.), issued Oct. 29, 1996, Claim Chart.
Exhibit 122A: U.S. Patent No. 5,396,537 (Schwendeman), issued Mar. 7, 1995, Claim Chart.
Exhibit 122B: U.S. Patent No. 5,396,537 (Schwendeman), issued Mar. 7, 1995, Claim Chart.
Exhibit 122C: U.S. Patent No. 5,396,537 (Schwendeman), issued Mar. 7, 1995, Claim Chart.
Exhibit 122D: U.S. Patent No. 5,396,537 (Schwendeman), issued Mar. 7, 1995, Claim Chart.
Exhibit 123A: U.S. Patent No. 4,525,779 (Davids), issued on Jun. 25, 1985, Claim Chart.
Exhibit 123B: U.S. Patent No. 4,525,779 (Davids), issued on Jun. 25, 1985, Claim Chart.
Exhibit 124A: U.S. Patent No. 5,862,325 (Reed, et al.), issued Jan. 19, 1999, Claim Chart.
Exhibit 124B: U.S. Patent No. 5,862,325 (Reed, et al.), issued Jan. 19, 1999, Claim Chart.
Exhibit 124C: U.S. Patent No. 5,862,325 (Reed, et al.), issued Jan. 19, 1999, Claim Chart.
Exhibit 124D: U.S. Patent No. 5,862,325 (Reed, et al.), issued Jan. 19, 1999, Claim Chart.
Exhibit 125A: U.S. Patent No. 5,673,299 (Fuller et al.), issued Sep. 30, 1997, Claim Chart.
Exhibit 125B: U.S. Patent No. 5,673,299 (Fuller et al.), issued Sep. 30, 1997, Claim Chart.
Exhibit 126A U.S. Patent No. 5,541,976 (Ghisler), issued Jul. 30, 1996, Claim Chart.
Exhibit 126B U.S. Patent No. 5,541,976 (Ghisler), issued Jul. 30, 1996, Claim Chart.
Exhibit 127C: U.S. Patent No. 5,742,905 (Pepe), issued on Apr. 21, 1998, Claim Chart.
Exhibit 127D: U.S. Patent No. 5,742,905 (Pepe), issued on Apr. 21, 1998, Claim Chart.
Civil Action No. 2:09-CV-289-CE, Defendants Research in Motion Corporation and Research in Motion Limited's P.R. 3-3 Invalidity Contentions.
U.S. District Court of Texas; SimpleAir Holdings, Inc. Defendants Responsive Claim Construction Brief, p. 1-36, Jul. 31, 2008.
U.S. District Court of Texas; SimpleAir Holdings, Inc. Defendants Motion for Summary Judgement, p. 1-23, Jul. 31, 2008.
Exhibit 8; Modern Dictionary of Electornics, Seventh Edition, p. 1-7, Jul. 17, 2008.
Exhibit 7; Webster's New World Computer Dictionary, Tenth Edition, p. 1-8, Jul. 17, 2008.
Exhibit 6; The American Heritage Dictionary . . . Fourth Edition, p. 1-8, Jul. 17, 2008.
Exhibit 5; Random House Webster's Dictionary, Fourth Edition, p. 1-6, Jul. 17, 2008.
Exhibit 4; Webster's Third New International Dictionary, Unbridged, p. 1-6, Jul. 7, 2008.
Exhibit 3; Published PCT Application WO 97/27546, p. 1-101, Jul. 17, 2008.
Exhibit 2; Applicant Response to Office action, p. 1-6, Jul. 17, 2008.
Exhibit 1; U.S. Patent 6,735,614, p. 1-12, Jul. 17, 2008.
Exhibit 10; Newton's Telecom Dictionary, 12th Edition, p. 1-10, Jul. 17, 2008.
Exhibit 9; Microsoft Dictionary Eith Edition, p. 1-7, Jluy 17, 2008.
Exhibit A; Document 83-2, p. 1-17, Jun. 13, 2008.
U.S. District Court of Texas; SimpleAir Holfings, Inc., V M-Qube, Inc., et al., p. 1-2, Jun. 11, 2008.
U.S. District Court of Texas; SimpleAir Holfings, Inc., V M-Qube, Inc., et al., Defendant MySpace, Inc.'s Amended Answer, p. 1-16, Jun. 9, 2008.
U.S. District Court of Texas; SimpleAir Holfings, Inc., V M-Qube, Inc., et al., Defendant Yahoo! Inc.'s, Inc.'s Amended Answer, p. 1-16, Jun. 9, 2008.
Exhibit 2; U.S. District Court Eastern District of Texas; SimpleAir Holding, Inc., V M-Qube, Inc., et al., Docket Control Order, p. 2-5, Nov. 15, 2007.
Exhibit 1; U.S. District Court Eastern District of Texas; SimpleAir Holding, Inc., V M-Qube, Inc., et al., Discovery Order, p. 2-8, Nov. 15, 2007.
Exhibit B; Defendants' Proposed Constructions and References, p. 1-7, Jun. 13, 2008.
U.S. District Court Eastern District of Texas; SimpleAir Holding, Inc., V M-Qube, Inc., et al.; Plaintiff and Counterdefendant . . . Document 41, p. 1-4, Feb. 20, 2007.
U.S. District Court Eastern District of Texas; SimpleAir Holding, Inc., V M-Qube, Inc., et al.; Plaintiff and Counterdefendant . . . Document 40, p. 1-4, Feb. 20, 2007.
U.S. District Court Eastern District of Texas; SimpleAir Holding, Inc., V M-Qube, Inc., et al.; Plaintiff and Counterdefendant . . . Document 39, p. 1-4, Feb. 20, 2007.
U.S. District Court Eastern District of Texas; SimpleAir Holding, Inc., V M-Qube, Inc., et al.; Plaintiff and Counterdefendant . . . Document 34, p. 1-6, Feb. 5, 2007.
U.S. District Court Eastern District of Texas; SimpleAir Holding, Inc., V M-Qube, Inc., et al.; Plaintiff and Counterdefendant . . . Document 33, p. 1-6, Feb. 5, 2007.
U.S. District Court Eastern District of Texas; SimpleAir Holding, Inc., V M-Qube, Inc., et al., Defendent Yahoo! inc.'s Answer . . . Document 27, p. 1-9, Jan. 31, 2007.
U.S. District Court Eastern District of Texas; SimpleAir Holding, Inc., V M-Qube, Inc., et al.; Defendant MySpace inc.'s Answer . . . Document 25, p. 1-9, Jan. 31, 2007.
U.S. District Court Eastern District of Texas; SimpleAir Holding, Inc., V M-Qube, Inc., et al.; Defendant Ebay inc.'s Answer . . . Document 23, p. 1-9, Jan. 31, 2007.
U.S. District Court Eastern District of Texas; SimpleAir Holding, Inc., V M-Qube, Inc., et al.; Defendant M-Qube, Inc.s Answer . . . Document 19, p. 1-11, Jan. 16, 2007.
U.S. District Court Eastern District of Texas; SimpleAir Holding, Inc., MySpace, Inc. Responses to SimpleAir Holdings, Inc., Second Set of Interogatories . . . , p. 1-3.
U.S. District Court Eastern District of Texas; SimpleAir Holding,Inc., V M-Qube, Inc., et al., Complaint for Patent Infringement . . . Document 1, p. 1-6, Exhibit A; Oct. 26, 2006.
U.S. District Court Eastern District of Texas; SimpleAir Holding, Inc., V M-Qube, Inc., et al.; Defendant CBS Broadcasting Inc.'s Answer . . . Document 18,Jan. 16, 2007.
U.S. District Court Eastern District of Texas; SimpleAir Holding, Inc., V M-Qube, Inc., et al.; Joint Claim Construction and PreHearing Statement; Document 83, Jun. 13, 2008.
U.S. District Court Eastern District of Texas; SimpleAir Holding, Inc., V M-Qube, Inc., et al.; Plaintiff SimpleAir's Claim Construction Brief, Document 88, 34 pages, Jul. 17, 2008.
Kramer, Matt, AirNote offers all-in-one solution for paging needs, PCWeek Then National Newspaper of Corporate Computing, Oct. 3, 1994, vol. 11, No. 93.95, p. 85.
Unknown, AirNote ships with software to filter and forward e-mail messages to text pager . . . , Business Wire, Inc., Aug. 15, 1994, pp. 1-3.
Wireless Services Corporation, AirNote Wireless E-Mail, pp. 1-76, Copyright 1995-8 Wireless Services, Corporation.
Corporate News, SkyTel Launches New Service for Email, Voice Mail and Faxes, Corporate News, Aug. 11, 1999, pp. 1-3.
Anderson, Mark, By the iBook, orporate News, Commentary special to ABSNEWS.com.
Corporate News, XYPOINT Corp. and Wireless Service Corp. Announce Partnership to Link, Corporate News, Jul. 12, 1999, pp. 1-2.

(56) References Cited

OTHER PUBLICATIONS

Corporate News, Wireless Services Announces Nextel Delivered More Than One Million Wireless Internet Messages in February, Corporate News, Apr. 27, 1999, pp. 1-2.
Corporate News, Wireless Services Delivers Over Nine Million Data Messages in 1998, Corporate News, Feb. 8, 1999, pp. 1-2.
Corporate News, Land Mobile Radio News, Oct. 23, 1998.
Corporate News, Wireless Services Offers GotSports Personalized Sports Information Serivce Via Pagers, PCS Phones and Email, Corporate News, Oct. 21, 1998, pp. 1-2.
Corporate News,Nextel Announces On-Line Paging Serice Provided by Wireless Services, Corporate News, Aug. 12, 1998, pp. 1-2.
Albright, Peggy, Wireless Services Offers E-mail, Corporate News, Aug. 3, 1998, pp. 1-2.
Jones, Jeanne L., Keep Data Coming, Corporate News, Jun. 19, 1998, pp. 1-2.
Corporate News, Telescan Launchs Telescan Direct Wireless Service for Market Quotes and News, Corporate News, Oct. 14, 1997.
Corporate News, With @Stream, Receiving E-mail on the Road Now As Easy As Picking up the Phone, Corporate News, Oct. 6, 1997, pp. 1-2.
The News Tribune Tacoma, Billions Riding onThin Air / Seattle Has Become the Center of an Exponentially Expanding . . . , Corporate News, Oct. 15, 1997, pp. 1-4.
Wireless Services Corporation, AirNote Signup—User Information, pp. 1-4., Wireless Services, Corporation.
Wireless Services Corporation, AirNote Wireless E-Mail, pp. 1-9, Wireless Services, Corporation.
Macworld, Apple Mobile Message System, Macworld, Sep. 1995, vol. 12, No. 9, p. 74.
PR Newswire Association, inc., Apple Mobile Message System Makes it Easy to Receive Wireless Messages in the Road, Financial News, Jan. 3, 1995, pp. 1-3.
Business Wire, Inc., Apple Mobile System will Incorporate Ex Machina's Notify! and Update! Software, Business Wire, Inc., Jan. 3, 1995, pp. 1-2.
Apple, Inc., Apple Mobile Messaging System: Description (Jul. 1995), http://docs.info.apple.com/article/html?artnum=17014&coll=ap ; accessed Jul. 6, 1995.
Post-News Week Business Information, Inc., Apple Offers Wireless Mobile Message System.
PR Newswire Association, Inc., Apple Outlines Plethora of Newton Wireless Communications Solutions at MessagePad 120 Launch, Financial News, Jan. 30, 1995, pp. 1-4.
Unknown, Apple Wireless-Messaging Bundle Targets PowerBooks, PCWeek, Dec. 26, 1994/Jan. 2, 1995, vol. 11, No. 51, pp. 45 and 47.
M2 Communications Ltd., AU-System Radio, M2 Communications Ltd., Oct. 11, 1995, pp. 1-2.
Crain Communications, Inc., Business Brief, Crain Communications, Inc., Mar. 13, 1995.
Windows, CompuServe Navigator, Windows User Giude, Dec. 1994, pp. 1-33.
Unknown, CompuServe Teams with Socket to Deliver Wireless E-Mail,News Release, Nov. 14, 1995, pp. 1-2.
CompuServe, Information Manager for Windows, User's Guide, CompuServe, Feb. 1995, 179 pages.
CompuServe, Information Service, User's Guide, CompuServe, May 1995, 37 pages.
Wellington Newspapers Limited, Sep. 25, 1995.
Information Access Company, a Thompson Corporation Company, Editor's Picks 1995; 61 Hottest Prodicts for 1995; Cover Story; Directory, Jan. 1995, pp. 1-12.
Rooney, Paula, Ex Machina's Update Completes Wireless Circle, PCWeek, The National Newspaper of Corporate Computing; May 17, 1993, vol. 10, No. 19, 3 pp.
Betheney, Herb, Ex Machina's Update Eases Wireless data Transfer, PCWeek, The National Newspaper of Corporate Computing; Mar. 14, 1993, vol. 10, No. 10, 3 pages.

Dias, et al., Extending the Reach of the Internet Through Paging, INET'95, Annual Meeting of the Internet Society, Honolullu, Hawaii, Jun. 27-30, 1995, 6 pages.
Wexier, Joane, First PCS Offerings Arrive from SkyTel, NetworkWorld, vol. 12, No. 38, Sep. 18, 1995, 3 pages.
Monroy, Jesus, Jr., FYI: Wireless Data, WCO Issue # 21, Nov. 1994, http://www.markshapiro.com/issue21.p13-p22.html.
Socket Wireless Messaging Services, Getting Started with SWiMS, Socket Wireless Messaging Services, how to Activate your SWiMS Account, Sep. 1995, 15 pages.
Gibbs, Mark, Hot LAN Tools, Network World, Inc., Sep. 12, 1994, pp. 1-4.
Hewlett Packard, HP 100LX User's Guide, Hewlett Packard, 1993, 106 pages.
Hewlett Packard, HP 200LX User's Guide, Hewlett Packard, 1994, 122 pages.
Lefkowitz, Larry, How to Get Battery-Powerd Portable Modems to Work With the HP 95LX, The HP Plamtop Paper, Jan./Feb. 1993, 5 pages.
Unknown, Modems that Work with the HP 95LX, The HP Plamtop Paper, Jan./Feb. 1993, 5 pages.
Dickens, Ted, CompuServe Opens New HP Handhelds Forum, The HP Plamtop Paper, Jul./Aug. 1992, 3 pages.
Lefkowitz, Larry, Accessing Compuserve with the HP 95LX, The HP Plamtop Paper, Mar./Apr. 1992, 6 pages.
Shaddock, Rick, EMBARC Messaging Services, The HP Plamtop Paper, Mar./Apr. 1993, 3 pages.
Dickens, Ted, Getting Help for Your HP Plamtop on CompuServe, The HP Plamtop Paper, Nov./Dec. 1992,pp. 47-50.
Shaddock, Rick, SkyStream Wireless Receiver, The HP Plamtop Paper, Nov./Dec. 1992,pp. 20-24.
Nutter, Ronald, The HP Plamtop as Tech Support Tool, The HP Plamtop Paper, Nov./Dec. 1993,pp. 32-34.
Hall, et al., Third Party Prodicts of Interest to HP Plamtop Users, The HP Plamtop Paper, Nov./Dec. 1993,pp. 6-13.
Arancio, Alex, Access CompuServe with acCIS, The HP Plamtop Paper, Nov./Dec. 1994,vol. 3, No. 6, pp. 27-28 and 32.
Scardina, Mark, CIS: CompuServe Information Service, The HP Plamtop Paper, Nov./Dec. 1994,vol. 3, No. 6, pp. 23-26.
Chernow, Bob, Crusing the Internet with the HP Plamtop, The HP Plamtop Paper, Nov./Dec. 1994,vol. 3, No. 6, pp. 16-20.
Roberts, Victor, The HP Plamtop: The Ideal Portable Terminal with Versatile PIMs, The HP Plamtop Paper, Nov./Dec. 1994,vol. 3, No. 6, pp. 36-39.
Goldstein, Hal, RAM Cards and RAM Card Drives, The HP Plamtop Paper, Jan./Feb. 1992 pp. 16-17.
Unknown, Lotus Ships Lotus Notes pp. Gateway for SkyTel, Lotus Press Release, Feb. 8, 1994, pp. 1-3.
Mobile Telecommunication Technologies Corporation, Securities and Exchange Commission, Form 10-K, Apr. 3, 1995, 113 pages.
Goldstein, Hal, News From HP: The HP 95LX and the Motorola Newsstream Receiver, 1991, pp. 1-5.
Paul, et al., Newton Gets New Network Links, NetWorld, The NewsWeekly of Enterprise Network Corporations; Aug. 12, 1993, 2 pages.
Business Wire, Inc., Notable Technologies Brings Wireless Communications to the World Wide Web, Business Wire, Inc., Feb. 21, 1995, 2 pages.
Krohn, Novell Outlines NetWare Future, PC Week, Oct. 19, 1992, vol. 9, No. 42, 3 pages.
Farbar, Apple's PowerPC Success Hinges on Apps Delivery, PC Week, Mar. 15, 1993, vol. 10, No. 10, 2 pages.
Kramer, Matt, Wireless Comm Begins Fulfilling Promise, First Looks, PC Week, Mar. 15, 1993, vol. 10, No. 10, pp. 91-94 and 101-102.
Unknown, Notify!: The Mac Pager, MacUser, Apr. 1992, p. 49.
Unknown, TidBITS # 103, TidBITS, Jan. 27, 1992, 10 pages.
Emigh, Jacqueline, PageCard to Double as PCMCIA Card / Standalone Pager, LookSmart, Dec. 21, 1993, http://findarticles.com/p/articles/mi_1993_Dec_21/ai_15052712/print.
Socket Communications, PageCard Wireless Messaging System: Users Guide for Manual Operation, Socket Communications; Maual, Feb. 1995, 30 pages.

(56) References Cited

OTHER PUBLICATIONS

Unknown, MacWeek, vol. 9, No. 36, Sep. 11, 1995, p. 1, 3-4 and 55-57.
Andrews, Dean, Video Conferencing Product Trims Phone Costs, PC World, May 1995, p. 110.
Socket Wireless Messaging Services, Getting Started with SWiMS, How to Activate Your SWiMS Account, Sepetmber 1995, 15 pages.
Sony, Magic Link, PIC-1000, Sony, Jun. 1994, 8 pages.
SkyTel, Go Wireless, SkyTel, Brochure, 1994, 6 pages.
AT&T, Smart Messaging, Instant Information, Electronic Shopping and More, AT&T, PersonaLink Services, Jun. 1994, 36 pages.
Stahl, Stephanie, Creating 'Virtual' Call Centers, InformationWeek for Business and Technology Managers, Sep. 5, 1994, 4 pages.
Beam, Miles, A Summary of Data Broadcasting Technologies and Potential Applications in Today's Market, RDS/RBDS, Milestone Technologies, Inc., last modified on Aug. 23, 1995.
Storm, David, AirNote, AirNote Technologies, Inc., 1994, 6 pages, http://storm.com/pubwork/cw51294.html.
Business Wire, Inc., SkyTel Announces SkyCard, Business Wire, Inc., Sep. 19, 1994, 3 pages.
PR Newswire Association, Inc., SkyTel Corporation to Offer and Display Motorola NewsCard, PR Newswire Association, inc., Oct. 20, 1992.
SkyTel Communications, Inc., Form 10-K, SkyTel Communications, Inc., Apr. 1, 1996, 6 pages.
Socket Communications, The Office, Mobile Professionals Need Connections, Socket Communications, 1996, 8 pages.
Socket Communications, PageCard Wireless Messaging System, Socket Communications, 1996, 2 pages.
Unknown, Socket Enhances Wireless Messaging Services, Press Release, Socket Communications, Sep. 13, 1995, 2 pages.
ProQuest, Socket introdices PageCard Wireless Messaging System for Apple PowerBooks and MessagePads, Oct. 11, 1995, 2 pages.
Stephens, Sara G., Socket to You Anywhere, Anytime, Windows Magazine, Aug. 1995, pp. 1-3 and 176.
Case, Howard, Socket Releases Wireless E-Mail Forwarding Software for Microsoft Mail, Socket Communications, Oct. 4, 1995, 2 pages.
Socket Communications, SWiMS Socket Wireless Massaging Services User's Guide, Socket Communications, Sep. 1995, 44 pages.
ProQuest, TekNow Announces Messaging Software Bundle with Socket Communications, Business Wire, Mar. 22, 1995, pp. 1-2.
Information Access Company, Text Paper Offers Travellers an Easy Way to Touch Base, Aug. 29, 1994.
The Internet Informer, The Internet Informer, Oct. 1994, 51 pages, http://www.textfiles.com/magazines/ONESHOTS/october.txt.
DeRose, James F., The Wireless Data Handbook, Third Edition, Apr. 1996, pp. 277-289.
Unknown, Mac III: The Next Generation, MacWeek, vol. 7, No. 6, Feb. 8, 1993, 2 pages.
Unknown, SkyTel and CompuServer Team to Provide Wireless Messaging Services in Countries Worldwide, Business Wire, Inc., May 1, 1995, pp. 3 and 4.
Que Corporation, Using CompuServe, Get the Most From CompuServe's Services and Resources!, Second Edition, 1994, 90 pages.
Socket Communications, Using the PageCard with your Apple Power Book, Sep. 1995, 27 pages.
Socket Communications, Using the PageCard with Your Newton MessagePad, Sep. 1995, 21 pages.
PR Newswire Association, Inc., Wireless data Services Announced for Portable Computers; New Spftware From SkyTel, Ex Machina to Update Mobile ApplicationsFeb. 2, 1993.
Miastkowski, Stan, Omnifax G5: Five Peripherals in a Compact Package, PC World, Aug. 1994, 2 pages.
T. Berners-Lee et al., Uniform Resource Locators, Network Working Group, University of Minnesota Editors, Dec. 1994, 25 pages.
Gareiss, Robin, A Value-Added Service with Brains, Data Communications, Jan. 1995, pp. 66, 68 and 70.
Wayner, Peter, Agent-Enhanced Communicator, BYTE, The Magazine of Technology Integration, Feb. 1995, 4 pages.
Silver, Gail, AT&T Introduces AT&T PersonaLink(SM) Services, ProQuest, Business Wire, NewYork, Sep. 28, 1994, Section 1, p. 1-3.
Unknown, Roaming with Data, IEEE Colloquium, Mar. 6, 1995, 6 pages.
Farber, David, Interesting-People Message, First Reactions—The Sony Magic Link, Oct. 9, 1994, pp. 1-2, http://www.interesting-people.org/archives/.
Lellimo, Albert, Jr., The Next Generation, Network World, Mar. 13, 1995, vol. 12, No. 11, pp. 63-66.
Messmer et al.,PDAs to Spin Magic, Network World, Jan. 10, 1994, vol. 11, No. 2, 2 pages.
Fisher, Lawrence M., Personal Digital Assistant, part III, The New York Times, Sep. 28, 1994, 4 pages.
Rodrigues, Karen, PersonaLink Aims to Put PDAs On-Line, InfoWorld, AT&T PersonaLink On-Line Services, Oct. 3, 1994, 16, 40; ABI/Inform Golbal, p. 43.
Hogan, Mike, Prime Time for PDAs-Finally, Home Office Computing, Jun. 1995, 6 pages.
Sony,PIC-1000 Personal Intelligent Communicator Peripherals, Sony, Magic Link, 1994, 8 pages.
O'Mahony, Jennifer, SkyTel Announces Availability of Wireless Messaging for Sony Magic Link Personal Communicators, ProQuest, Business Wire, New York, Sep. 28, 1994,Sec.1.
Reinhardt, Andy, Sony Releases Magic Cap Device, BYTE, The Magazine of Technology Integration, Dec. 1994, 3 pages.
Jacqueline, Emigh, Sony's New Magic Link Personal Communicator, Information Access Company, Newsbytes, Sep. 29, 1994, 3 pages.
Reinhardt, Andy, The Network with Smarts, BYTE, The Magazine of Technology Integration, Oct. 1994.
Kramer, Matt, Paging-Software Programs Show Broader Messaging Capabilities, PC Week, vol. 11, No. 25, Jun. 27, 1994, 5 pages.
Unknown, SkyTel and Ex Machina Announce Joint Marketing Agreement; Notify! Wireless Messaging Software to Work with Skyword and Skystream, Aug. 10, 1992, pp. 5 and 6.
Unknown, Advanced Communications Software Introduced for Newton; Ex Machina Debuts Pocketcall Terminal Program and Notify! Wireless Messaging to Newton, Aug. 2, 1993.
Unknown, Ex Machina Introduces Wireless Receiving Software for Windows, Business Wire, Inc., Nov. 19, 1993, pp. 1-2.
Invalidity Contentions,U.S. District Court Eastern District of Texas-;SimpleAir Holding, Inc. V M-Qube, Inc. et al.,Steptoe's invalidity Contentions;doc.41, Aug. 29, 2007, pp. 1-15.
U.S. District Court Eastern District of Texas; SimpleAir Holding, Inc. V M-Qube, Inc. et al.,Invalidity Contentions Pursuant to Patent . . . document 41, Feb. 20, 2007.
Unknown, A New Chapter in Wireless Communication and E-Mail, Electronic Messaging News, vol. 3, No. 24, Nov. 27, 1991, 3 pages.
Acharya et al., Delivering Multicast Messages in Networks with Mobile Hosts, Department of Computer Science Rutgers University, IEEE 1993.
Schulman et al., Traveler Information: Tailored to Meet the Needs of the Traveler, TIntelligent Transportation: Realizing the Benefits, vol. 1, Apr. 15-18, 1996.
Parola, Bryan, irMedia Live! Premiers at Semo '96 First Wireless Cyberspace Network Connections Internet to Off-Line Pc's, Press Release, Jan. 29, 1996, pp. 1-4.
Unknown, AirMedia Live! Wireless Cyberspace Network Goes Online; Ex Machina Announces Launch of Nationwide Wireless . . . Business Wire, Jun. 3, 1996, 3 pages.
Motorola Wireless Data Group, AirMobile Wireless Comm Client for cc:Mail User Guyde Version 1.0, Motorola, Inc. 1995, 45 pages.
Unknown, America Online Expands Lead in Mobile Computing Market, Provides Customized Serice Pre-Loaded on the Motorola Envoy DevicePR Newswire, Mar. 7, 1994.
Unknown, Apple Computer Launches eWorld, Its New Online Community, PR Newswire, Jun. 20, 1994.
Apple Mobile Message System, Apple Computer, Inc. 1994.
Unknown, Apple's Starcore Group Announces New Software for Newton Messagepad and Compatibles, PR News, Jan. 5, 1994.

(56) References Cited

OTHER PUBLICATIONS

Gillford et al., An Architecture for Large Scale Information Systems, MIT Laboratory for Computer Sciences, Association for Computer Machinery, 1985.
Gillford et al.,The Application of Digital Broadcast Communication to Large Scale Information Systems, IEEE Journal on Selected Areas in Communications, vol. SAC-3, No. 3.
Unknown, Ericsson Adapts pACT Narrowband PCS Protocol; New Digital Two-Way Open Air Protocol Co-Developed with AT&T Wireless Services, Business Wire, Feb. 6, 1996.
Barbara, Daniel, Sleepers and Workaholics: Caching Strategies in Mobile Environments (Extended Version), Journal, Aug. 29, 1994.
Vittore, Vince, Bellcore's Airboss Brings Single Number to Data, Emerging Technologies, America's Network, Jun. 1, 1993.
Belsie, Laurent, Here Comes New Wave of Personal Digital Assistants, The Christian Science Monitor, An International Daily Newspaper, Apr. 22, 1994.
Unknown, On-Ramp to the Information Highway, Earl G. Graves Publishing Company, Inc., Black Enterprise, Apr. 1994.
Unknown, Electronic Mail & Messaging Systems, BRP Publications, Apr. 1, 1996, vol. 20 Issue 6, Newsletter.
Unknown, CompuServe Announces Wireless Partnership; New Services Helps Mobile Professionals Stay in Charge SM, Business Wire, May 1, 1995.
Unknown, CompuServe: Exclusive Wireless Technology Enabling Communication to all Pagers in the U.S. Announced, M2 PressWire, Oct. 11, 1995.
CompuServe, CompuServe Information Manager for Macintosh, User's Guide, 1995, 179 pages.
Beatty et al., Cruising America Online, Prima Publishing, 1994, 319 pages.
Dack et al., Key Lessons in Mobile Applications, Networks & Communications Laboratory, HP Laboratories Bristol, HPL-93-108, Dec. 1993, 17 pages.
Motorola, Introduction for Application Developers, DataTAC Networks, Jan. 1996.
DeRose, James F., The Wireless Data Handbook, Third Edition, Apr. 1996, 156 pages.
Milligan et al., eWorld; The Official Guide for Macintosh Users, Hyden Books, 1994.
Unknown, Ex Machina Announces PocketCall Intelligent Terminal Program for General Magic Platform, Business Wire, Jan. 6, 1994.
Unknown, Ex Machina Introduces PocketCall for Motorola's Envoy Personal Wireless Communicator, Business Wire, Mar. 7, 1994.
Rooney, Paula, Ex Machine's Update Completes Wireless Cycle, PC Week, vol. 10, No. 19, 3 pgs., May 17, 1993.
Motorola, FLEX; Flexible High Speed Paging Protocol, Motorola, Inc., Apr. 26, 1994, 16 pages.
Gadol et al., Nomadic Tenets—A User's Perspective, Sun Microsystems Laboratories, Inc., Jun. 1994, 16 pages.
Burch, Ben, Motorola Envoy Press Clippings, USENET, Comp.sys. pen, (via Google Groups), Mar. 7, 1994.
Unknown, Hewlett-Packard Delivers Instant Voice, Data Messages to PalmTop Via PageNet, Land Mobile Radio News, vol. 48, No. 12, Mar. 25, 1994.
Apple, Inc., How to Activate the Apple Notification Service, Apple Mobile Massage System, 1994.
Hewlett Packard Co., HP 95LX User's Guide, Nov. 1991.
Schmuhl et al., HP PalmVue: A New Healthcare Information Product, Hewlett-Packard Journal, Jun. 1996.
Unknown, Proceedings of the Twenty-Seventh Internet Engineering Task Force, SURFnet and RARE Amsterdam, The Netherlands, Corporation for National Recearch Initiatives, Jul. 12, 1993.
Imielinski et al., Mobile Wireless Computing: Solutions and Challenges in Data Management, Department of Computer Science Rutgers University.
Unknown, Individual Delivers Headsup, a Personal, Interactive Newspaper for the Fax and Mobile Computing Environments, PR Newswire Association, Inc., May 10, 1993.
Unknown, How SMART Works, Individual, Inc., White Paper, on Information and Belief, Pre 1995.
Doug Van Kirk, StarLink to unite HP 100LX users with paging Services, InfoWorld, Mar. 14, 1994.
Matzkin, Jonathan K., Intelligent Assistance, Computer Shopper, The Computer Magazine for Direct Buyers, vol. 15, No. 11, Issue 188, Nov. 1995.
Unknown, Internet Protocol DARPA Internet Program Protocol Specification, Information Sciences Institute University of Southern California, Sep. 1981.
Ioannidis, John, Protocols for Mobile Internetworking, Columbia University, 1993.
Unknown, Standard Codes and Formats for International Radio Paging, Recommendation 584-1, Question 12-8, Study Programme 12 A/8, ITU, 1982-1986.
Kador, John, Letting Computers Choose Your News; Individual, Inc's HeadsUp Customized Electronic News Service, Gale Group, Inc., Jun. 30, 1994.
Nilsson, B.A., Let's Get Small; PCMCIA cards; Includes Related Article on the Top PCMCIA Card Vendors, ZD Net, Computer Shopper, Jun. 1, 1993.
Jones, Stephen, Lotus and SkyTel Announce Strategic Alliance to Develop Wireless Messaging Technologies, Business Wire, New York, May 5, 1993, Section 1 p. 1.
Emigh, Jacqueline, Lotus Releases cc:Mail Gateway for Pager Messaging, Post-Newsweek Business Information, Inc., NewsBytes, Aug. 30, 1994.
MASC/MPAK Protocol Description, Ericsson, reprtinted 2002.
McIntyre, Angus, Games: The MOO Frontier, The Guardian, Nov. 24, 1994.
Frivold et al., ITU-T Teleconferencing OverviewMinutes of the Multiparty Multimedia Session Control Networking Group, 4 pages.
Weinrib, Abel, Architectural Issues in CUSeeMe, Bell Communications Research, Minutes of the Multiparty Multimedia Session Control Networking Group, 4 pages.
Unknown, Mobidem Radio Data Modem Criticized by Newsletter Report, NewsBytes News Network, Feb. 20, 1992.
Khan et al., MobiTex and Mobile Data Standards, IEEE, Mar. 1995.
Mobitex Interface Specification, General Binder Overview, 1992-1993, 910 pages.
Mobitex Made Easy: A guide to Wireless Computing, RIM, 1994, 143 pages.
MIS Mobitex Interface Specification—Open Version, Ericsson AB, 2002, 690 pages.
Parsa, Kourosh, The Mobitex Packet-Switched Radio Data System, RAM Mobile Data, IEEE, 1992.
Monheim, Thomas A., Personal Communications Servies: The Wireless Future of Telecommunications, 44 Fed., Comm. L.J. 335, 191-192.
Motorola Adds Completely Mobile to Sales Force for Embarc Wireless Network, Canada Newswire, Sep. 2, 1993.
Motorola Announces Commercial Availability of Envoy Wireless Communicator, PR Newswire, Feb. 14, 1995.
Unknown, Motorola's EMBARC and Individual, Inc. Launch HeadsUp Wireless Service, Business Wire, Inc., Jun. 1, 1993.
Motorola, User's Guide for Motorola's Envoy and Envoy 150 Wireless Communicators, Motorola, Inc. Nov. 1994.
Unknown, Motorola FLEX on Schedule, Newsbytes News Network, Mar. 7, 1994.
Unknown, Motorola Unveils Envoy Hand-Held Device: First Fully integrated Two-Way Personal Wireless Communicator . . . , Business Wire, Mar. 7, 1994.
Unknown, Motorola's Newsstream Demonstrates Strength of One-Way Wireless Communications, PR Newswire, Feb. 16, 1993.
Unknown, Motorola's Wireless Data Group Targets End of Year for Envoy Shipment, PR Newswire, Jul. 18, 1994.
Fraser, Robert J., The MobiTex Terminal Specification, Evolution, Administration and Guided Tour, Reprinted from Communications, Jul. 1991 and Aug. 1991.
Sandomir, Richard, N. B.A. Sues to Keep Scores in its Court, The New York Times, Mar. 21, 1996.
Tatters, Wes, Navigating the Internet with CompuServe, Sams.net Publishing, 1995.

(56) References Cited

OTHER PUBLICATIONS

Jain et al., Network Support for Personal Information Services to PCS Users, Bell Communications Research, IEEE 1994.
Unknown, New Sharp Personal Information Assistant Will Offer EMBARC Wireless Messaging Capabiliities, PR Newswire Association, Inc., Nov. 15, 1993.
Miller et al., News On-Demand for Multimedia Networks, International Multimedia Conference, Anaheim, CA, Aug. 2-6, 1993.
Unknown, News Serice for Computer-Phones, Editor & Publisher Co., Inc., Nov. 6, 1993.
Unknown, Newton Users Now Can Surf the Net with Pocket Call 2.0; Ex Machina Answers Customer Demand with First VT100 Terminal Emulator for Newton, Business Wire, Aug. 8, 1995.
Unknown, pACT, Personal Air Communications Technology, Brochure No. 32596, Mar. 1996.
Unknown, pACT Specification, Personal Air Communications Technology, Release 1.1, Oct. 1, 1995.
Unknown, p. Descriptor Footer (PDF) Draft Specification Revision 2.01, Socket Communications, Inc., Mar. 7, 1996.
PageCard Wireless Messaging System for Mobile Professionals for Newton Message Pads, Socket Communications, Inc. 1995.
PageCard Wireless Messaging System Users Guide for Manual Operation, Socket Communications, Inc., Feb. 1995.
PageNet Boosts Network Speed, Efficiency with Deployment of FLEX Pagers on Nationwide and Local Systems, Business Wire, Jul. 31, 1995.
Unknown, PageNet to Provide Paging for HP Palm Vue Systems, Communications Today, May 25, 1995.
Poultney, John, Pagers are more than a beeper, less than a computer, MacWeek, Sep. 11, 1995.
Unknown, PCSI Awarded Multimillion Collar Contract for pACT Narrowband PCS Base Stations, Business Wire, Oct. 27, 1995.
The HP OminGO 100 and the Sony PIC-200; Magic Cap Animation; SkyTel's 2-Way Paging System; Magic Cap Serial Communications . . . , PDS Developers vol. 3.6, Nov. /Dec. 95.
Porter, Patrick L., Individual's Interactive Newspaper Hits Stride, UMI, Inc., Jan. 24, 1994.
Ratcliffe, Mitch, Magic Happens: Motorola's Envoy Communicator: Motorola's Personal Digital Assistant; General Magic's Magic Cap Operating Syste; Evaluation, Digital Media.
Unknown, Mobitex User's Handbook for the Mobidem AT, RIM Apr. 1993.
Unknown, RIMGate, Installation and User's Guide, Aug. 1994.
Unknown, River Run Software Group Announces its Wireless and Wireline Communications Products for Motorola's Personal Wireless Communicator, Business Wire, Mar. 7, 1994.
Unknown, Seattle Ready for Paging Upgrade; SkyTel Proves Motorola's New FLEX paging format in tough-terrain seattle; channel capacity to more than double,Business Wire, Jan. 2, 1995.
Unknown, Send and Receive Messages from Almost Anywhere; RadioMail bundled on Motorola Envoy Personal Wireless Communicator, Business Wire, Mar. 7, 1994.
Seybold, Andrew M., Using Wireless Communications in Business, Van Nostrand Reinhold, An International Thompson Publishing Company, May 1996.
Shekhar et al., Genesis and Advanced Traveler Information System (ATIS): Killer Applications for Mobile Computing?, Nov. 1994.
Unknown, Product Review: SkyTel 2-Way Messaging Service, Virtual Publishing Co., Ham Radio Online, Feb. 1996.
Unknown, SkyTel Announces Availability of Wireless Messaging for Sony Magic Link Personal Communicators; SkyTel Announces Agreement with Sony, Business Wire, Sep. 28, 1994.
SkyTel Announces SkyCard; Intelligent Wireless Message Management for Mobile Computing, Business Wire, Sep. 19, 1994.
Socket Communications, PAGECARD Wireless Messaging System, Socket Communications Brochure.
Unknown, Sony's New Magic Link Personal Communicator, NewsBytes News Network, Sep. 29, 1994.
Unknown, Telocator Alphanumeric Protocol Version 1.3, The Personal Communications Industry Association, Sep. 24, 1993.
Unknown, Telocator Alphanumeric Protocol Version 1.8, Feb. 4, 1997.
USPTO, Cyberspace Doorbell, AirMedia, Inc. Registered Trademark No. 2,185,824, Registered on Sep. 1, 1998.
USPTO, Airmedia Live, AirMedia, Inc. Registered Trademark No. 2,253,920 Registered on Jun. 15, 1999.
Sony, Magic Link, User's Guide PIC-1000, 1994, 103 pages.
Que Corporation, Using CompuServe, Get the Most From CompuServe's Services and Resources!, Second Edition, 1994, 495 pages.
Vaughan-Nichols, Steven J., Online Serives Going Full Speed Ahead with Internet Access and Wireless Users, pp. 1, 3, 6 and 609, vol. 14, No. 7, Issue 172, Jul. 1994.
Storm, David, Mail on the Viking Express, Network Computing, p. 48, Nov. 15, 1992.
Pahlavan et al., Wireless Data Communications, Proceedings of the IEEE, vol. 82, No. 9, Sep. 1994.
RIM, Freedom PCS Network Adapter for Mobitex Version 1.0, Installation and User's Guide, Last Revised Oct. 13, 1995, 45 pages.
Unknown, Wireless World: HP's First Wireless Service Delivers Instant Voice & Data Messages to the HP 100LX PalmTop PC, EDGE, On & About AT&T, vol. 9, No. 294, Mar. 14, 1994.
Unknown, McAfee Virus Update Notigy 1.1, Innovations by InterSystem, p. 1-3, Aug. 15, 2007.
Unknown, Details, Instyler Software, Instyler SmartSetup, p. 1-2, Aug. 15, 2007.
Unknown, Order, Instyler Software, Instyler SmartSetup, p. 1-2, Aug. 15, 2007.
Unknown, Lifeinstyler Update-Notify by Sebastian Brand; Email without Boundaries, 1 page, Aug. 15, 2007.
About Us, Instyler Software, 1 page, Aug. 15, 2007.
Instyler Update-Notify; Download, 1 page, Aug. 15, 2007.
Instyler Update-Notify; An Overview, 1 page, Aug. 15, 2007.
PR Newswire Association, Inc., Wireless data Services Announced for Portable Computers; New Spftware From SkyTel, Ex Machina . . . , Wireless Data Services, pp. 8-10, Feb. 2, 1993.
Information Access Company, Ex Machina's Update Eases Wireless data Transfer; Update 1.0 Communications Program for Macintosh Powerbooks, p. 6-7, Mar. 15, 1993.
Unknown, Socket Unveils the PageCard, The First PCMICA Alphanumeric Pager with LCD Display, PR Newswire Association, p. 3-5, Nov. 15, 1993.
High Beam—Encyclopedia, Apple Mobile Message System will Incorporate Ex Machina's Notify! and Update! Software, Business Wire, p. 1-2, Jan. 16, 1995.
Barney, Doug, Apple Taps into Paging Technology with Mobile, Wireless Suite, InfoWorld Group; p. 1-2, Jan. 16, 1995.
lssacson, Portia, Integrated PCMCIA Peripherals Enjoy Rapid Growth in Popularity, UMI, Inc., p. 21-23, Aug. 1, 1994.
Socket PC Cards FQA, Synchrotech, p. 1-3, Jan. 17, 2007.
Brown, Bruce, Page your Socket Communications PageCard: Socket Communications; Hardware Review; Brief Article; Evaluation, Information Access Company; p. 1-2, Apr. 1997.
Unknown, Wireless Messaging System Adds Support for Microsoft Exchange New Version of Socket's PageCard Offers Windows 95 Spport, Business Wire, p. 1-3, Nov. 6, 1995.
Unknown, Socket PageCard Chosen by Apple Computer for First of a Kind Wireless Message System, Business Wire, p. 1-3, Jan. 3, 1995.
Unknown, Socket Releases Wireless E-Mail Forwarding Software for Microsoft Mail, Business Wire, p. 1-4, Oct. 4, 1995.
Unknown, PageCard Wireless Messaging System, Socket Communications, p. 1-13, Copyright 1995.
Scardina, Mark, The PageCard SDK, Handheld Systems, XP-002106346, Nov. / Dec. 1997.
PR Newswire Association, Inc., Socket Unveils the PageCard, The First PCMICA Alphanumeric Pager with LCD Display, PR Newswire, p. 19-21 Nov. 15, 1993.
Emigh, Jacqueline, PageCard to Double as PCMCIA Card / Standalone Pager . . . Product Announcement, Newsbytes News Network, 1 pag, Dec. 21, 1993.
PR Newswire Association, Inc., Socket Unveils the PageCard, The First PCMCIA Alphanumeric Pager with LCD Display, PR Newswire. p. 53-55, Nov. 15, 1993.

(56) References Cited

OTHER PUBLICATIONS

Enterprise Networking, New Products, Computerworld, p. 52, Nov. 29, 1993.
Unknown, Infoworld; Pipeline; Announcement, Infoworld Media Group, p. 51, Dec. 13, 1993.
Unknown, ABI/Inform; High Growth Forecast for Wireless Modems, UMI, Inc. Jul. 1994.
Unknown, The PageCard Built by Mitsubishi Corp., Information Access Company, p. 49-50, Jun. 20, 1994.
Unknown, ABI/Inform; High Growth Forecast for Wireless Modems, UMI, Inc. , p. 24-25, Jul. 1994.
Unknown, Apple Mobile Message System will Incorporate Ex Machina's Notify! and Update! Software, High Beam Research, p. 1-2, Jan. 3, 1995.
Unknown, Apple Mobile Message System Makes it Easy to Receive Wireless Messages in the Road, High Beam Research, p. 1-3, Jan. 16, 2007.
Unknown, Socket PageCard Chosen by Apple Computer for First of a Kind Wireless Message System, Business Wire, p. 1-2, Jan. 17, 2007.
Unknown, PageCard Transmits LAN-Based Email to remote notebooks, Information Access Company, p. 19, Feb. 6, 1995.
Unknown, Wireless Messaging Kit Forwards Mail to Pagers . . . , Information Access Company, p. 18, Mar. 13, 1995.
Unknown, TekNow Announces Messaging Software Bundle . . . , High Beam Research, p. 1-3, Jan. 16, 2007.
Unknown, Wireless Technology Gives Paying a Face-Lift, CMP Publications, Inc., p. 15-16, May 1, 1995.
Unknown, Wireless Massaging System for Windows, BYTE.com, p. 1-3, Jan. 17, 2007.
Unknown, ABI/Inform; Talk & Backtalk, UMI, Inc., p. 6-12, Jun. 1995.
Unknown, Socket Introduces Software Developers Kit for data Paging . . . , High Beam Research, p. 1-3, Jan. 16, 2007.
Unknown, Socket SDK to advance paging applications, Information Access Company, p. 7, Aug. 14, 1995.
Unknown, PCMCIA Pager Downloads data, Information Access Company, p. 6, Sep. 1995.
Unknown, Wireless Messaging System Adds Support for Microsoft . . . , High Beam Research, p. 1-2, Jan. 16, 2007.
Unknown, London Pafer Pffers data Paging to UK . . . , Business Wire, p. 1-2, Jan. 16, 2007.
Unknown, Socket Enables International Wireless Massaging, High Beam Research, p. 1-2, Jan. 16, 2007.
Unknown, Stratus TRM Offers Advanced Messaging Services for PageCard,High Beam Research, p. 1-2, Jan. 16, 2007.
Unknown, Socket Announces Advanced Data Paging Software . . . , High Beam Research, p. 1-3, Jan. 16, 2007.
Unknown, Socket Communications Announces Plans to Develop . . . , High Beam Research, p. 1-3, Jan. 16, 2007.
Unknown, Socket Expands Servia I/O Card Family for Mobile Computers, High Beam Research, p. 1-4, Jan. 16, 2007.
Unknown, AT&T and SkyTel Offer Wireless Mailbox Service, The New York Times Company, p. 25, Oct. 15, 1991.
Unknown, Trade Briefs, The Journal of Commerce, Inc., p. 23-24, Feb. 10, 1992.
Unknown, Abstracts; SkyTel to Develop a Removable Card for Apple's Newton, The New York Times Company, p. 22, Jun. 15, 1992.
Unknown, 2-Way Pager Works Well, But Pricing is Sky-High, P.G. Publishing Co., p. 9-10, Feb. 15, 1998.
Unknown, Ebay to Go Wireless with SkyTel, San Jose Mercury News, p. 8, May 14, 1999.
Unknown, Wireless E-Mail Works with Pager, Sun-Sentinel Company, p. 7, May 18, 1999.
Unknown, MCI Takes First Step into Wireless Internet, Gannett Company, p. 4-5, Jun. 1, 1999.
Unknown, Wireless and Raising its Profile; Reason's Motient Undergoing a Transformation to Data Network Firm, The Washington Post, p. 2-3, Nov. 2, 2000.
Unknown, Getting Messages on a Wrist, The Dallas Morning News, p. 1, Oct. 7, 2001.
Johnson, Alyssa, Wireless Service Tracks Teen Drivers; SkyTel's New Sky Guard Vehicle Tracking Service Allows Parents to Keep an Eye . . . , Ziff Davis Media, Inc., p. 11-12.
Heilman, Wayne, Download, Chapel Hills Get Wireless Internet Service,ProQuest Information & Learning, Co., p. 9-10, Feb. 1, 2006.
Unknown, ParkMagic and SkyTel to Roll Out Mobile Parking Service in U.S., M2 Communications Ltd., Dec. 9, 2006, pp. 7-8.
Unknown, When Vehicles Become Mobile Offices, ProQuest Information & Learning, Co., p. 5-6, Apr. 2007.
Unknown, SkyTel Partners with VMS to Expand U.S. Distribution of SkyGuard Vehicle Saftey Technology, Associated Press, p. 3-4, Jun. 12, 2007.
Unknown, Satellite Notes, Warren Publishing, Inc., p. 2, Jun. 25, 2007.
SkyTel, SkyTel to End Wireless Net Test, The Dever Post, p. 1, Jul. 9, 2007.
SkyTel, Products & Services; Service Comparrison, kyTel, p. 1-2, 2007.
SkyTel, Customer Service; SkyTel Instructions . . . , SkyTel, p. 1-3, 2007.
SkyTel, NightWalk Systemsand SkyTel Join Forces, SkyTel, p. 1-3, Jul. 18, 2007.
SkyTel, Customer Q&A, SkyTel, 1 page, 2007.
SkyTel, Bell Industries Companies Acquisition of SkyTel, SkyTel, p. 1-3, Feb. 1, 2007.
SkyTel, Telemetry; Machine to Machine . . . , SkyTel, p. 1-2, 2007.
SkyTel, Service Options, SkyTel, p. 1-3, 2007.
SkyTel, SkyPaper Numeric Paging, SkyTel, p. 1-2, 2007.
SkyTel, SkyWord Text Paging, SkyTel, p. 1-2, 2007.
SkyTel, 1Way Paging, SkyTel, 1 page, 2007.
SkyTel, SkyWriter SkyTel 2Way Messaging, SkyTel, p. 1-4, 2007.
SkyTel, SkyGuard—The Ultimate Vehicle Reassurance System, SkyTel, p. 1-2, 2007.
SkyTel, FleetHawk, SkyTel, 1 page, 2007.
SkyTel, SkyTel Management Team, SkyTel, p. 1-2, 2007.
SkyTel, SkyTel Company History, SkyTel, p. 1-2, 2007.
Unknown, AirNote 1.0 Remote Messaging Services, UMI, Inc., p. 23-24, Dec. 1994.
Unknown, Going Global or Staying Closer to Home?, UMI, Inc., p. 19-22, Oct. 1995.
Unknown, Carriers Win with Narrowband PCS Communications, p. 17-18, Nov. 1995.
Unknown, Size is Everything, Bell & Howell Information & Learning, p. 14, Nov. 2001.
Lewis, Pete H., The Executive Computer, The New York Times Company, p. 63-65, Apr. 28, 1991.
Riley, James, Motorola, HP Tir up for PlamTop Pagers, South China Morning Post, Ltd., p. 61-62, Aug. 4, 1992.
Goldstein, Hal, The HP 95LX and the Motorola Newsstream Receiver, http://palmtoppaper.com/ptp00028.htm, p. 1-5, Aug. 22, 2007.
Unknown, Most Frequently Asked HP 95LX Questions to HP Technical Support, The HP PalmTop Paper; Fall 1991 Premier Issue; p. 1-2, fall 1991, http://palmtoppaper.com.
Unknown, The HP PalmTop Paper; Online Index to Issues 0-51, SourceForge Net, Efone, p. 1-2, Jul. 24, 2000.
eFone.com, eFone Documentation Tree, efone.com, p. 1-4, May 12, 2002.
eFone.com, Admin—pages eFone Administration Interface, efone. com, pp. 1-24, Mar. 25, 2002.
eFone.com, Installing efone, p. 1-6, Mar. 25, 2002.
eFone.com, The Home Page, pp. 1-2, Aug. 15, 2007.
Unknown, CompuServe Testing Wireless Credit Check, The Columbus Dispatch, pp. 15-16, Sep. 12, 1994.
Unknown, CompuServe to Unveil Service Linked to Pagers, The Columbus Dispatch, pp. 13-14, Mar. 25, 1996.
Unknown, AT&T Internet Offers CompuServe Access, Plain Dealer Co., p. 11-12, Apr. 8, 1996.
Van, Jon, CompuServe is Web-Bound, Chicago Tribune Company, p. 9-10, May 22, 1996.

(56) References Cited

OTHER PUBLICATIONS

Unknown, H&R Block Seeks to Boost Value of CompuServe, The Times Mirror Company, p. 7-8, Aug. 29, 1996.
Scott, Jennifer, CompuServe Logs Off After 28-Year Run, The Columbus Dispatch, p. 5-6, Feb. 1, 1998.
Katz, Frances, Partnered with CompuServe, MCI Back in Net Access Business, The Atlanta Constitution, p. 3-4, Feb. 5, 1999.
R. Sivanithy, Sky Telecom Starts HK Wireless Mesaging Service, Times Business Publications, p. 21, Apr. 24, 1993.
Williams, Elisa, New Device Enables Portable PC to Get E-Mail, other data, Orange County Register, p. 19-20, May 5, 1994.
Kehoe, Louise, SkyTel Launches Two-Way Pager, The Financial Time Limited, p. 17-18, Sep. 27, 1995.
Burgess, John, Paging Takes a New Direction, The Washington Post, p. 14-15, Oct. 2, 1995.
Langberg, Mike, SkyTel Quietly Introduces a Paper that Answers Back, Saint Paul Pioneer Press, p. 11-13, Feb. 17, 1997.
Davis, Mark S., ABI/Uniform Using CompuServe for Practical Economic Development, UMI, Inc., p. 16-18, 1996.
Lynch, David J., ABI/Inform; End of the Line for On-Line Services, UMI, Inc., p. 8-15, May 1996.
Poynder, Richard, ABI/Inform; Europe is Choosing its Online Routes, UMI, Inc., p. 5-7, May 1996.
Liebmann, Lenny, ABI/Inform; Increasing Net Value, UMI, Inc., p. 1-4, Sep. 1996.
Kahney, Leander, Apple's Newton Just Wont Drop, Wired.com; 1 page, Aug. 22, 2007.
Unknown, Apple Newton, Wikipedia.org, p. 1-10, Aug. 22, 2007.
Unknown, Organize Integrate Communicate, Newton Solutions Guide, p. 1-72, 1993.
Unknown, Mobile Computing, World Cat Record, p. 1-2, Jan. 16, 2007.
Unknown, Pager FAQ, Chris De Herra's Wndows CE Website, p. 1-2, Jan. 16, 2007.
Unknown, The First PowerBook Paging Solution to be Offered by Apple, Information Access Company, p. 45-46, Nov. 14, 1994.
Moeller, Michael, Apple Wireless-Messaging Bundle Targets PowerBooks, Information Access Company, p. 43-44, Dec. 26, 1994.
Halper, Mark, Power Macs to Star at Exposition, UMI, Inc. p. 15-16, Dec. 26, 1994.
Unknown, Pagenet to provide Wireless Network Services for . . . , PR Newswire Association, Inc., p. 40-41, Jan. 3, 1995.
Unknown, Pagenet to provide Wireless Network Services for Apple Product, PR Newswire Association, Inc., p. 17-18, Jan. 3, 1995.
Unknown, Apple Offers Wireless Mobile Message System, Post-Newsweek Business Information, Inc., p. 38-39, Jan. 3, 1995.
Unknown, Apple Announces Licensees, Strengthens Product Offerings, Drops Price, and Gains New Suporters, PR Newswire Accociation, p. 35-37, Jan. 4, 1995.
Wexler, Joanie, Apple Assumes Role of Mobile Integrator, Network World, Inc., p. 33-34, Jan. 9, 1995.
Barney, Doug, Apple Taps into Paging Technology with Mobile, Wireless Suite, InWorld Media Group, p. 31-32, Jan. 16, 1995.
Unknown, Apple Rolls Out Wireless Solution, CMP Publications, Inc., p. 29-30, Jan. 16, 1995.
Unknown, Apple Announces Licensees, Strengthens Product Offerings, Drops Price, and Gains New Suporters, PR Newswire Association, Inc., p. 14-16, Jan. 4, 1995.
Mohan et al., ABI/Inform; Expo Focuses on Wireless, Newton, UMI, Inc., p. 13-14, Jan. 9, 1995.
Wexler, Joanie, ABI/Inform; Apple Assumes Role of Mobile Integrator, UMI, Inc., p. 19-20, Jan. 9, 1995.
Unknown, Incoming, Message System from Apple Computer and Emergency Phone Dialer From Radio Shack, High Beam Research, The Weekly Newspaper, p. 1-2, Jan. 16, 1995.
Schwartz, Jeffery, ABI/Inform; Paging Services Take Spotlight, UMI, Inc., p. 12, Jan. 16, 1995.
Barney, Doug, ABI/Inform; Apple Taps into Paging Technology Which Mobile, Wireless Suite, UMI, Inc., p. 17-18, Jan. 16, 1995.

Unknown, ABI/Inform; Apple Rolls Out Wireless Solution, UMI, Inc., p. 15-16, Jan. 16, 1995.
Unknown, Apple Outlines Piethora of Newton Wireless Communications Solutions Messagepad 120 Launch, PR Newswire Association, Inc., p. 10-13, Jan. 30, 1995.
Unknown, Pagenet to provide Wireless Network Services for Socket Messaging System, PR Newswire Association, Inc., p. 8-9, Jan. 30, 1995.
Fitzgerald, Michael, Pagers Boost Mobile Arsenal, Computerworld, p. 23-24, Jan. 30, 1995.
Unknown, Pagenet to provide Wireless Network Services for Socket Messaging System, PR Newswire Association, p. 27-28, Jan. 30, 1995.
Unknown, Apple Upgrades the Wireless Newton, Business Communications, Co., p. 22, Feb. 1995.
Unknown, Apple Mobile Message System, High Beam Research, p. 1, Mar. 1, 1995.
Rizzo, John, Apple Goes Wireless, Information Access Company, vol. 11, No. 4, p. 17, Apr. 1995.
Unknown, ABI/Inform; Apple's Power Play, UMI, Inc., p. 7-8, May 1, 1995.
Kitchen, Jay, ABI/Inform; Wirelessand the Infromation Superhighway; the Road to the Future, UMI, Inc., p. 8-13, Jun. 1995.
Beckman, Mel, ABI/Inform; Apple Mobile Message System, UMI, Inc., p. 4-5, Sep. 1995.
Unknown, Socket Serial PC Card is First to Earn Windows 95 Logo, High Beam Research, Business Wire, p. 1-2, Aug. 30, 1995.
Unknown, Apple Mobile Message System, High Beam Research, p. 1-2, Sep. 1, 1995.
AirNote, Inc., AirNote FAQ, AirNote, p. 1-4, Aug. 15, 2007.
AirNote, Inc., Wireless E-Mail Services Corporation . . . , AirNote, p. 1-2, Aug. 15, 2007.
AirNote, Inc., AirNote Wireless E-Mail, Communication trhough the AirNote Website, AirNote, p. 1-3, Aug. 15, 2007.
AirNote, Inc., AirNote Wireless Email, AirNote, p. 1-2, Aug. 15, 2007.
Beckman, Mel, ABI/Inform; AirNote 1.0, UMI, Inc., p. 1-4, Dec. 1994.
Unknown, Links Airmail Downloads, Home, p. 1-3, Aug. 15, 2007. www.Airmail2000.com.
Unknown, Links Airmail Home Page, p. 1-2, Aug. 15, 2007. www.Airmail2000.com.
Unknown, CompuServe Called Key by AOL Exec., The Columbus Dispatch, p. 1-2, Jannuary 19, 2001.
Mundy, Jane, AOL and ConpuServe Telephone Cramming, Online Legal Marketing, p. 1-2, Feb. 21, 2006.
Lieberator, Mark, CompuServe or CompuScam, AN ISP Plagued by Incompetence, p. 1-5, Apr. 24, 2005.
Hu, Jim, CompuServe 7.0 Sends MS a Message, 2 pages, Apr. 16, 2002.
CompuServe, Frequently Asked Questions, CompuServe Interactive Services, Inc., p. 1-2, 2004.
Unknown, CompuServe Prepares for Hong Kong Wireless Users, Washington Post NewsWeek Interactive, 1 page, Oct. 26, 1994.
Unknown, CompuServe, Wikipedia p. 1-8, 2007.
Unknown, Welcome to CompuServe, CompuServe Interactive Services, Inc., p. 1-10, 2002.
Unknown, Brand: CompuServe, AOL LLC, 1 page, Apr. 26, 2007.
Unknown, CompuServe Company and Contact Infromation, Computer Hope, p. 1-2, 2007.
Unknown, CompuServe: The Value Leader in Cyberspace, NetScape Communications Corporation, 1 page, 2007.
Unknown, CompuServe Interactive Services Inc. Information, Hoovers, Inc., 1 page 2007.
Unknown, CompuServe Interactive Services Inc. Overview, Hoovers, Inc., p. 1-2, 2007.
Richarson, Kelly A., CompuServe Teams With SkyTel, PageNet, UMI, Inc., p. 20-21, Aug. 1995.
Moody, T., AT&T PersonaLink—A Public Network for Smart Agent PICS, IEEE , Mar. 6, 1995.
Unknown, Annual Report (Form 10-K), Mobile Telecommunication Technologies Corporation; Mar. 31, 1995.

(56) References Cited

OTHER PUBLICATIONS

Unknown, Notable Introduces "all-in-one" AirNote, UMI, Inc, Oct. 1994.
RadioMail Corporation to Bundle Wireless Messaging Software with Megahertz Allpoints Wireless Pc Card, Business Wire, Nov. 1, 1995.
Erickson, Pam, Extensive Software Applications Available to Support Motorola NewsCard, PR Newswire.
PageNet Announces First Non-Paging Service on New Nationwide Network, PR Newswire, Mar. 7, 1994.
Civil Action No. 2:09-CV-289-CE, Defendants Research in Motion Corporation and Research in Motion Limited's P.R. 3-3, Exhibit 73C: The Hewlett Packard Palmtop System, Dec. 1991, Claim Chart.
Civil Action No. 2:09-CV-289-CE, Defendants Research in Motion Corporation and Research in Motion Limited's P.R. 3-3, Exhibit 73D: The Hewlett Packard Palmtop System, Dec. 1991, Claim Chart.
Civil Action No. 2:09-CV-289-CE, Defendants Research in Motion Corporation and Research in Motion Limited's P.R. 3-3, Exhibit 76A: RIMGate System, Jun. 1993, Claim Chart.
Civil Action No. 2:09-CV-289-CE, Defendants Research in Motion Corporation and Research in Motion Limited's P.R. 3-3, Exhibit 76B: RIMGate System, Jun. 1993, Claim Chart.
Civil Action No. 2:09-CV-289-CE, Defendants Research in Motion Corporation and Research in Motion Limited's P.R. 3-3, Exhibit 77A: Notable Technologies AirNote Messaging System, Aug. 1994, Claim Chart.
Defendants Responsive Claim Construction Brief, *SimpleAir, Inc. v. AWS Convergence Technologies, Inc., et at,* Case 2:09-cv-00289-CE, Document 198, Filed May, 18, 2011, pp. 1-52.
Exhibit A, Case 2:09-cv-00289-CE, Document 198-1, Defendants' Proposed Claim Construction, Filed May, 18, 2011.
Exhibit 1, Case 2:09-cv-00289-CE, Document 198-2, U.S. Patent 6,021,433, Filed May, 18, 2011, pp. 1-52.
Exhibit 2, Case 2:09-cv-00289-CE, Document 198-3, U.S. Patent 7,035,914, Filed May, 18, 2011, pp. 1-52.
Exhibit 3, Case 2:09-cv-00289-CE, Document 198-4, U.S. Patent 6,167,426, Filed May, 18, 2011, pp. 1-12.
Exhibit 4, Case 2:09-cv-00289-CE, Document 198-5, U.S. Patent 6,735,614, Filed May, 18, 2011, pp. 1-12.
Exhibit 5, Case 2:09-cv-00289-CE, Document 198-6, Filed May, 18, 2011, Marked up amendment in U.S. Appl. No. 09/350,467, dated Dec. 12, 2002, pp. 1-7.
Exhibit 6, Case 2:09-cv-00289-CE, Document 198-7, Filed May, 18, 2011, Marked up amendment in U.S. Appl. No. 08/788,613, dated Feb. 8, 1999, pp. 1-5.
Exhibit 7, Case 2:09-cv-00289-CE, Document 198-8, Filed May, 18, 2011, marked up Office Action for U.S. Appl. No. 081488,613, mail date May 19, 1999, pp. 1-7.
Exhibit 8, Case 2:09-cv-00289-CE, Document 198-9, Filed May, 18, 2011, Marked up amendment in U.S. Appl. No. 08/788,613, dated Jul. 9, 1999, pp. 1-4.
Exhibit 9, Case 2:09-cv-00289-CE, Document 198-10, Filed May, 18, 2011, fee record sheet and marked up claims in U.S. Appl. No. 09/350,467, dated Jul. 21, 1999, pp. 1-5.
Exhibit 10, Case 2:09-cv-00289-CE, Document 198-11, Filed May, 18, 2011, marked up office action for U.S. Appl. No. 09/350,467, mail date Apr. 24, 2002, pp. 1-8.
Exhibit 11, Case 2:09-cv-00289-CE, Document 198-12, Filed May, 18, 2011, Transcript of deposition of James Knox, Ph.D., taken on May 12, 2011, pp. 1-19.
Exhibit 12, Case 2:09-cv-00289-CE, Document 198-13, Filed May, 18, 2011, marked up provisional U.S. Appl. No. 60/060,839, mail date Nov. 15, 1996, pp. 1-14.
Exhibit 13, Case 2:09-cv-00289-CE, Document 198-14, Filed May, 18, 2011, marked up pages from International Application No. PCT/US97/01165, filed Jan. 24, 1997, total of 7 pages.
Exhibit 14, Case 2:09-cv-00289-CE, Document 198-15, Filed May, 18, 2011, Webster's II New College Dictionary, copyright 1995 by Houghton Mifflin Company, definition of "Specify", p. 1060.
Exhibit 15, Case 2:09-cv-00289-CE, Document 198-16, Filed May, 18, 2011, Letter from Dovel & Luner LLP, mail date May 13, 2011, pp. 1-4.
Declaration of Dr. Harry Bims in Support of Deffendants' Responsive Claim Construction Brief, Case 2:09-cv-00289- CE, Document 198-17, Filed May, 18, 2011, pp. 1-28.
Fraser, Robert J., The MTS—Part II, The second half of a series on the Mobitex Terminal Specification looks at the Modules which compose four terminal products, Reprinted from Communications, Aug. 1991.
Bourassa, Barbara, HP and Lotus' 10-Ounce Has 1-2-3 2.2, PC Week, vol. 8, No. 17, p. 19, Apr. 29, 1991.
Jones, Jeanne L, Keep Data Wave Coming, Corporate News, Jun. 19, 1998, pp. 1-2.
Parola, Bryan, AirMedia Live! Premiers at Demo '96 First Wireless Cyberspace Network Connections Internet to Off-Line PC's, Press Release, Jan. 29, 1996, pp. 1-4, http://web.archive.org/web/20000118211521/airmedia.com/ sidebar/corprofile/pubrelations/.
Strom, David, AirNote, AirNote Technologies, Inc., 1994, 6 pages, http://storm.com/pubwork/cw51294.html, Published in 1994.
Gifford et al.,The Application of Digital Broadcast Communication to Large Scale Information Systems, IEEE Journal on Selected Areas in Communications, vol. SAC-3, No. 3, May 1985.
Roberts, Victor, The HP Palmtop: The Ideal Portable Terminal with Versatile PIMs, the HP Palmtop Paper, Nov./Dec. 1994,vol. 3, No. 6, pp. 36-39.
Riley, James, Motorola, HP Tir up for PalmTop Pagers, South China Morning Post, Ltd., p. 61-62, Aug. 4, 1992.
Dickens, Ted, Getting Help for Your HP Palmtop on CompuServe, The HP Palmtop Paper, Nov./Dec. 1992, pp. 47-50.
Nutter, Ronald, The HP Palmtop as Tech Support Tool, The HP Palmtop Paper, Nov./Dec. 1993, pp. 32-34.
Hall, et al., Third Party Prodicts of Interest to HP Palmtop Users, The HP Palmtop Paper, Nov./Dec. 1993, pp. 6-13.
Chernow, Bob, Cruising The Internet with the HP Palmtop, The HP Palmtop Paper, Nov./Dec. 1994, vol. 3, No. 6, pp. 16-20.
Dickens, Ted, CompuServe's HPSYS Forum and the Files You Can Find There, The HP Palmtop Paper, Jan./Feb. 1992, 3 pages.
Unknown, Socket Links Mobile Users to PCs; Socket Communications' Pagecard Wireless Messaging System for Windows; Product Announcement; Brief Article Information Access Company, p. 14, Jun. 1995.
AT&T Corporation, AT&T PersonaLink Services, Jun. 1, 1994, 36 pages.
Defendants' Invalidity Contentions, dated Sep. 14, 2012, pp. 1-167 in *SimpleAir v. Microsoft,* et al., No. 2:11-CV-416 (E.D. Tex.).
Defendants' Invalidity Contentions Charts, Part 1 of 4, Exhibits 1-42, served Sep. 15, 2012, pp. 1-1617 in *SimpleAir v. Microsoft,* et al., No. 2:11-CV-416 (E.D. Tex.).
Defendants' Invalidity Contentions Charts, Part 2 of 4, Exhibits 43-75, served Sep. 15, 2012, pp. 1-1184 in *SimpleAir v. Microsoft,* et al., No. 2:11-CV-416 (E.D. Tex.).
Defendants' Invalidity Contentions Charts, Part 3 of 4, Exhibits 76-118, served Sep. 15, 2012, pp. 1-1211 in *SimpleAir v. Microsoft,* et al., No. 2:11-CV-416 (E.D. Tex.).
Defendants' Invalidity Contentions Charts, Part 4 of 4, Exhibits 132-150, served Sep. 15, 2012, pp. 1-883 in *SimpleAir v. Microsoft,* et al., No. 2:11-CV-416 (E.D. Tex.).
Civil Action No. 2:09-CV-289-CE, Defendants Research in Motion Corporation and Research in Motion Limited's P.R. 3-3, Exhibit 1A: U.S. Patent No. 5,714,943 (Rasor), issued Feb. 3, 1998, Claim Chart.
Civil Action No. 2:09-CV-289-CE, Defendants Research in Motion Corporation and Research in Motion Limited's P.R. 3-3, Exhibit 1B: U.S. Patent No. 5,714,943 (Rasor), issued Feb. 3, 1998 Claim Chart.
Civil Action No. 2:09-CV-289-CE, Defendants Research in Motion Corporation and Research in Motion Limited's P.R. 3-3, Exhibit 2A: U.S. Patent No. 5,905,865 (Palmer), issued on May 18, 1999, Claim Chart.
Civil Action No. 2:09-CV-289-CE, Defendants Research in Motion Corporation and Research in Motion Limited's P.R. 3-3, Exhibit 2B: U.S. Patent No. 5,905,865 (Palmer), issued on May 18, 1999, Claim Chart.

(56) References Cited

OTHER PUBLICATIONS

Civil Action No. 2:09-CV-289-CE, Defendants Research in Motion Corporation and Research in Motion Limited's P.R. 3-3, Exhibit 3A: European Patent No. EP 0872128 B1 (Winbladh), published Jan. 1, 2005, Claim Chart.
Civil Action No. 2:09-CV-289-CE, Defendants Research in Motion Corporation and Research in Motion Limited's P.R. 3-3, Exhibit 3B: European Patent Spec. 0872128 B1 (Winbladh), published Jan. 1, 2005, Claim Chart.
Civil Action No. 2:09-CV-289-CE, Defendants Research in Motion Corporation and Research in Motion Limited's P.R. 3-3, Exhibit 4A: U.S. Patent No. 5,933,478 (Ozaki), issued Aug. 3, 1999, Claim Chart.
Civil Action No. 2:09-CV-289-CE, Defendants Research in Motion Corporation and Research in Motion Limited's P.R. 3-3, Exhibit 26A: U.S. Patent No. 5,657,345 to Lazaridis, issued Aug. 12, 1997, Claim Chart.
Civil Action No. 2:09-CV-289-CE, Defendants Research in Motion Corporation and Research in Motion Limited's P.R. 3-3, Exhibit 26B: U.S. Patent No. 5,657,345 to Lazaridis, issued Aug. 12, 1997, Claim Chart.
Civil Action No. 2:09-CV-289-CE, Defendants Research in Motion Corporation and Research in Motion Limited's P.R. 3-3, Exhibit 27A: U.S. Patent No. 5,555,241 to Lazaridis, issued, Sep. 10, 1996, Claim Chart.
Civil Action No. 2:09-CV-289-CE, Defendants Research in Motion Corporation and Research in Motion Limited's P.R. 3-3, Exhibit 27B: U.S. Patent No. 5,555,241 to Lazaridis, issued, Sep. 10, 1996, Claim Chart.
Civil Action No. 2:09-CV-289-CE, Defendants Research in Motion Corporation and Research in Motion Limited's P.R. 3-3, Exhibit 28A: U.S. Patent No. 5,802,312 to Lazaridis, issued Sep. 1, 1998, Claim Chart.
Civil Action No. 2:09-CV-289-CE, Defendants Research in Motion Corporation and Research in Motion Limited's P.R. 3-3, Exhibit 28B: U.S. Patent No. 5,802,312 to Lazaridis, issued Sep. 1, 1998, Claim Chart.
Civil Action No. 2:09-CV-289-CE, Defendants Research in Motion Corporation and Research in Motion Limited's P.R. 3-3, Exhibit 57A: AirBoss/SCOUT System (WO 97/10558), published Mar. 20, 1997, Claim Chart.
Civil Action No. 2:09-CV-289-CE, Defendants Research in Motion Corporation and Research in Motion Limited's P.R. 3-3, Exhibit 57B: AirBoss/Scout System (WO 97/10558), published Mar. 20, 1997, Claim Chart.
Civil Action No. 2:09-CV-289-CE, Defendants Research in Motion Corporation and Research in Motion Limited's P.R. 3-3, Exhibit 127A: U.S. Patent No. 5,742,905 (Pepe et al.), issued Apr. 21, 1998, Claim Chart.
Civil Action No. 2:09-CV-289-CE, Defendants Research in Motion Corporation and Research in Motion Limited's P.R. 3-3, Exhibit 127B: U.S. Patent No. 5,742,905 (Pepe et al.), issued Apr. 21, 1998, Claim Chart.
Civil Action No. 2:09-CV-289-CE, Defendants Research in Motion Corporation and Research in Motion Limited's P.R. 3-3 Invalidity Contentions, submitted Aug. 26, 2010.
Civil Action No. 2:09-CV-289-CE, Defendants Research in Motion Corporation and Research in Motion Limited's P.R. 3-3, Exhibit 4B: U.S. Patent No. 5,933,478 (Ozaki) issued Aug. 3, 1999, Claim Chart.
Civil Action No. 2:09-CV-289-CE, Defendants Research in Motion Corporation and Research in Motion Limited's P.R. 3-3, Exhibit 5A: U.S. Patent No. 5,509,000 (Oberlander), issued Apr. 16, 1996, Claim Chart.
Civil Action No. 2:09-CV-289-CE, Defendants Research in Motion Corporation and Research in Motion Limited's P.R. 3-3, Exhibit 5B: U.S. Patent No. 5,509,000 (Oberlander), issued Apr. 16, 1996, Claim Chart.
Civil Action No. 2:09-CV-289-CE, Defendants Research in Motion Corporation and Research in Motion Limited's P.R. 3-3, Exhibit 6A: U.S. Patent No. 5,987,321 (Miyake), issued Nov. 16, 1999, Claim Chart.
Civil Action No. 2:09-CV-289-CE, Defendants Research in Motion Corporation and Research in Motion Limited's P.R. 3-3, Exhibit 6B: U.S. Patent No. 5,987,321 (Miyake), issued Nov. 16, 1999, Claim Chart.
Civil Action No. 2:09-CV-289-CE, Defendants Research in Motion Corporation and Research in Motion Limited's P.R. 3-3, Exhibit 7A: U.S. Patent No. 5,907,811 (Foladare), issued May 25, 1999, Claim Chart.
Civil Action No. 2:09-CV-289-CE, Defendants Research in Motion Corporation and Research in Motion Limited's P.R. 3-3, Exhibit 7B: U.S. Patent No. 5,907,811 (Foladare), issued May 25, 1999, Claim Chart.
Civil Action No. 2:09-CV-289-CE, Defendants Research in Motion Corporation and Research in Motion Limited's P.R. 3-3, Exhibit 9A: U.S. Patent No. 5,581,594 (McAfee), issued Dec. 3, 1996, Claim Chart.
Civil Action No. 2:09-CV-289-CE, Defendants Research in Motion Corporation and Research in Motion Limited's P.R. 3-3, Exhibit 9B: U.S. Patent No. 5,581,594 (McAfee), issued Dec. 3, 1996, Claim Chart.
Civil Action No. 2:09-CV-289-CE, Defendants Research in Motion Corporation and Research in Motion Limited's P.R. 3-3, Exhibit 10A: U.S. Patent No. 5,138,653 (Le Clercq), issued Aug. 11, 1992, Claim Chart.
Civil Action No. 2:09-CV-289-CE, Defendants Research in Motion Corporation and Research in Motion Limited's P.R. 3-3, Exhibit 10B: U.S. Patent No. 5,138,653 (Le Clercq), issued Aug. 11, 1992, Claim Chart.
Civil Action No. 2:09-CV-289-CE, Defendants Research in Motion Corporation and Research in Motion Limited's P.R. 3-3, Exhibit 11A: U.S. Patent No. 5,905,944 (Goldman), issued May 18, 1999, Claim Chart.
Civil Action No. 2:09-CV-289-CE, Defendants Research in Motion Corporation and Research in Motion Limited's P.R. 3-3, Exhibit 11B: U.S. Patent No. 5,905,944 (Goldman), issued May 18, 1999, Claim Chart.
Civil Action No. 2:09-CV-289-CE, Defendants Research in Motion Corporation and Research in Motion Limited's P.R. 3-3, Exhibit 12A: U.S. Patent No. 5,742,906 (Foladare), issued Apr. 21, 1998, Claim Chart.
Civil Action No. 2:09-CV-289-CE, Defendants Research in Motion Corporation and Research in Motion Limited's P.R. 3-3, Exhibit 12B: U.S. Patent No. 5,742,906 (Foladare), issued Apr. 21, 1998, Claim Chart.
Civil Action No. 2:09-CV-289-CE, Defendants Research in Motion Corporation and Research in Motion Limited's P.R. 3-3, Exhibit 15A: U.S. Patent No. 6,035,104 (Zahariev), issued Mar. 7, 2000, Claim Chart.
Civil Action No. 2:09-CV-289-CE, Defendants Research in Motion Corporation and Research in Motion Limited's P.R. 3-3, Exhibit 15B: U.S. Patent No. 6,035,104 (Zahariev), issued Mar. 7, 2000, Claim Chart.
Civil Action No. 2:09-CV-289-CE, Defendants Research in Motion Corporation and Research in Motion Limited's P.R. 3-3, Exhibit 16A: U.S. Patent No. 5,416,473 (Dulaney), issued May 16, 1005, Claim Chart.
Civil Action No. 2:09-CV-289-CE, Defendants Research in Motion Corporation and Research in Motion Limited's P.R. 3-3, Exhibit 16B: U.S. Patent No. 5,416,473 (Dulaney), issued May 16, 2005, Claim Chart.
Civil Action No. 2:09-CV-289-CE, Defendants Research in Motion Corporation and Research in Motion Limited's P.R. 3-3, Exhibit 60A: Boston Community Information System, May 1985, Claim Chart.
Civil Action No. 2:09-CV-289-CE, Defendants Research in Motion Corporation and Research in Motion Limited's P.R. 3-3, Exhibit 60B: Boston Community Information System, May 1985, Claim Chart.
Civil Action No. 2:09-CV-289-CE, Defendants Research in Motion Corporation and Research in Motion Limited's P.R. 3-3, Exhibit

(56) References Cited

OTHER PUBLICATIONS

64A: RIM Freedom PCS Network Adapter for Mobitex: Installation & User's Guide, 1995, Claim Chart.
Civil Action No. 2:09-CV-289-CE, Defendants Research in Motion Corporation and Research in Motion Limited's P.R. 3-3, Exhibit 64B: RIM Freedom PCS Network Adapter for Mobitex: Installation & User's Guide, 1995, Claim Chart.
Civil Action No. 2:09-CV-289-CE, Defendants Research in Motion Corporation and Research in Motion Limited's P.R. 3-3, Exhibit 72A: RIM Mobitex User's Handbook for the Mobidem AT, Apr. 1993, Claim Chart.
Civil Action No. 2:09-CV-289-CE, Defendants Research in Motion Corporation and Research in Motion Limited's P.R. 3-3, Exhibit 72B: RIM Mobitex User's Handbook for the Mobidem AT, Apr. 1993, Claim Chart.
Civil Action No. 2:09-CV-289-CE, Defendants Research in Motion Corporation and Research in Motion Limited's P.R. 3-3, Exhibit 73A: The Hewlett Packard Palmtop System, Dec. 1991, Claim Chart.
Civil Action No. 2:09-CV-289-CE, Defendants Research in Motion Corporation and Research in Motion Limited's P.R. 3-3, Exhibit 73B: The Hewlett Packard Palmtop System, Dec. 1991, Claim Chart.

FIG. 5(a)

| Item | Size | Description |
|---|---|---|
| Header: | | |
| CRC | 2 bytes | Standard Cyclical Redundancy Code to verify data block integrity. |
| Header Type | 1 bit | If bit clear, then this is a message header. If bit set, then this is the data block header. |
| Custom Header Flag | 1 bit | If bit clear, no custom header. If bit set, then a custom header is included in the data block. |
| Version Number | 4 bits | Protocol version used. |
| Private Data Block Flag | 1 bit | If bit clear, then this data block will be passed on to the Alert Panel for processing and display. If bit set, then this is a private data block to be processed internally by the Communications Server. |
| Virtual Capcode Flag | 1 bit | If bit clear, then this data block is not targeted for a specific virtual capcode and no virtual capcode is included in the data block. If bit set, then this data block contains a virtual capcode. |
| Data Block Type | 1 byte | The value of this byte specifies the type of data contained in the data block. If Private Data Block Flag is clear: 1 = plain text, 2 = AirMedia Live data feed format. If Private Data Block Flag is set: 1 = Capcode reprogramming message, 2 = Binary file transfer. |
| Data Block Version | 4 bits | The version number of this data block's format. |

FIG. 5(b)

| Use Compression Flag | 1 bit | If bit clear, then this data block is not compressed. If bit set, then compression is used and the compression type is specified in the Compression ID item. |
|---|---|---|
| Use Encryption Flag | 1 bit | If bit clear, then this data block is not encrypted. If bit set, then this data block is encrypted. |
| Spare | 2 bits | Reserved for future use. |
| Compression ID (optional) | 1 byte | Included only if Use Compression Flag is set. Indicates the type of compression used. |
| Virtual Capcode (optional) | 1 byte | Included only if Virtual Capcode flag is set. Contains the virtual capcode to which this data block is targeted. |
| Size of Custom Header (optional) | 1 byte | Included only if Custom Header Flag is set. Contains the size in bytes of the custom header. |
| Custom Header (optional) | variable | Reserved for future enhancements to data block protocol. Size determined from previous item. |
| Contents: | | |
| Data Block Contents | variable | Information notification data from the information source to be processed by AirMedia Live software. |

FIG. 6

| Item | Size | Description |
|---|---|---|
| Header: | | |
| Alert Length | 1 byte | The size of the alert data in bytes. |
| Alert Type | 1 byte | The value of this item defines the alert type (e.g. new e-mail arrival alert). Up to 256 predefined alert types are allowed. |
| Contents: | | |
| Alert Data | variable | Personal alert notification data. Size of data is determined by the Alert Length item. |

FIG. 9

| Item | Size | Description |
|---|---|---|
| Header: | | |
| Packet Type | 4 bits | The value of this item indicates the packet type: 0 = Standard AirMedia Live Packet; 1 = Single Packet Data Block; if the left most bit (high bit) is set, then this is a Binary Alert Packet. |
| Data Block ID | 12 bits | The ID of the data block contained in this packet. |
| Contents: | | |
| Packet Contents | variable | The header and contents of the data block contained in this packet. |

FIG. 7

| Item | Size | Description |
|---|---|---|
| Header: | | |
| CRC | 2 bytes | Standard Cyclical Redundancy Code to verify message integrity. |
| Header Type | 1 bit | If bit clear, then this is a message header. If bit set, then this is the data block header. |
| Custom Header Flag | 1 bit | If bit clear, no custom header. If bit set, then a custom header is included in the message. |
| Data Block ID | 14 bits | ID of the data block to which this message belongs. |
| Message Number | 1 byte | The position of this message in the data block (i.e. message sequence number). |
| Total Messages | 1 byte | Total number of messages in the data block. |
| Size of Custom Header (optional) | 1 byte | Included only if Custom Header Flag is set. Contains the size in bytes of the custom header. |
| Custom Header (optional) | variable | Reserved for future enhancements to message protocol. Size determined from previous item. |
| Contents: | | |
| Message Contents | variable | The data portion of the message. |

FIG. 8

| Item | Size | Description |
|---|---|---|
| Header: | | |
| Packet Type | 4 bits | The value of this item indicates the packet type: 0 = Standard AirMedia Live Packet; 1 = Single Packet Data Block; if the left most bit (high bit) is set, then this is a Binary Alert Packet. |
| Total Packets Flag | 1 bit | If bit is clear, then the Total Data Packets and Total Error Correction Packets items are not present. If bit is set, then the Total Data Packets and Total Error Correction Packets items are present. |
| Message ID | 11 bits | The number of the message to which this packet belongs. |
| Packet Number | 1 byte | The position of this packet in the message (packet sequence number). |
| Total Data Packets | 1 byte | Total number of data packets in the message (does not include error correction packets). |
| Total Error Correction Packets | 1 byte | Total number of Reed-Solomon forward error correction packets in the message. |
| Contents: | | |
| Packet Contents | variable | The data portion of the packet. |

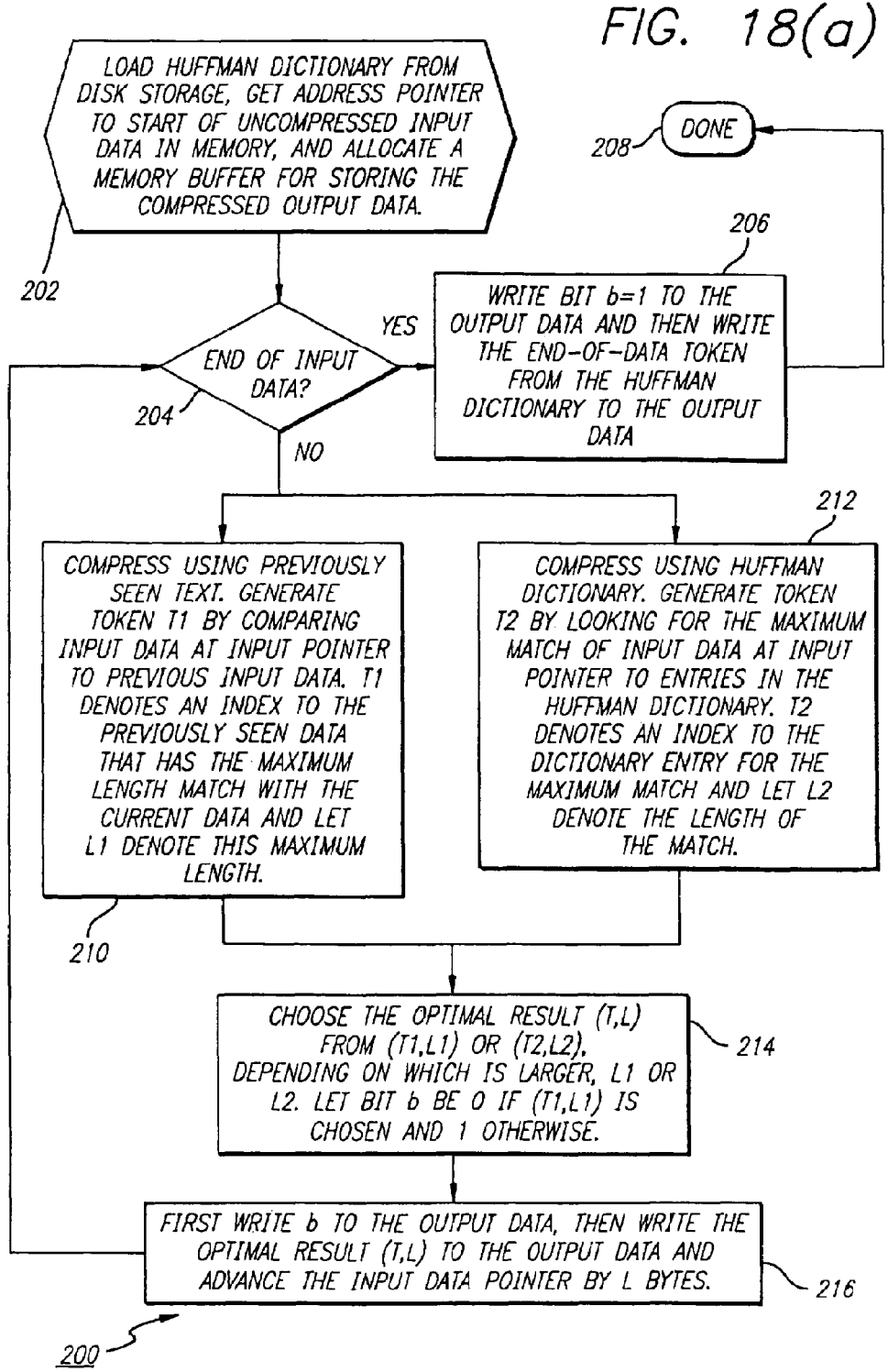

FIG. 24(a)

| Air Media Live | | 11/13/96 10:59AM |
|---|---|---|
| | MARKET SCOREBOARD | @QUOTE.COM |

| INDEXES VOLUME | CURRENCIES | FIFTEEN FAVORITES |
|---|---|---|
| Dow Jones 0  285,490 | Britain 1.8607 | T     37$^3_4$   5$_8$⇩ |
| | Canada 1.3339 | BLS  39$^7_8$   3$_4$⇩ |
| S&P 500 .09 | Germany 1.5043 | BEL  60$^7_8$   1$_4$⇩ |
| 729.65 ⇧ | Japan 111.32 | NYN  45$^1_8$   5$_8$⇩ |
| NASDAQ 3.60 | France 5.0830 | AIT  35$^1_8$   1$_8$⇩ |
| 1280.13 ⇧ | | |
| FT 100 7.40 | All quotes delayed | FIFTEEN |
| 3926.90 ⇧ | 15 minutes | ACTIVE TRADERS |
| | | WMT 6,396,700  24$^3_8$   3$_4$⇩ |
| Nikkei 2.22 | | T      5,179,400  37$^3_4$   5$_8$⇩ |
| 213.11 ⇧ | | WX   4,162,200  19$^3_8$  1 1$_4$⇩ |
| DJIA as of: | | MU   3,875,500  31$^3_8$   5$_8$⇧ |
| 11/13/96 13:54 (Eastern) | | CPQ  2,854,700  75$^7_8$  1 1$_2$⇧ |

STOCKS   FIFTEEN FAVORITES–NYSE  T 37$^3_4$ –$^5_8$  BLS 39$^7_8$ –$^1_4$

NEWS  Dow Jones is down 30 points.

SYSTEM AND METHOD FOR TRANSMISSION OF DATA

RELATED APPLICATION INFORMATION

This patent is a continuation of application Ser. No. 11/409,396, filed Apr. 21, 2006, which issued as U.S. Pat. No. 8,489,707.

Application Ser. No. 11/409,396 is a continuation of application Ser. No. 09/350,467, filed Jul. 9, 1999, which issued as U.S. Pat. No. 7,035,914. U.S. Pat. No. 7,035,914 was subject to reexamination, Control No. 90/009,906, in which the patentability of all subject claims was confirmed.

Application Ser. No. 09/350,467 is a continuation of application Ser. No. 08/788,613, filed Jan. 24, 1997, which issued as U.S. Pat. No. 6,021,433. U.S. Pat. No. 6,021,433 was subject to reexamination, Control No. 90/009,904, in which the patentability of all subject claims was confirmed.

Application Ser. No. 08/788,613 claims the benefit of: Provisional Application No. 60/010,651, filed on Jan. 26, 1996; Provisional Application No. 60/014,341, filed on Mar. 29, 1996; Provisional Application No. 60/014,735, filed on Apr. 1, 1996; and Provisional Application No. 60/026,471, filed on Sep. 23, 1996.

Application Ser. No. 11/409,396 has two other continuations: application Ser. No. 13/018,420 filed Jan. 31, 2011, and application Ser. No. 13/018,421 filed Jan. 31, 2011.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD OF THE INVENTION

The present invention relates generally to communication systems, and more particularly to both wired and non-wired data transmission communication systems.

BACKGROUND OF THE INVENTION

Undoubtedly, computers, communications and information are driving forces in society today. The most significant advances in computers, communications and information have been in the areas of multimedia, wireless and on-line services, respectively. Each of these technologies have produced significant benefits and have effected nearly everyone's life in one way or another.

In particular, more than 100 million personal computers are equipped with multimedia hardware and software and nearly every new personal computer manufactured today is shipped with some form of multimedia. Multimedia has made the computer much more than a number crunching, word processing tool. Rather, multimedia has turned the computer into an indispensable educational, entertainment and information tool. By combining the realism of sound, graphics and video, multimedia applications have revolutionized the way individuals work, entertain and stay informed. Multimedia has also helped drive the computer industry to provide tools which can be used by the most novice computer user making computers almost as prevalent in our society as television or radios. Also, multimedia has driven manufacturers to build smaller and more powerful and mobile systems—leading a technological revolution not matched in our history.

Moreover, wireless communication technology has allowed individuals to be notified anywhere and anytime of information. Wherever an individual is, i.e. whether away from the office or in the car, he or she can be informed of information, such as new meeting schedules, dinner plans or even life or death emergencies.

Additionally, on-line services have revolutionized the distribution of information in our society by making available, to individuals throughout the world, endless amounts of information on every subject imaginable. The Internet and on-line services have brought together the world through a linkage of interconnected computer systems which can share information almost instantaneously.

These technologies suffer from numerous disadvantages, however. The benefits of wireless technology have only been utilized for personal messaging offering limited message lengths and have never been utilized as a computer peripheral, limiting the benefit of instant anytime anywhere to personal messages of limited length and value. Consequently, information which is sent is typically old and historic.

Moreover, while popular in education and business markets, multimedia has yet to find widespread application in the consumer market. While valuable in education and business circles, the average home user has little use for sound and full motion video. As the number of information providers continue to expand throughout the world, the amount of time and effort required to find information becomes exponentially longer.

In particular, the interface to on-line services is often difficult and intimidating to novice computer users. As a result, the benefit of this valuable source of information is thus not available to them. For example, despite the wealth of information available, users are required to search through the myriad of information, rather than having the information come to them. Consequently, information is often missed.

Furthermore, immediate notification of information is not available. For example, users who use computer related services, such as electronic mail (E-mail), do not receive instant notification when new mail is received. As a result, urgent E-mail will sit unnoticed in an electronic mailbox.

Another major problem is that data transmitted over existing wireless broadcast networks suffer from inevitable degradation. Traditional paging, being a one-way transmission, can use only forward error correction (FEC) on data packets. Many existing paging networks use Motorola's FLEX™, POCSAG or other wireless protocol's error correction/detection capabilities. Although these industry standard protocols provide error detection capabilities, many of them are not able to deal with burst errors or errors due to loss of synchronization. Since these protocols cannot correct all possible errors, some of the data packets will arrive with errors or simply get lost. In most cases, truncated packets and lost packets account for the vast majority of errors after decoding.

Similar problems exist with other forms of wireless communication systems as well.

What is needed therefore is a system and method for data transmission, which combines the benefits of multimedia, wireless and wired on-line services while addressing and overcoming their limitations.

SUMMARY OF THE INVENTION

The preceding and other shortcomings of prior art methods and systems are overcome by the present invention which provides a system and method for data communication connecting on-line networks with on-line and off-line computers. In particular, the present system provides for broadcast of up to the minute notification centric information thereby providing an instant call to action for users who are provided with the ability to instantaneously retrieve further detailed information. Throughout the day, various pieces of information happening around the world are currently available in a sender initiated paradigm where individuals have to seek out the information. In accordance with the present invention, the notification centric portions of that information that lives in an electronic medium is wirelessly broadcast on a nationwide basis to wireless receiving devices which are attached to personal computers or other computing devices. Upon receipt of the information at the personal computer, the user is notified through different multimedia alerts that there is an incoming message. Wirelessly broadcasted URL's, associated with the data, are embedded in data packets and provide an automated wired or wireless connection back to the information source for obtaining detailed data.

The present invention unlike other wireless systems provides for a combination of broadcast, narrowcast and pointcast transmission. That is, information can be transmitted wirelessly to everyone (broadcast), to a subset of users (narrow cast) or to one user (pointcast). The present invention furthermore provides multiple viewers which listen to the airwaves and have the ability to filter against the broadcast with specific action. A message server provides different types of filters with the ability to parse data. Additionally, the message server is designed such that third party developers can write different types of multimedia viewers which can easily be downloaded to the user system and automatically registered with the message server. The viewers can thus be controlled through the interface of the present invention and multiple viewers and multiple controllers of such viewers can dynamically be added and controlled. Moreover, since the messages are encoded for multimedia events, the viewers of the present invention have capability to do different things for multimedia, such as sound, video, animation and so forth.

In operation, data parsed from a plurality of incoming data feeds from existing information sources is prepared for optimized wireless transmission and then transmitted nationwide to connected and non-connected computing devices thereby extending the reach of existing information sources, such as Internet and on-line services. On the user end, once data is received, a global communications server recombines, decodes, decrypts and decompresses the incoming data. When a complete data message is formed, the communications server sends a message to the user interface alert panel causing an animated icon to fly to the alert panel notifying a user that a new message has arrived. Upon clicking the icon, the appropriate viewer is launched. Users can then display the context of the data on their computers. Based on preferences set by the user with respect to sound, video and animation, users can be alerted to incoming messages. Wirelessly broadcasted URL's and on-line addresses, associated with the data, are embedded in multimedia viewers and provide an automated wired connection/link back to the information sources to obtain detailed information. Information, such as advertisements and promotional broadcasts, can be embedded in a multimedia viewer as well as automatically activated on a scheduled or triggered basis. Information is thus modified and updated instantaneously and wirelessly. Additional information services can be activated wirelessly through broadcast activation codes which can enable or disable services.

The present invention also provides a method based on Reed-Solomon code which is used to derive redundant data packets thereby minimizing redundancy, and maximizing flexibility and packet recovery ability.

In accordance with another embodiment of the invention, the information provided from the information sources and transmitted to the central broadcast server to be consolidated in accordance with the present invention and then transmitted wirelessly nationwide to personal computers and other computing devices can also be sent simultaneously via a wired connection to the same personal computers and computing devices having Internet/World Wide Web (WWW) access (direct or via on-line service providing Internet and Web access).

The foregoing and additional features and advantages of this invention will become apparent from the detailed description and accompanying drawing FIGUREs that follow. In the figures and written description, numerals indicate the various features of the invention, like numerals referring to like features throughout for both the drawing figures and the written description.

DESCRIPTION OF THE DRAWINGS

FIG. 5(a) is a table illustrating the 8-bit binary format for information notification data blocks;

FIG. 5(b) is a table illustrating the 8-bit binary format for information notification data blocks as illustrated in FIG. 5(a);

FIG. 6 is a table illustrating the 8-bit binary format for personal alert notification data blocks;

FIG. 7 is a table illustrating the 8-bit binary format for messages;

FIG. 8 is a table illustrating the 8-bit binary format for packets;

FIG. 9 is a table illustrating the 8-bit binary format for single packet data blocks;

FIG. 18(a) is a flow chart of an algorithm for data compression which combines-Huffman compression and dictionary-based compression in accordance with the present invention;

FIG. 24(a) is a depiction of a market scoreboard viewer.

DETAILED DESCRIPTION OF PREFERRED EMBODIMENTS

Figure 1:
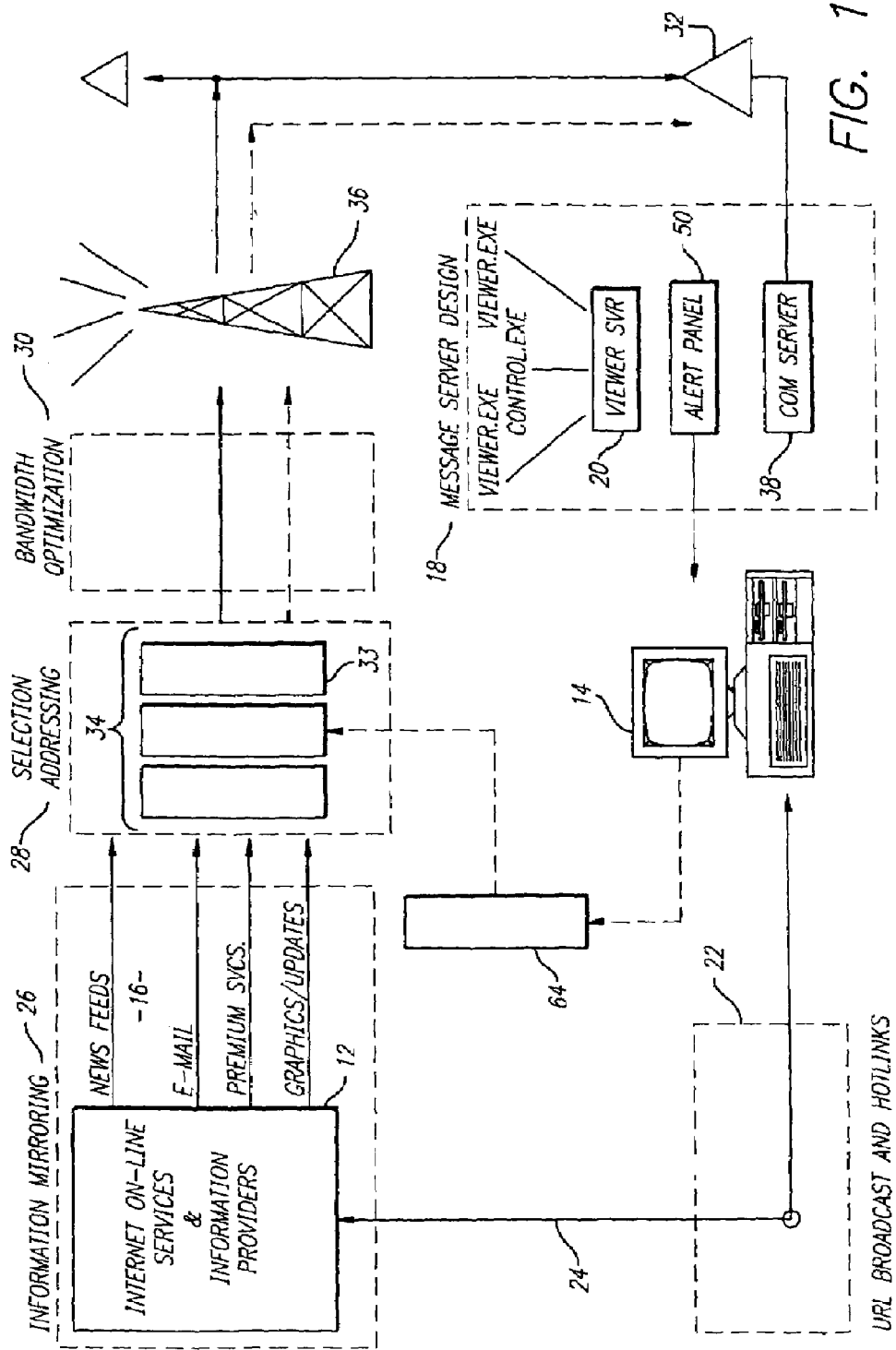
FIG. 1 is schematic diagram of a wireless communication network including information mirroring, selection addressing, bandwidth optimization, message server design and URL broadcast and hotlinks in accordance with the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Referring to FIG. 1, a wireless communication system 10 including selection addressing 28, connecting on-line information sources 12 with on- and off-line computers, such as personal computer 14, is illustrated. In accordance with the present invention, the wireless communication system 10 turns a personal computer 14 or other computing device into a personal wireless information and messaging center. Although the present invention may be used to interact wirelessly with any computing device, for illustrative purposes, the present invention will be described and illustrated utilizing a personal computer 14. One skilled in the art will recognize that computing devices may include consumer electronic devices including computing capabilities. The data/information which is transmitted in accordance with the present invention may be in the form of voice (audio), video, data or a combination thereof.

In particular, the present system provides for broadcast of up to the minute notification centric information thereby providing an instant call to action for users who are provided with the ability to instantaneously retrieve further detailed information. Throughout the day, various pieces of information happening around the world are currently available from information sources 12 in a sender initiated paradigm where users have to seek out the information. In accordance with the present invention, the notification centric portions of that information that lives in an electronic medium is wirelessly broadcast on a nationwide basis to wireless receiving devices 32 which are connected to personal computers 14 or other computing devices. Upon receipt of the information at the personal computer 14, the user is notified through different multimedia viewers 20 that there is an incoming message. The message can be of something that is happening at the present moment anywhere around the world. Included with the broadcast that is wirelessly sent to the user is the Internet address and location of the detail of that message. By clicking on a button within the multimedia viewer 20 that notified the user that a message came in, the present invention will automatically make a wired connection to the information source 12 utilizing the user's preferred on-line browser which will direct the user to the particular location on the Internet service provider where the user can receive detailed information.

The information source 12 may be a private Internet provider such as Quotecom, corporate Internet provider or an on-line service provider such as America On-Line, Compuserve, Prodigy, the Microsoft Network, and the like. A browser is a known software tool used to access the information source 12 via the providers. Known browser software includes Netscape, Netscape Navigator, Microsoft Explorer, Mosaic and the like. The present invention is designed to operate with any of these known or developing web browsers.

Additionally, the present invention unlike other wireless systems provides for a combination of broadcast, narrowcast and pointcast transmission. That is, information can be transmitted from a central broadcast server 34 wirelessly to everyone (broadcast), to a subset of users (narrow cast) or to one user (pointcast). One skilled in the art will recognize that the central broadcast server 34 operates effectively as a network operations center. The present invention furthermore provides multiple viewers 20 which listen to the airwaves and have the ability to filter against the broadcast with specific action. A message server provides different types of filters with the ability to parse data. The filters control which messages are handled by a particular viewer 20. Additionally, the message server is designed such that third party developers can write different types of multimedia viewers 20 which can easily be downloaded to the user system and automatically registered with the message server. The viewers can thus be controlled through the interface of the present invention and multiple viewers 20 and multiple controllers of such viewers can dynamically be added and controlled. Moreover, since the signals are encoded for multimedia events, the viewers 20 of the present invention have capability to utilize multimedia capability.

As will be described in detail below, data parsed from a plurality of incoming data feeds 16 from existing information sources 12 is wirelessly transmitted by the central broadcast server 34 nationwide through a commercial wireless carrier 36 to connected and non-connected computing devices 14 thereby extending the reach of existing information sources 12, such as Internet and on-line services. On the user end, once data is received, the message server design 18 recombines, decodes, and decompresses the incoming data. When a complete data message is formed, a communications server 38 in the message server design 18 notifies a user interface alert panel 50 which presents an icon, which when clicked, notifies appropriate viewers 20 which are registered to display particular data. Users can then display the context of the data on their computers 14. Based on preferences set by the user with respect to sound, video and animation, users can be alerted to incoming messages. Wirelessly broadcasted Uniform Resource Locator's (URL's) 22, associated with the data, are embedded in multimedia data packets and provide an automated wired or wireless connection or link 22 back to the information source 12 for obtaining detailed data. A network path to an information source 12 is identified by the URL having a known syntax for defining a network. Data, such as advertisements and promotional broadcasts, can thus be embedded in a multimedia viewer as well as automatically activated on a scheduled or triggered event. Moreover, an advantage of the present invention is that data can be modified and updated instantaneously and wirelessly. Additional services can be activated wirelessly and existing services disabled through broadcast activation codes which can enable or disable addresses thus turning services on and off.

Another advantage of the present invention is that a remote computer 14 can receive information instantly—even while it is off-line (i.e. not connected to the Internet or some other on-line service). Thus, a user has the ability to receive "on-line" information even when the user is "off-line". In accordance with another advantage of the present invention, a user can simultaneously, using the same computer 14, work on a conventional application, such as a spreadsheet or word processing program, and monitor information which is being transmitted wirelessly.

The user computer 14 of the present invention includes a microprocessor connected to a system bus and supported by read only memory (ROM) and random access memory (RAM) which are also coupled to the system bus. The RAM is the main memory into which the operating system and application programs are loaded. The RAM may also support Internet services, including but not limited to the file transfer protocol (FTP) and simple mail transfer protocol (SMTP) or E-mail. A CD ROM, which is optional, is connected to the system bus and is used to store a large amount of data. Various I/O controllers, including but not limited to the video controller, audio controller and mouse controller may also be connected to the system bus. A modem enables communication over a network to other information sources or computers. The operating system of the computer may be Windows '95™, WINDOWS NT™ or any other known and available operating system.

In the preferred embodiment of the invention, the user computer has a 486 PC or higher processor, 16 MB of RAM, Windows 95 operating system, at least 20 MB available on hard disk for storing the executable programs, support files and databases, sound and video cards, monitor, mouse or other equivalent pointing device, an ISA slot for receiving an internal 16 Bit ISA receiver card, or serial port. The receiver card installed in the ISA slot in the user computer 14 interacts with the wireless receiver 32. The wireless receiver may also be accessed via the serial port. One skilled in the art will recognize that the present invention is not limited to the particular configuration discussed above. Rather, the present invention may be implemented on other computer systems and configurations, including but not limited to Macintosh or Unix computers, televisions, telephones, appliances and so forth.

The wireless communication system 10 of the present invention includes information mirroring 26, selection addressing 28, bandwidth optimization 30, receiving means 32, message server design 18 and URL broadcast and hot links 22.

Information Mirroring.

As is illustrated in FIG. 1, information sources 12, such as the Internet, on-line services and other information sources, provide data feeds, including real time data feeds, to a network of servers 33 in the central broadcast server 34. These data feeds, once they have been parsed, compressed, encrypted and packetized based on feed and data type, provide the basis for outgoing broadcast sent immediately or on a scheduled basis. The data feeds include but are not limited to, electronic mail (E-mail) and other personal alert notifications, news, sports, and financial stories, premium and special event feeds, advertisements/promotions, graphics, sounds, and scheduled updates. The data feeds generated by the information sources 12 are in digital form and divided into one or more data packets.

Figure 2:
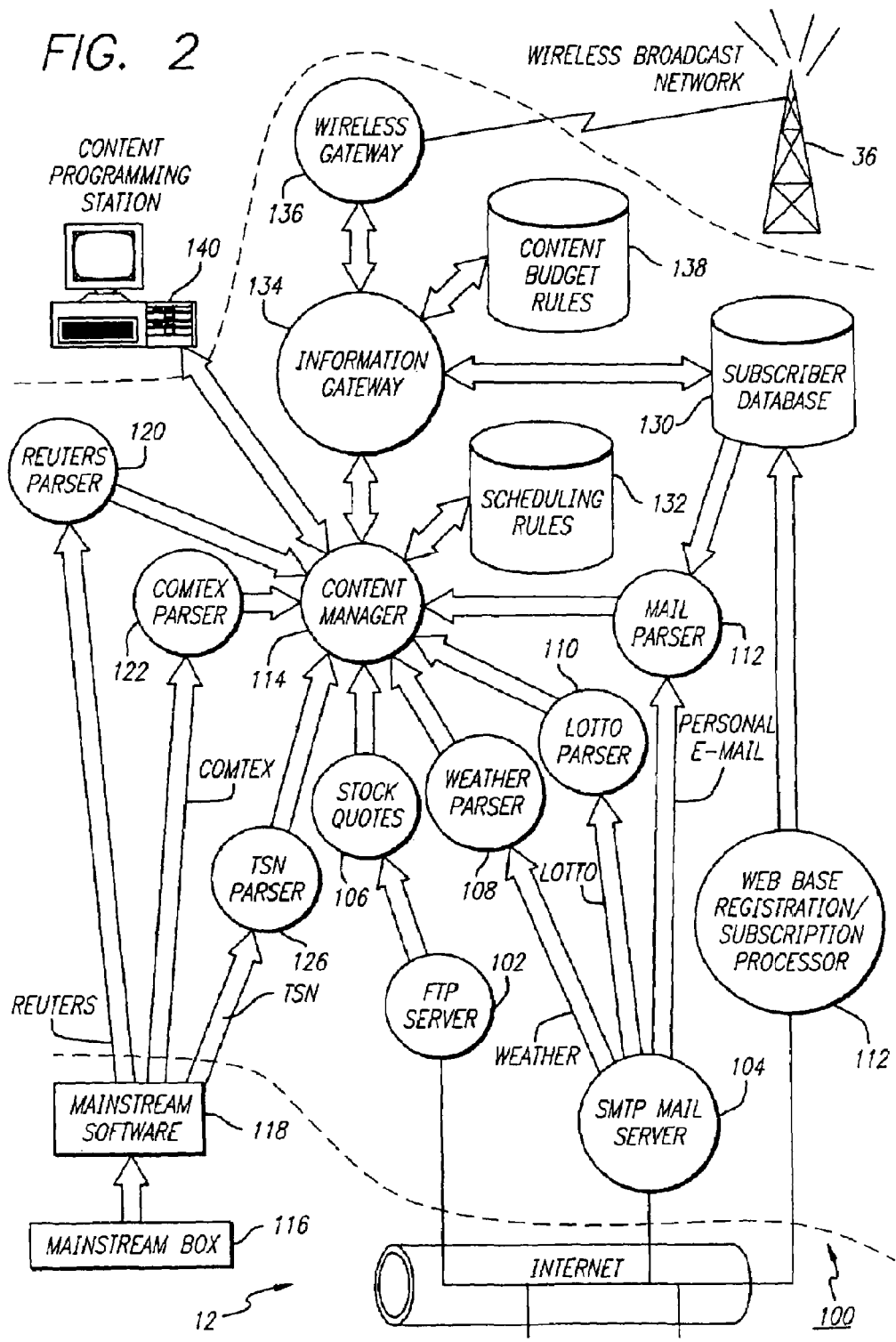
FIG. 2 is a block diagram of the wireless communication network illustrated in FIG. 1.

Referring to FIG. 2, a block diagram 100 of the software architecture for communications between the information sources 12 and central broadcast server 34 prior to transmission to users is illustrated. Referring to FIGS. 1 and 2, information sources 12 provide data feeds to the central broadcast server 34 which performs selection, scheduling and addressing 28. In particular, real time data feeds from the Internet 13 in the information source 12 are provided to a network of servers 33 in the central broadcast server 34, such as the FTP server 102 and the SMTP server 104 illustrated in FIG. 2. The data, which can include but is not limited to stock quotes, weather, lotto, E-mail, etc. is then respectively parsed by parsers, such as the stock quote parser 106, weather parser 108, lotto parser 110 and mail parser 112, and then transmitted to the content manager 114 located in the central broadcast server 34. Data is also provided to the central broadcast server 34 by sources 116 which provide software and hardware for a mainstream connection, via FM radio, with the source 118. This kind of data is also parsed by various parsers, such as Reuters 120, COMDEX 122 and TSN 126. The present invention is not limited to the information sources or parsers described herein. Rather, any type of information source and corresponding parser may be used. The parsed data is then transmitted to the content manager 114.

The central broadcast server 34 also provides a registration/subscription processor 128 via the World Wide Web (WWW) database or alternatively, other means. The WWW is a collection of servers of the Internet that utilizes the Hypertext Transfer Protocol (HTTP). Through the registration/subscription processor 112, a user can register and subscribe to receive broadcasts provided by the present invention via the user computer 14. The information provided by the user is transmitted to a subscriber database 130 which is utilized by the central broadcast server to determine which subscribers receive which types of content.

Referring to FIG. 2, the content manager 114 determines how different types of information are handled. In particular, it specifies priorities for different types of information, and decides which pieces of information will be transmitted and which will be rejected. It also applies scheduling rules 132 to determine when messages should be scheduled to be transmitted to the user. In addition, the content manager 114 is responsible for determining what format the information should be sent in, what compression method to use, and who information should be sent to. The compression method and format are determined by the type of information. When and if the information should be sent, who it should be sent to, and the priority of the information are determined based on the type of information, the time of day, the day of the week, and the specific date. So, for example, these rules could be used to specify that certain news feeds go to premium subscribers only except during certain hours of the day. Or it could be used to say that stock quotes are a low priority during hours the stock exchanges are closed, on Saturday and Sunday, and on market holidays. The content manager 114 also has the ability to detect and remove duplicate messages.

The content manager 114 communicates with the information gateway 134 which is responsible for resolving logical information inside the system to physical information needed for the wireless gateway 136. In particular, the information gateway's 114 duties include, but are not limited to: resolving service identifications (ids) and addresses from a logical address and managing the content budget rules 138 to ensure that the total content quota is not exceeded. The content budget is based on the number of bytes which may be transmitted in an hour. The algorithm used manages the budget by evaluating the total bytes allowed in the hour, the priority of the information, the total bytes sent so far in the hour and the maximum instantaneous rate at which information may be sent to determine whether to send a message. The goal being to ensure that sending low priority information early in the hour will not prevent high priority information from being sent late in the hour. Since the input to the information gateway 134 is primarily logical, it could be exchanged for an information gateway 134 which could send the information to be transmitted over another medium, such as the Internet. In addition, the information gateway 134 enforces priorities to ensure that higher priority information is sent before lower priority information.

Figure 3A:
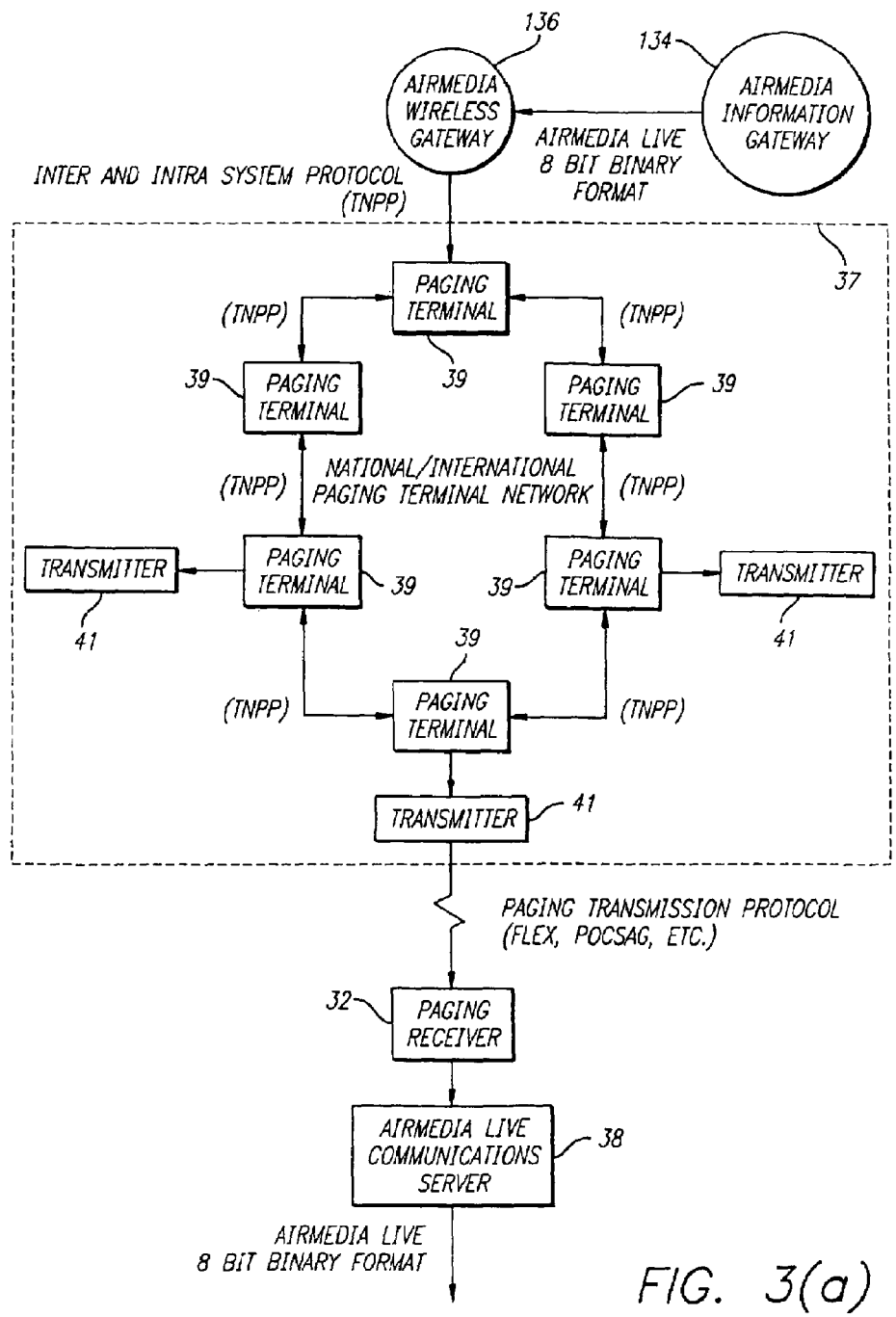
FIG. 3(a) is a block diagram of the head-end high-level software architecture for communication over a paging network in accordance with the present invention.
Figure 3B:
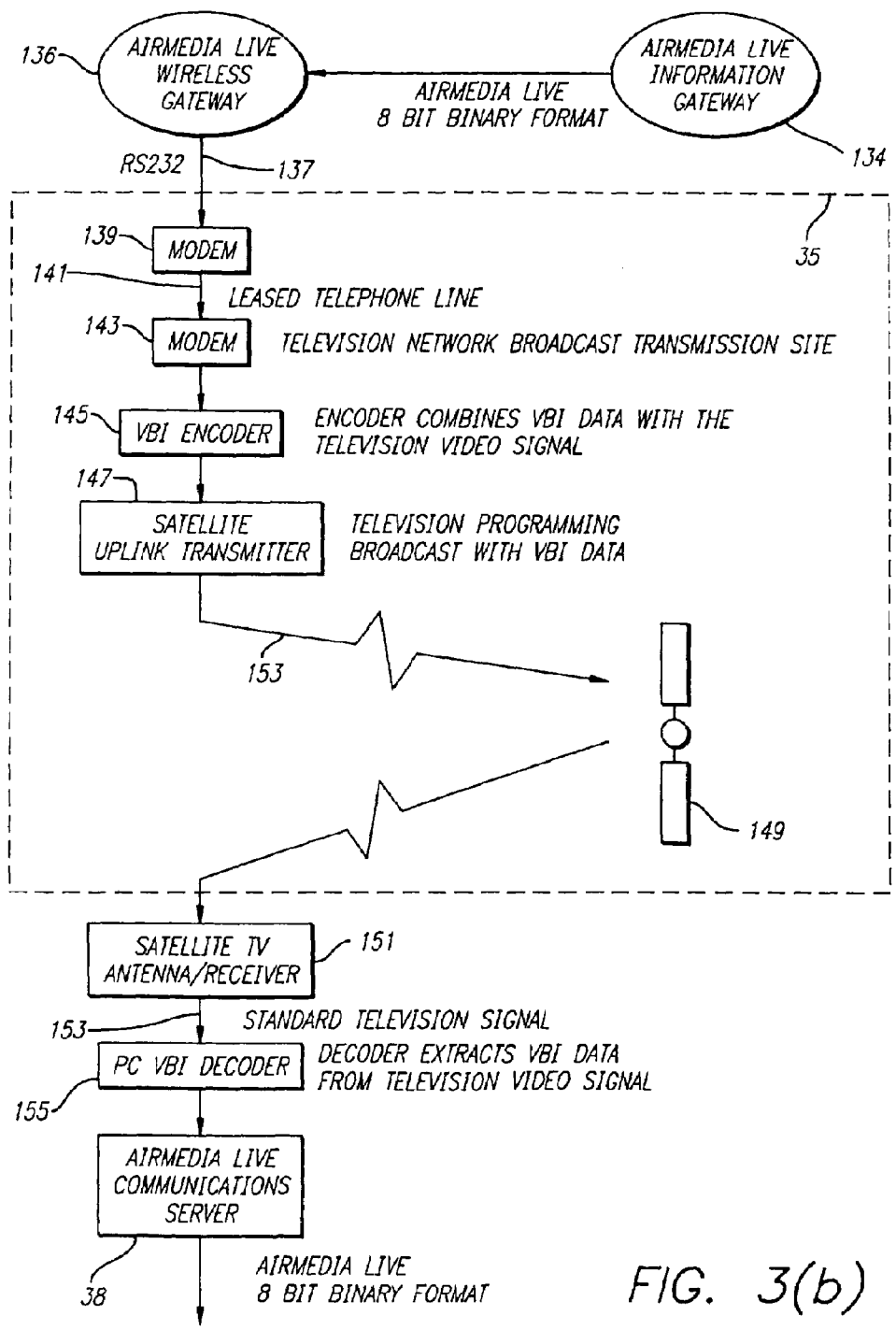
FIG. 3(b) is a block diagram of the head-end high-level software architecture for communication over a Vertical Blanking Interval (VBI) in accordance with the present invention.

In accordance with the present invention, the wireless gateway 136 prepares data blocks for transmission over a wireless broadcast network, including but not limited to transmission via a paging network (FIG. 3($a$)), Vertical Blanking Interval (VBI) (FIG. 3($b$)) or satellite (FIG. 3($c$)), narrow and broadband PCS, GSM, VSB television, cellular and other developing wireless technologies. One skilled in the art will recognize that the data blocks can be transmitted by a digital, analog or FM subcarrier. The present invention is designed to operate with any of the above known or developing transmission networks.

In particular, referring to FIG. 3($a$), a block diagram of the head-end high-level software architecture for transmission over a paging network 37 in accordance with the present invention is illustrated. The paging network 37 allows information to be transmitted over paging frequencies to paging receivers 32 which are connected to a user computer 14. The wireless gateway 136 transmits information to a plurality of paging terminals 39 which transmit the information to paging transmitters 41. In turn, the paging transmitters 41 transmit the information to receivers 32, which only receive information having specific addresses as noted in detail below. The paging terminals 39 and transmitters 41 are preferably located nationwide to provide information access to all users. Paging terminals communicate with one another via the Inter and Intra System Protocol (TNPP). Information is typically received at a paging terminal 39 and eventually transmitted to a separate paging transmitter 41 through a radio control link. One skilled in the art will recognize that the link between the paging terminal 39 and the radio controlled link to the paging transmitters 41 can be a satellite link. In particular, information from the paging terminal 39 is transmitted to a satellite via an uplink. The information is then modulated onto the carrier of the radio control link for transmission to the paging transmitters 41. One skilled in the art will recognize that any commercial paging carrier which can transmit information wirelessly can be utilized in accordance with the present invention.

Figure 25:
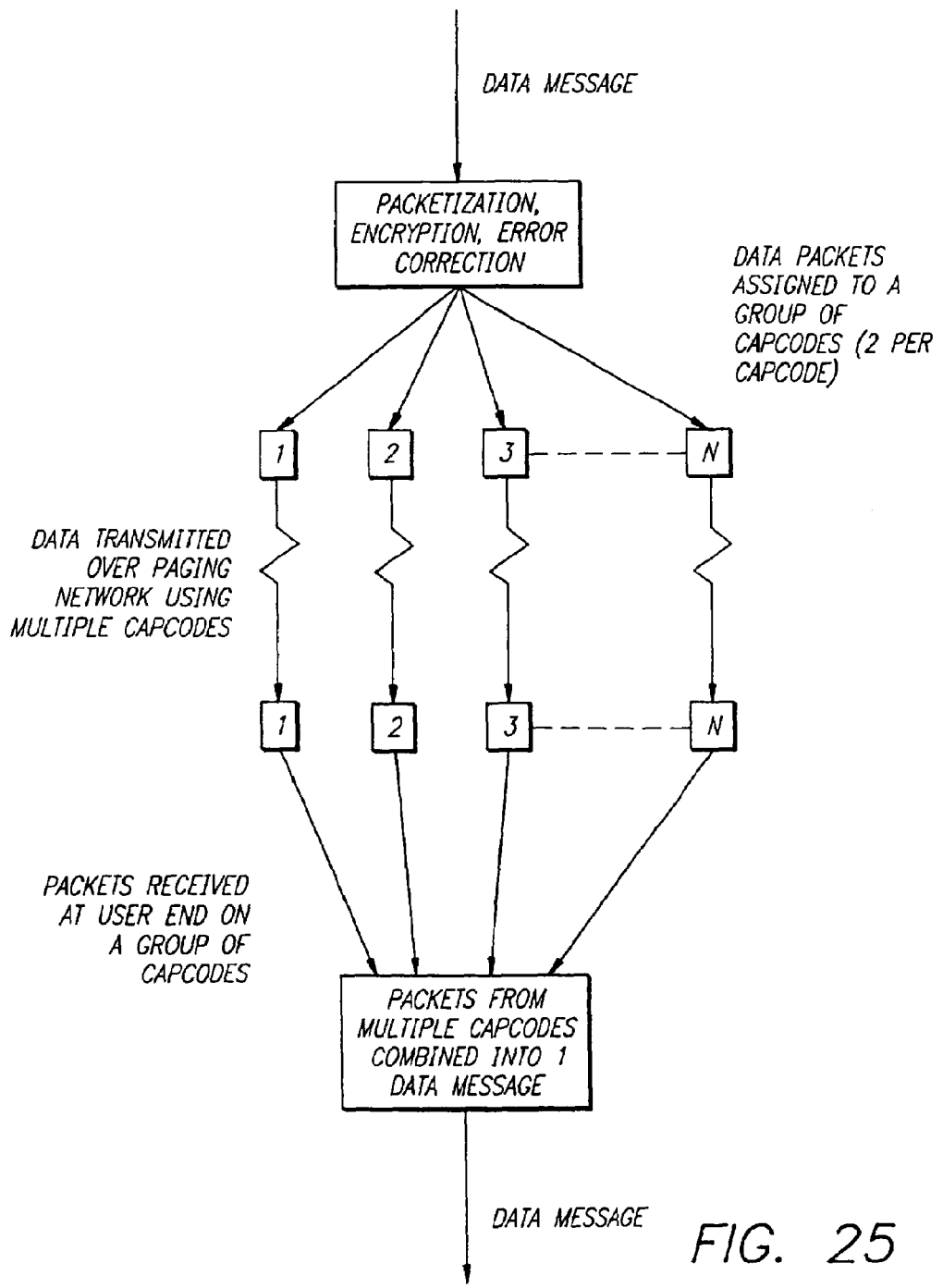
FIG. 25 is a flow chart of the algorithm for multiplexing a data message.

Referring to FIG. 25, in accordance with an advantage of the present invention, to overcome the paging network limitation on the amount of data that may be sent to a single address, or capcode in paging terminology, messages are sent on groups of pooled addresses and received at the user end on corresponding pools of addresses. Thus, information is multiplexed over multiple addresses but is reassembled at the user end as if sent to a single address. This allows utilization of available network bandwidth that could not be utilized with a single address.

In particular, the data to be transmitted over a paging network 37, such as that illustrated in FIG. 3($a$), first goes through a process of packetization, encryption, compression and forward error correction methods, as described in detail below. The output of this process is 1 to n number of data packets, depending on the level of error correction, and type of compression/encryption applied to the data. The paging network addresses an individual or group by broadcasting on a particular address or capcode. By programming a paging device to listen to the individual capcode, the device is then capable of receiving the particular message. The inherent problem with the FLEX protocol which is used by major paging carriers is that there is a limit to the number of messages which can be sent to any one particular capcode at a time. In accordance with FLEX encoding rules, only 2 messages per capcode can exist at any one time in a particular FLEX frame, which is approximately 1.875 seconds. A typical data message sent over a paging carrier is broken down into 16 individual data packets. If only one capcode is transmitted, it would take (16 packets/message)*(½ frame/packet) *(1.875 sec/frame)=15 seconds/message. This is a relatively slow rate and only utilizes a small fraction of the FLEX frame. A FLEX frame is capable of transmitting on four different phases or channels at a particular time, hosting several messages per frame. The FLEX encoding rules only specify the maximum messages per capcode frame, but there is no limit set to the number of capcodes.

Referring to FIG. 25, in accordance with an advantage of the present invention, the data message is multiplexed over a number of capcodes (i.e. uses multiple capcodes to send one message). Using the previous example, the present invention would send the 16 packets of the data message to 8 different capcodes. Thus, it would take (16 packets/message)*(½ capcodes/message)*(⅛ frame/capcode)*(1.875 sec/frame)= 1.875 sec/message. The data rate is approximately 8 times faster and fully utilizes the FLEX frame. Although the relationship between the capcode and the packet id number is arbitrary, the server software assigns the packets in a "round-robin" fashion, assigning packets 1-8 to capcodes 1-8, respectively, and packets 9-16 to capcodes 1-8, respectively.

At the user end, the software decodes the messages in a similar manner. A user would subscribe to a particular service, which essentially translates into a set of capcodes which are programmed into the receiving device 32 (FIG. 3($a$)). The receiving device 32 then receives the packets which are transmitted to that particular set of capcodes. Thus, for example, the user software would initialize the receiving device 32 with the same 8 capcodes as on the transmit side. The packets received with those 8 capcodes would then be combined into the original data message.

Referring to FIG. 3($b$), a block diagram of the head-end head-level software architecture for transmitting data over a Vertical Blanking Interval (VBI) of a television signal 135 in accordance with the present invention is illustrated. The wireless gateway 136 transmits information through a standard RS232 interface 137 and modem 139, which through a telephone line 141 communicates with a modem 143 at a television network broadcast transmission site. The information is forwarded from the modem 139 to a VBI encoder 145 which combines the VBI data with a standard television video signal 153. The encoded data is then forwarded to a satellite uplink transmitter 147 which transmits the television signal 153 to a satellite antenna/receiver 151 via satellite 149. A VBI decoder 155 then extracts the data from the television video signal and performs physical device addressing. The VBI encoder and decoder may be any commercially available encoder and decoder designed for VBI transmission. The communications server 38 is modified to interface with the driver for the VBI decoder 155 which is provided by the manufacturer of the decoder hardware.

Figure 3C:
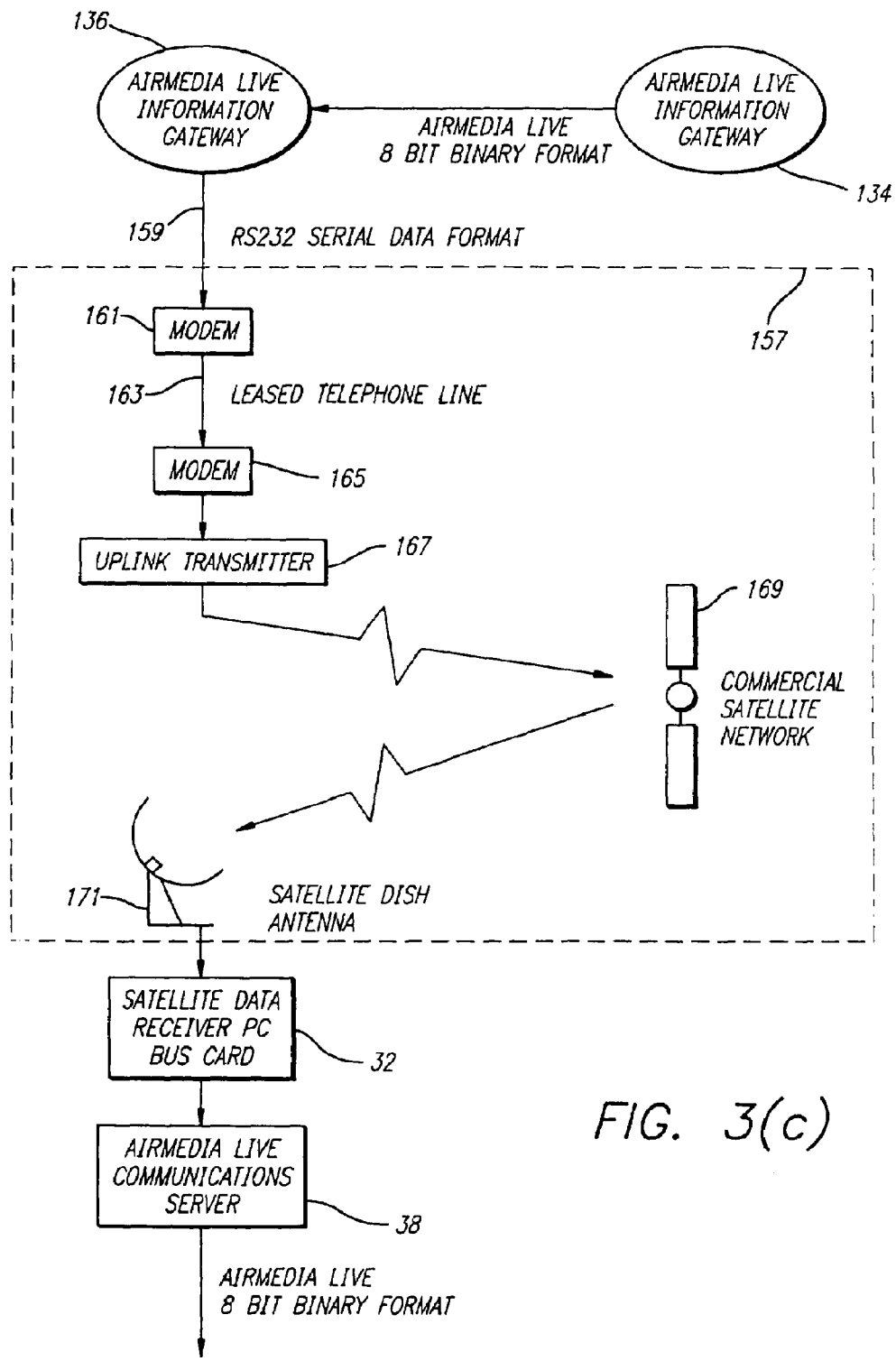
FIG. 3(c) is a block diagram of the head-end high-level software architecture for communication via satellite in accordance with the present invention.

Referring to FIG. 3(c), a block diagram of the head-end high-level software architecture for transmission via a satellite-based system 157 in accordance with the present invention is illustrated. The wireless gateway 136 transmits information through a standard RS232 interface 159 and modem 161, which through a telephone line 163 communicates with a satellite modem 165. The information is forwarded from the satellite modem 165 to an uplink transmitter 167 which transmits the data to a satellite dish or antenna 171 via satellite 169. In particular, the satellite dish or antenna 171 receives the RF signal from the satellite 169. A standard satellite receiver PC card 32 converts the RF signal into PC compatible data. The communications server 38 is modified to interface with the receiver card driver provided by the manufacturer of the receiver PC card 32 to receive data from a standard satellite data receiver.

The content manager 114 utilizes a content programming station 140 to control the content of programming. The content programming station 140 allows a programming manager (not shown) to alter the rules used by the content manager 114. The content programming station 140 will also be used to review and alter content schedules and schedule ad hoc messages. For example, if there are news feeds which must be manually filtered to locate acceptable content, the news feeds would appear at the content programming station 140 for the program manager to review.

Figure 4:
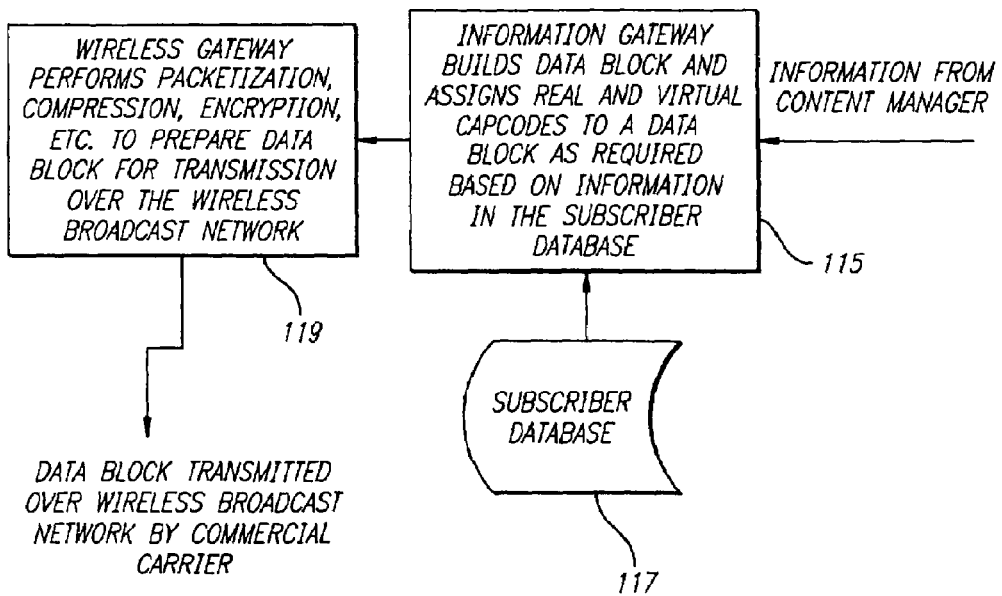
FIG. 4 is a flow chart illustrating the transfer of data from the content manager to the wireless broadcast network.

A flowchart illustrating the algorithm for implementing the processing of data prior to transmission is illustrated in FIG. 4. Information from the content manager is initially applied to the information gateway 134 (step 115) which resolves its logical destination address to a physical wireless address based on information in the subscriber database (step 117). The data is then applied to the wireless gateway 136 which creates the data block, performs packetization, compression, encryption, and so forth to prepare the data block for transmission over the wireless broadcast network (step 119). The data block is then transmitted over the wireless broadcast network by the commercial carrier 26.

Information Mirroring.

Data is transmitted from an information source to the central broadcast server 34 as discrete message blocks using E-mail or a well-known high speed protocol such as the Transport Control Protocol/Internet Protocol (TCP/IP). (See Corner, D. E., "Internetworking with TCP/IP, Vol. 1: Principles, Protocols, and Architecture, Second Edition", Prentice Hall, Englewood Cliffs, N.J. (1991).) In particular, each data packet transmitted by the information source 12 includes a header, packet data and information to ensure proper transmission to the central broadcast server 34. Additionally, an error correction code is typically added to each packet prior to transmission. The data block is broken down into messages and messages are broken into packets. Each packet is accompanied by a message id and a sequence number. All packets belonging to the same message contain the same message id. A sequence number denotes the position of the packet inside the group. Some packets will also carry the total number of packets belonging to the message. Each packet header includes the following: packet type (4 bits), total packets included (1 bit), message identifier (11 bits) and packet sequence number (1 byte).

Although the preferred transmission protocol from information source to the central broadcast server 34 is TCP/IP, it will be appreciated by those skilled in the art that many other standard or application specific protocols, such as the Open Systems Connection (OSI), may be used as well.

The information sources 12 thus provide the information basis for outgoing broadcast transmitted by the central broadcast server 34 through nationwide wireless broadcast network immediately or on a scheduled basis to both on- and off-line computers 14. When the central broadcast server 34 receives the data packets from the information source 12, it pre-processes the data packets and wirelessly transmits the data packets to both on- and off-line computers 14. Consequently, computer users receive real time notifications of information, including but not limited to breaking headlines, sport scores, weather disasters, financial information and even the arrival of new electronic mail. It will be understood by one skilled in the art that the information consolidated at the central broadcast server 34 may additionally be sent via a wired connection to a personal computer or computing device.

Referring to FIG. 1, information sources 12 also receive requests from remote personal computers 14 or other computing devices for more detailed information. Wirelessly transmitted URL's 22, associated with incoming information, are embedded in the broadcast message from the central broadcast server 34, which is displayed in the multimedia viewers 20 and provide an automated direct wired or wireless line connection 22 back to the information source 12 such that detailed data may be automatically downloaded to the user's computer 14.

As illustrated in FIG. 1, data generated by the information sources 12 is fed to the central broadcast server 34, which processes the incoming data packets by parsing the feeds 16 against specific filters, encoding the data and creating desired broadcast feeds for wireless transmission as described in detail below.

Selection Addressing.

As is illustrated in FIG. 1, the data packets generated by the information sources 12 are transmitted to the central broadcast server 34, where they are internally processed before being wirelessly transmitted through a carrier 36 to one or more personal computers 14 or other computing sources via selective receivers 32. When the packets arrive at a user receiver 32, they are reassembled by the communications server 38 in the message server design 18 into the original message. One skilled in the art will recognize that the carrier can be a local, regional, nationwide or worldwide carrier.

Information from the content providers is first formatted according to the proprietary EMIT protocol before being prepared for transmission over the wireless broadcast network. In the EMIT format, information feeds include a number of parts, each separated by the tilde (.about.) character. Each part begins with a tag (keyword) followed by an equal sign (=) and the data for that part. The tag determines how to interpret the data in that part. Most tags are single characters to minimize network traffic. Also, tags are case sensitive to allow more single character tags. Tags 1 5 are reserved for information category and sub categories. Other tags generally are derived from the first character in a name, such as, H for headline. An example of an EMIT format information feed is provided below: 1=S.about.2=B.about.H=Dodgers Win World Series.about.D=Nov. 2, 1989 9:30 pm where the primary category (1=) is S (which stands for sports), the first sub category (2=) is B (which stands for baseball), the news headline (H=) associated with this feed is Dodgers Win World Series, and the date/time (D=) is Nov. 2, 1989 9:30 pm.

Data from the information sources is packed into 8-bit binary format data blocks in the central broadcast server 34. The two basic data block types are illustrated in FIGS. 5 and 6. In particular, FIG. 5 defines the 8-bit binary format for "information" notification data blocks while FIG. 6 defines the 8-bit binary format for "personal alert" notification data blocks. Information notification data blocks, illustrated in FIG. 5, contain general information targeted to all users, including but not limited to news headlines and stories, sports scores, financial market data, and so forth. Personal alert notifications, illustrated in FIG. 6, contain alert information targeted to specific users, including but not limited to notifications regarding E-mail arrival, stock prices reaching specified values, Internet telephone calls, chats or meeting notices.

Prior to transmission, at the central broadcast server 34, the data packets are encoded using a protocol suitable for the transmission of information. Data blocks are packetized for transmission over the wireless broadcast network using transmission protocols.

In the preferred embodiment, which uses the paging network as the means of wireless broadcast or transmission, Motorola's FLEX™ protocol is utilized. Alternatively, other protocols, such as traditional Post Office Code Standardization Advisory Group (POCSAG) protocol, Motorola's REFLEX™ and INFLEXION™, AT&T's protocol derived from CDPD or other developing protocols may be used as well. Most wireless transmission protocols, including POCSAG, provide random error correction as well as error detection capabilities, thereby adding error detection and correction capabilities to the information link.

Depending on the type and amount of information contained, a data block may be enclosed in a single packet, or parceled into messages which in turn are subdivided into one or more packets. The message format protocol is illustrated in FIG. 7. Large data blocks are divided into messages for efficiency in transmission. The data block header is sent as part of the message. The header type item is used to distinguish between the data block and message headers.

The basic unit of transmission is the packet. Each packet includes a header and contents. The information contained in the header defines the packet's contents. In accordance with the present invention and as illustrated in FIGS. 8 and 9, two basic types of packets in the 8-bit binary format are utilized. The first 4 bits in the packet define the packet type. Standard packets are used for transmitting data blocks too large for a single packet. In this case, each packet contains the ID of the message to which it belongs, and the packet number denoting the position of the packet inside the message. This allows the software at the user receiving end to rebuild the original messages and data block from the individual packets. Prior to transmitting the packets in a message, forward error correction packets are added as described in detail below. The single packet data block is used where the complete data block can fit into one packet. In this case, the packet header is followed by the data block header and data block contents. Binary alert packets are a special case of the single packet data block and are reserved for the predefined alert notifications described above.

At the receiving end, as described in detail below, the reverse of the data packetization process described above occurs. In the case of multiple packet data blocks, individual packets are combined to form messages based on packet sequence number and message ID included in the packet header. Error correction is performed as required. Individual messages are then combined to form data blocks based on message sequence number and data block ID in the message header.

The central broadcast server 34 performs the following processes on the incoming data: compression, forward error correction, encryption, packetization and wireless broadcast format encoding. After internal processing, the formatted data packets are queued for wireless transmission to their respective destinations which could include one or more remote personal computers 14 or computing devices. In accordance with the present invention, the formatted data packets are either immediately wirelessly transmitted to their respective destinations or stored into available memory for subsequent wireless transmission to their respective destinations. For the latter, i.e. delayed transmission, the central broadcast server 34 includes a non-volatile storage medium for longer term storage of data programmed for subsequent wireless transmission to one or more users.

a. Encryption.

To minimize unauthorized use of broadcast data, the data is encrypted prior to wireless transmission so that anyone surreptitiously coming into possession of the data would not be able to convert the data to clear form for use. The user software is designed such that it can properly decrypt the data once it is received on the user end. In the preferred embodiment, data is encrypted using the Data Encryption Standard (DES) algorithm. (See "Data Encryption Standard", Federal Information Processing Standards Publication No. 46, January 1977; "DES Modes of Operation", Federal Information Processing Standards Publication No. 81, December 1980.) Alternatively, other known reversible encryption algorithms may be used for data encryption.

Prior to transmission, the data is also encoded with a data signature. The National Institute of Standards in Technology (NIST) Digital Signature Standard (DSS) algorithm is preferably used for signature verification. Alternatively, other known methods of signature verification may be used. (See "Announcing a Digital Signature Standard", Federal Information Processing Standards Publication, Draft 19 Aug. 1991, front page and pp. 1 4; "Specifications for a Digital Signature Standard (DSS)", Federal Information Processing Standards Publication, Draft 19 Aug. 1991, pp. 1 11.) In operation, DSS is used to authenticate the origin of the data (i.e., establish the identity of the signer) and to check the integrity of the data (i.e., confirm that the data has not been altered after it has been signed).

b. Forward Error Correction.

To compensate for transmission errors during wireless broadcast, forward error correction algorithms, such as Fire Codes and various forms of Reed-Solomon Codes, are applied to the outgoing data packets. Reed-Solomon and other coding systems are discussed in, for example, Theory and Practice of Error Control Codes, Richard E. Blahut, Addison Wesley, 1983, at pages 174 and 175. A feature of the forward error correction used here is that the ideal packet size is dynamically computed so as to minimize total over the air size while maximizing error correcting capability.

c. Derivation of Redundant Data Packets.

Figure 16:
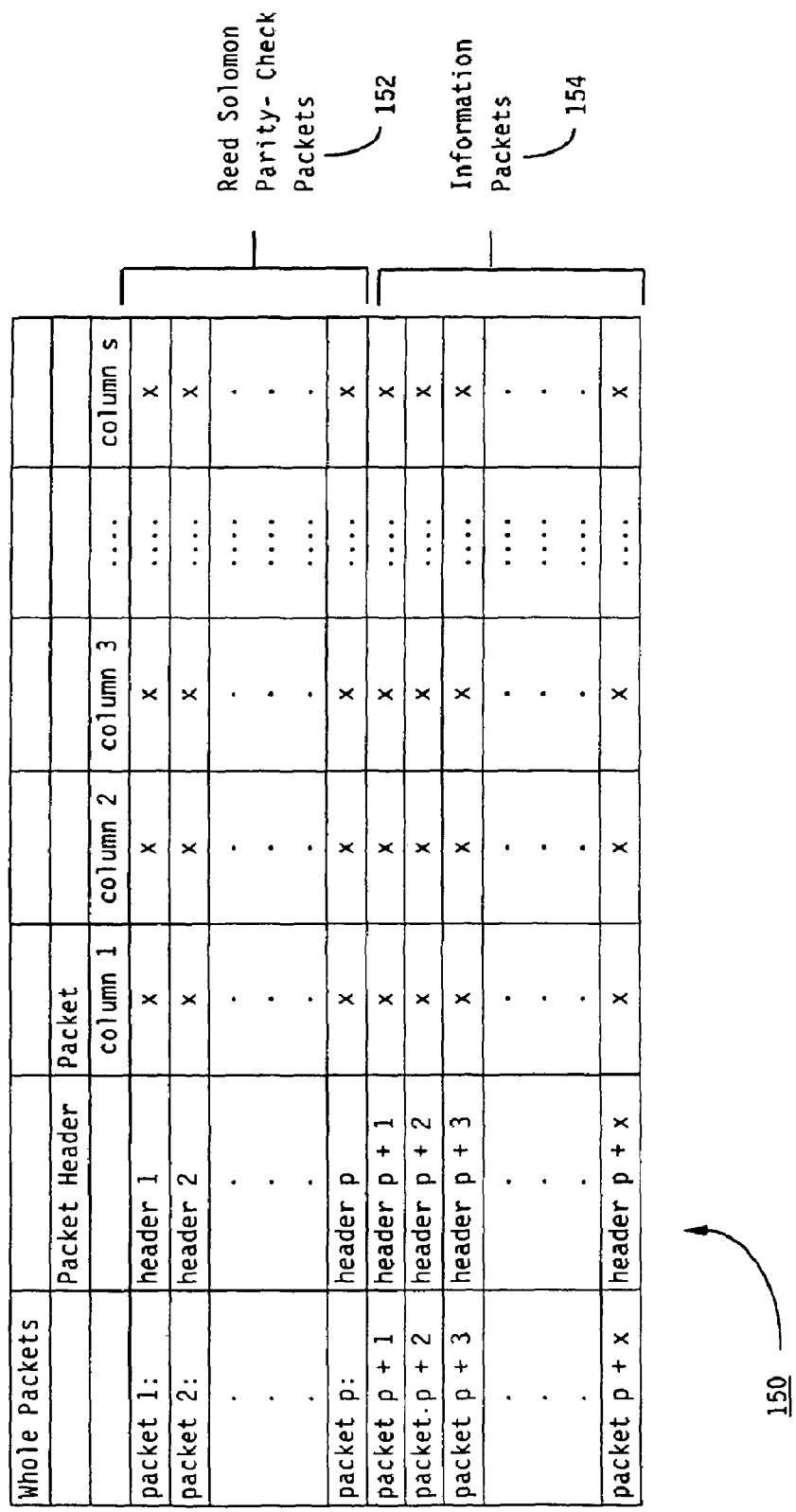
FIG. 16 is an illustration of the columns of a data group encoded by an encoder using a modified Reed-Solomon code for deriving parity-check packets.
Figure 17:
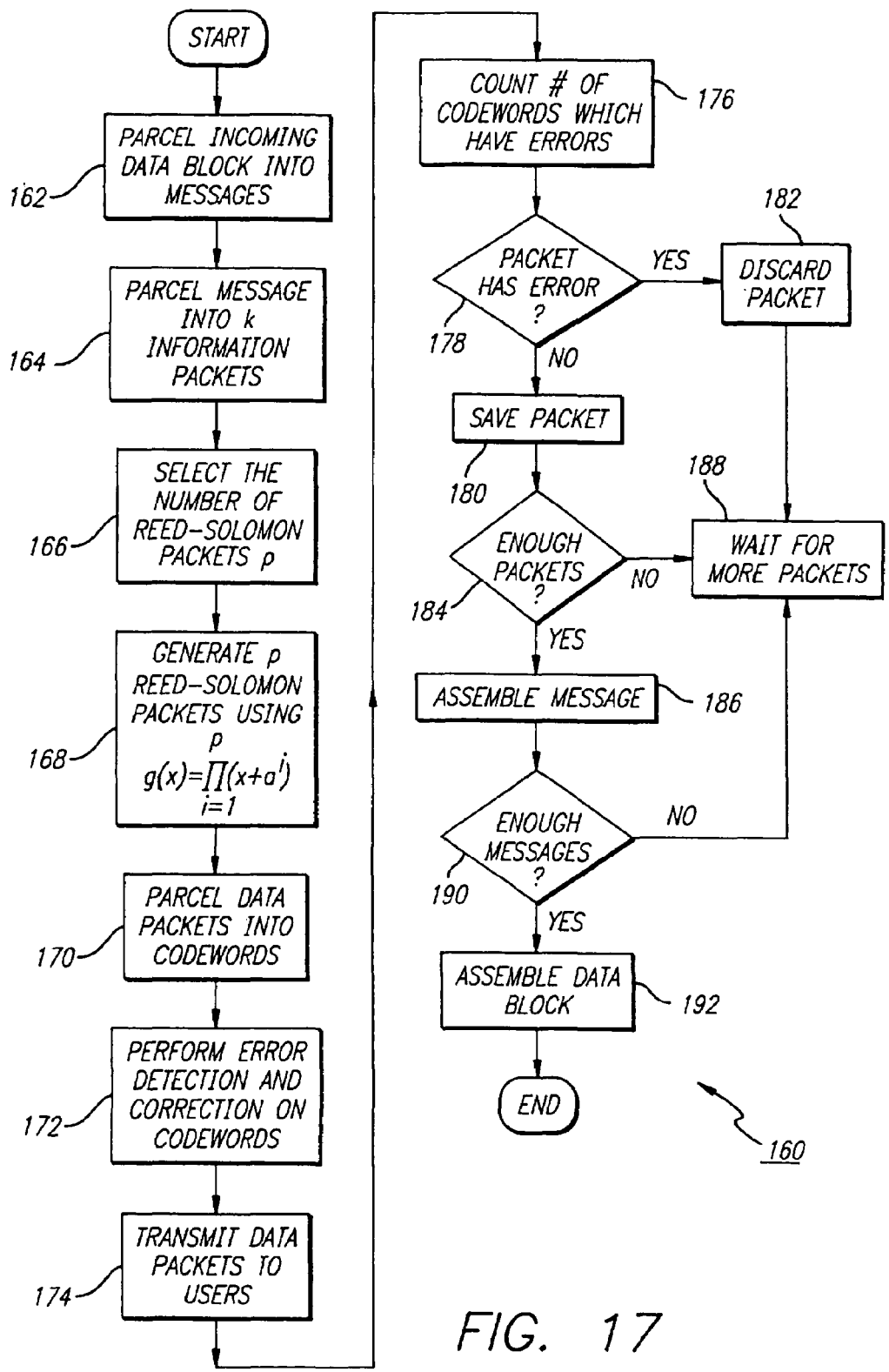
FIG. 17 is a flow chart of an algorithm for deriving parity-check packets as illustrated in FIG. 16.

Referring to FIGS. 16 and 17, as shown in detail below, the columns of a data group 150 are encoded by an encoder using a Reed-Solomon (RS) code for deriving parity-check packets 152 i.e. redundant packets. In accordance with the present invention, the RS code, conventionally used for error detection and correction, is utilized in a novel manner with respect to reconstructing packets that arrived with errors. As described in detail above, the data transmission in the present invention is based on a wireless protocol, such as Motorola's FLEX™ protocol or the POCSAG protocol which provides error detection capabilities. However, these protocols cannot compensate for burst errors or errors due to loss of synchronization, which often results in truncated or lost packets at the receiver. In the present invention, each information packet 154 which arrives with an error or errors is considered a lost packet. Therefore, an information packet 154 either arrives without error or is lost.

The present invention is thus directed to compensating for such truncated or lost information packets by sending redundant packets. Instead of sending each packet twice or thrice, the present invention utilizes a modified RS code in a novel manner to transmit packets with redundancy as explained in detail below. For example, for a message which is split into 200 information packets sent over a paging network with a packet loss rate of 1%, the probability of a successful reconstruction of the message is only approximately 13.4%. If every information packet is sent twice, i.e. 400 total packets, the probability of a successful reconstruction of the message increases to approximately 98.2%. In accordance with an advantage of the present invention, by using a modified RS code to derive redundant packets, only 5 extra packets, i.e. 205 total packets, need to be sent to achieve the same approximate 98.2% successful reconstruction probability. Thus, the present invention provides an improvement over conventional methods, which utilize additional error correction and detection capabilities on a per packet basis. In the present invention, Reed Solomon parity check packets 152 effectively compensate for lost information packets. As a result, redundancy and packet loss rate are minimized, and flexibility and packet recovery rate are maximized.

In accordance with the present invention, data received from an information source is encoded into data blocks at the broadcast server. Each data block is then parceled into one or more messages so that each message can be parceled into information packets 154. Each data packet is accompanied by a message identifier and a sequence number. As described in detail above, all packets which belong to the same message contain the same message identifier. The sequence number denotes the position of the data packet inside the message. Some packets will also be accompanied by information regarding the total number of packets belonging to a message. When enough packets arrive at the user receiver 32, they will be reassembled into the original message by the communications server 38 in the message server design 18 as explained in detail below.

Referring to FIG. 16, in accordance with the present invention, a Reed Solomon code is computed down the columns of the block of data packets, thereby creating Reed Solomon parity-check packets. The most general case (n,k) is adopted where $1 \le n \le 255$ (1) $1 \le k \le n$ (2) where [0101] k=number of information packets generated by parceling the input message, [0102] n=total number of transmitted packets. The total number of transmitted packets is determined based on the degree of protection requested. By allowing for the arbitrary combination of n and k, maximal flexibility is achieved. In particular, n and k are chosen during run-time, instead of design-time. For example, (255,223), (255,251), (7,3), (16,1) Reed Solomon codes, used column-wise are all possible combinations for generating Reed Solomon parity-check packets. In a typical operation, by using a (255, 223) Reed Solomon code column-wise, 32 parity-check packets are generated for a group of 200 information packets to be transmitted. Thus, even if 32 arbitrary packets out of 232 total data packets were lost during transmission, a successful reassembling of the information can still be achieved at the receiver end.

In accordance with the present invention, to minimize the number of lost messages, the information packets are sent with redundancy using a method based on Reed-Solomon code to derive Reed Solomon parity-check packets. Utilizing an 8-bit Reed-Solomon code, the maximum number of data packets (including both information packets and Reed-Solomon parity-check packets) is 255. There is no limitation on the number of symbols in each data packet as long as they are acceptable by the wireless carrier.

In accordance with the present invention, the modified RS code encodes the data over a Galois Field $GF(2^8)$ (hereinafter GF(256)) whose field elements are represented by their coordinates with respect to the canonical basis $\{1, a, a^2, \ldots, a^7\}$ where a is a root of the primitive monic polynomial: $f(x) = x^8 + x^4 + x^3 + x^2 + 1$ (3) Parity-check packets are generated by encoding k data packets column-wise in accordance with the following generating polynomial g(x) equation: $g(x) = \prod_{i=1}^{P} (x + a^i)$ (4) ##EQU1## where [0105] g(x)=generating polynomial [0106] a=primitive element of GF(256) [0107] p=number of parity check packets Multiplication and inversion in GF(256) are implemented by table lookup or by algorithm depending on performance requirements.

In the preferred embodiment, the encoder for encoding k data packets column-wise is a software simulation of polynomial division using linear feedback shift register (LFSR), with n and k being changeable. The coefficients of the generator polynomial g(x) are saved in the order of ascending power. Alternatively, the LFSR may be implemented in hardware, with n and k fixed. (See William Wesley Peterson, "Error Correcting Codes", Edition One, pg. 150.)

A series of data packets including both information packets and parity-check packets are formed. The number of symbols in each data packet is limited only by the wireless broadcast system. In accordance with the present invention, no extra error correction is added to each data packet.

The number of parity-check packets, n–k, must be in the range [1, 254] and the number of erasures, i.e. errors whose locations are known, must be in the range [0, n–k]. The erasure locations must be all distinct and sorted in ascending order. In the present invention, RS error correction is performed on each column. Each error in the column corresponds to a lost packet. Since it is known which packet is lost, the locations of all errors prior to RS decoding are known. Thus, in accordance with an advantage of the present invention, the location of the errors is known before RS decoding, thereby providing for maximal error correction. In contrast, conventional applications of RS attempt to find both the magnitude and location of an error.

As shown in FIG. 16, each data packet (including information packets and RS parity-check packets) is parceled into many codewords. The length of each codeword is 32 bits, where 21 bits are for information and 11 bits are for error correction/detection.

The data packets, i.e. information packets and parity-check packets, are then transmitted to the message server unit via the user receiver. FLEX™ provides information regarding whether the packets were correctly received or not. As a result, any error locations are detected prior to applying RS decoding. Decoding is then implemented by syndrome evaluation with known error locations. (See Hasan, Bhargava, and Le-Ngoc, "Reed-Solomon Codes and Their Applications", pg. 79 81.)

In accordance with the present invention, the number of information packets k and the number of Reed-Solomon parity-check packets p can be arbitrarily chosen depending on the transmission condition and the desired accuracy rate. The only condition is that the number of information packets k and the number of parity-check packets together total no more than 255. The restriction p+k.ltoreq.255 (5) is imposed by the use of the finite field GF(256). As stated earlier, each data block will thus first be split into several messages so that each message can be split into k packets that satisfy the above restriction. Up to p packets can be lost without compromising successful reconstruction of the message. In accordance with the present invention, even if some data packets are lost, the full message can be recovered using the redundancy data packets generated by the present invention.

Referring to FIG. 17, a flow chart 160 of the algorithm for deriving RS parity-check packets is illustrated. The data block is initially parceled into one or more incoming messages (step 162), and the messages are then parceled into k information packets 154 (step 164). The number of RS parity-checks packets p is then selected (step 166). The information packets are then encoded column-wise with a modified RS code in accordance the generating polynomial: g .times. (x)=I=1 P .times. (x+a i) ##EQU2##
and parity-check packets are generated (step 168). The data packets, which include information packets and RS parity-check packets, are parceled into codewords (step 170). After the data packets have been parceled into codewords, error correction/detection is performed on the codewords (step 172). The data packets are then transmitted to the users (step 174).

At the user end, the number of codewords which have error(s) is counted (step 176). Then it is determined whether each packet has any errors (step 178). If a packet does not have an error, then it is saved (step 180). However, if a packet has one or more errors, it is discarded (step 182) and the present invention-waits for more packets (step 188). When there are enough packets (step 184), a message is assembled (step 186). If not, the present invention waits for more packets (step 188). Finally, when there are enough messages, the data block is assembled (step 192).

d. Compression/Bandwidth Optimization.

Figure 18B:
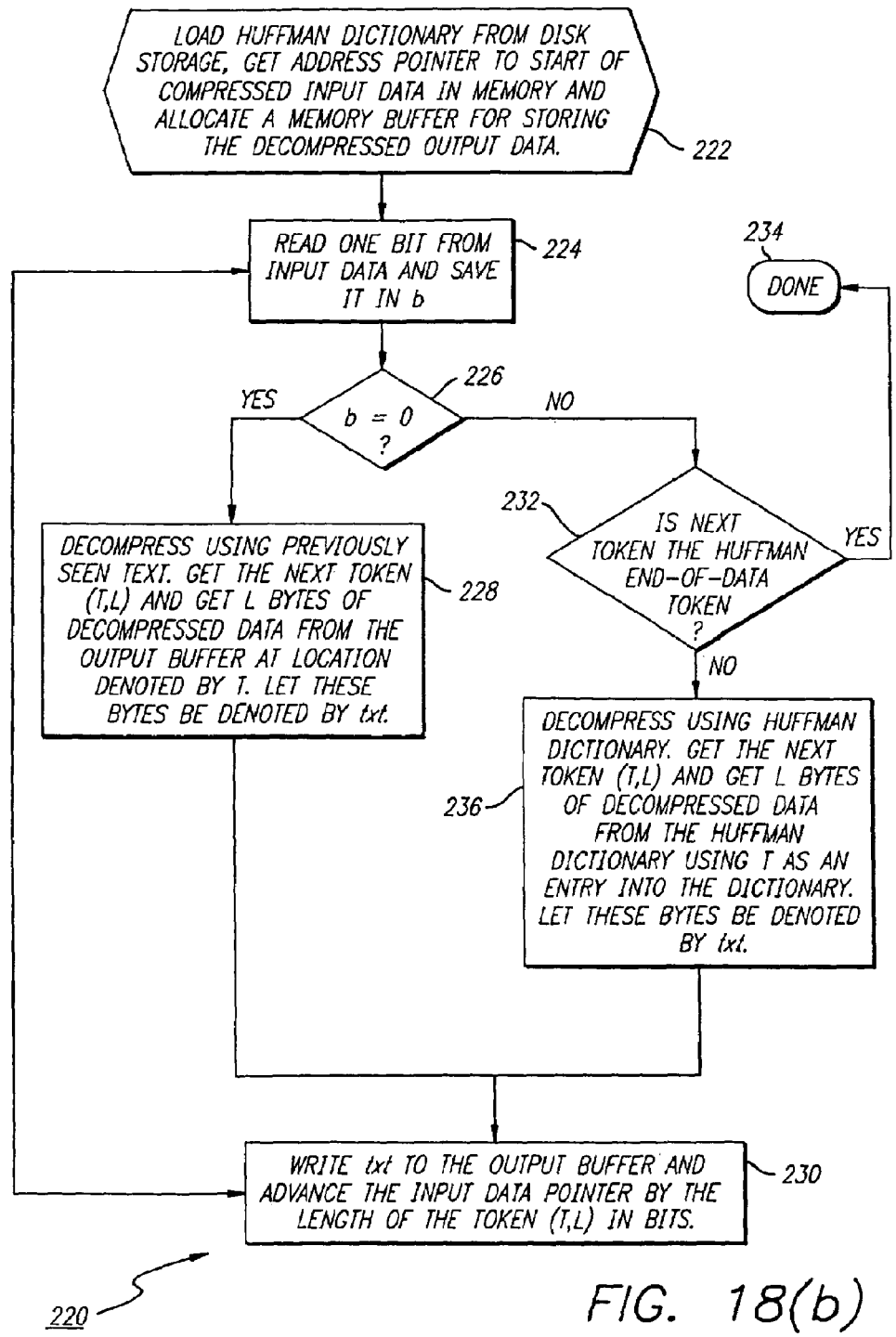
FIG. 18(b) is a flow chart of an algorithm for data decompression of the compression algorithm illustrated in FIG. 18(a)

FIG. 18(a) is a flow chart of an algorithm for data compression which combines Huffman compression and dictionary-based compression. In accordance with the present invention, the data blocks are compressed at the central broadcast server 34 end prior to transmission so that maximum amounts of information in compressed or bandwidth reduced form can be transmitted to the selected user or users. As discussed in detail below, at the user end, the data blocks are correspondingly decompressed (FIG. 18(b)).

In the preferred embodiment, the current compression algorithm for English language articles saved in ASCII text format combines the Huffman compression and the dictionary-based compression, such as LZ77 and LZ78 based algorithms. In operation, as the compression algorithm scans the input texts, it not only tries to search for the next item in the previously seen text, but also tries to search for the next item in a static Huffman dictionary, and it chooses a method which produces a better result. After the data is received at the user end, it is correspondingly decompressed.

In particular, referring to the algorithm 200 for implementing data compression in FIG. 18(a), the Huffman dictionary is loaded from the disk storage, the address pointer is positioned to the start of the uncompressed input data in memory and a memory buffer for storing the compressed output data is allocated (step 202). Next, it is determined whether the address pointer is moved to the end of the data input (step 204). If so, bit b=1 is written to the output data and the end-of-data token from the Huffman dictionary is written to the output data (step 206) and the compression routine is done (step 208). If in step 204, it is determined that the address pointer is not at the end of the input data, the compression algorithm scans the input texts, searching for the next item in the previously seen text (step 210) and the static Huffman dictionary (step 212), and chooses the method which produces a better result (step 214).

In particular, in step 210, the data is compressed using the previously seen text. A token T1 is generated by comparing the input data at the input pointer to the previous input data. T1 denotes an index to the previously seen data that has the maximum length match with the current data. L1 correspondingly denotes this maximum length.

In step 212, the data is compressed using the Huffman dictionary which was loaded in step 202. A token T2 is generated by looking for the maximum match of the input data at the input pointer to entries in the Huffman dictionary. T2 denotes an index to the dictionary entry for the maximum match. L2 correspondingly denotes the length of the match.

In step 214, the optimum result (T,L) from (T1,L1) or (T2,L2) is chosen depending on which is larger, L1 or L2. If (T1,L1) is chosen, b is set to 0 (b=0), else b is set to 1 (b=1). b is initially written to the output data followed by the optimal result (T,L). The input data pointer is then advanced by L bytes.

After the data is received at the user end, it is correspondingly decompressed in accordance with the algorithm 220 illustrated in FIG. 18(b). The Huffman dictionary is initially loaded from the disk storage, the address pointer is positioned to the start of the compressed input data in memory and a memory buffer for storing the decompressed output data is allocated (step 222). One bit from the input data is read and saved in b (step 224). Next, it is determined whether b=0 (step 226). If so, the data is decompressed using the previously seen text (step 228). The next token (T,L) is initially retrieved, followed by L bytes of decompressed data from the output buffer at a location denoted by T. The retrieved bytes are denoted by txt, which are then written to the output buffer (step 230). The input data pointer is then advanced by the length of the token (T, L) in bits. The program then returns to step 224 and repeats the steps until the Huffman end-of-token is detected (step 232).

If, in step 226, b is not set to 0, it is determined whether the next token is the Huffman end-of-data token. If so, decompression has been completed (step 234). If not, the data is decompressed using the Huffman dictionary (step 236). The next token (T,L) is retrieved, followed by L bytes of decompressed data from the Huffman dictionary using T as an entry into the dictionary. The retrieved bytes of data are denoted by txt, which as noted previously, is written to the output buffer (step 230). The input data pointer is advanced by the length of the token (T,L) in bits and returns to step 224.

e. Differencing.

Figure 19A:
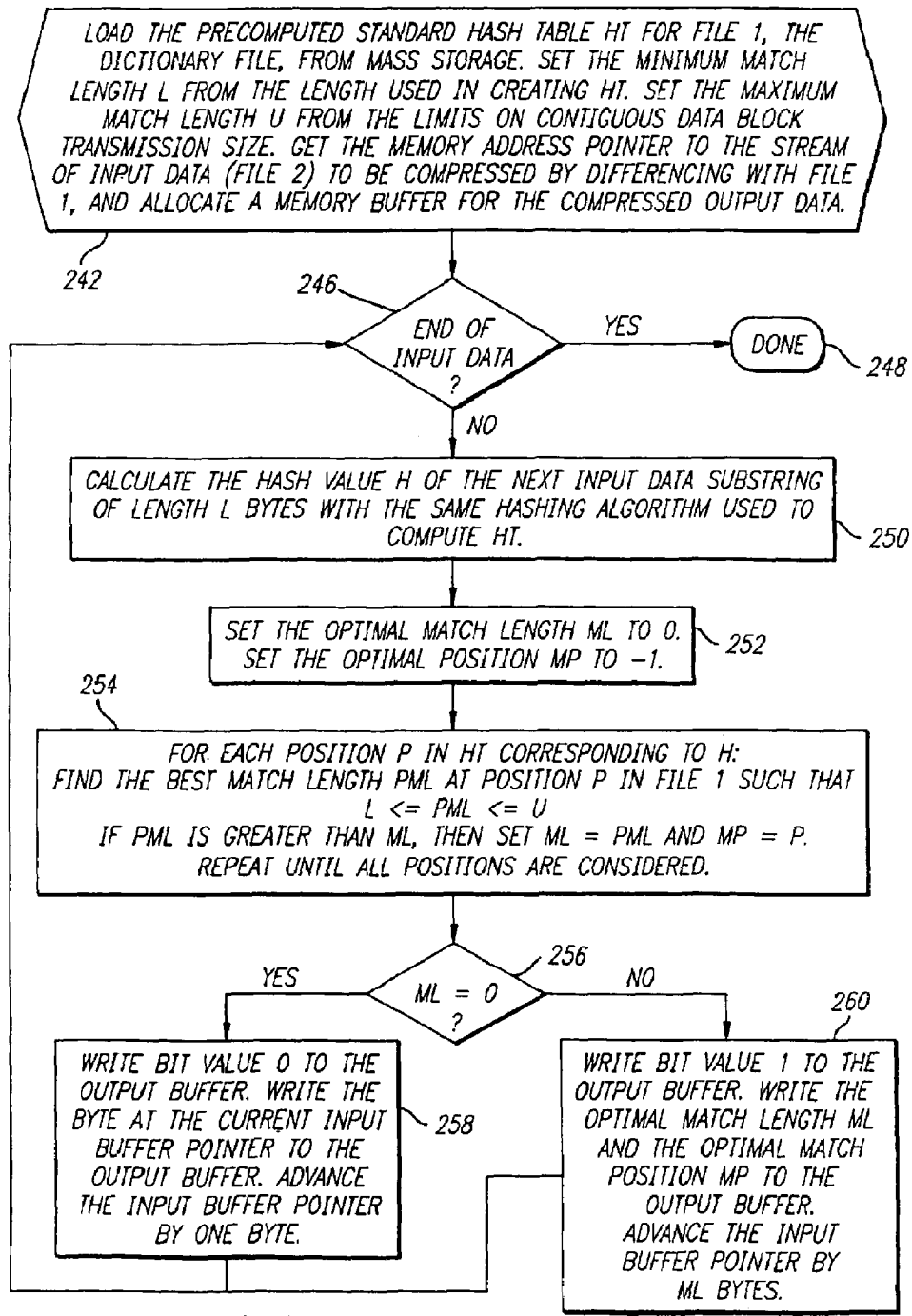
FIG. 19(a) is a flow chart of an algorithm for data compression using differencing in accordance with the present invention.

FIG. 19(a) is a flow chart of an algorithm 240 for data compression utilizing differencing. In accordance with another advantage of the present invention, a differencing algorithm 240 is additionally used to compress the coded data, thereby significantly reducing the number of bytes sent with each transmission. In particular, a dictionary-based compression algorithm, such as LZ77 and LZ78 based compression, can be adapted for this application. File two is described with reference to file one in a minimum number of bytes. In such an algorithm, file one is used as the dictionary.

In particular, the precomputed standard hash table HT for file 1, the dictionary file, is loaded from mass storage (step 242). The minimum match length L from the length used in creating the hash table HT and the maximum match length U from the limits on contiguous data block transmission size are set. The memory address pointer to the stream of input data (file 2) to be compressed by differencing with file 1 is retrieved and a memory buffer for the compressed output data is allocated. The algorithm 240 next determines whether the end of the input data has been detected (step 246). If so, the compression is complete (step 248). If not, the hash value H of the next input data substring of length L bytes with the same hashing algorithm used to compute HT is calculated (step 250). The optimal match length ML is then set to 0 and the optimal position MP is set to −1 (step 252). For each position P in HT corresponding to H, the best match length PML at position P in file 1 such that L<=PML<=U is determined (step 254). If PML is greater than ML, then ML is set such that ML=PML and MP is set such that MP=P. If in step 256, ML=0, the bit value 0 is written to the output buffer (step 258). The byte at the current input buffer pointer is written to the output buffer and the input buffer is advanced by one byte. The algorithm 240 returns to step 246 and continuously iterates until the end of the input data is detected (step 248).

If in step 256, ML is not equal to 0, the bit value 1 is written to the output buffer (step 260). The optimal match length ML and the optimal match position MP are written to the output buffer. The input buffer pointer is then advanced by ML bytes. The algorithm 240 returns to step 246 and continuously iterates until the end of the input data is detected (step 248).

Figure 19B:
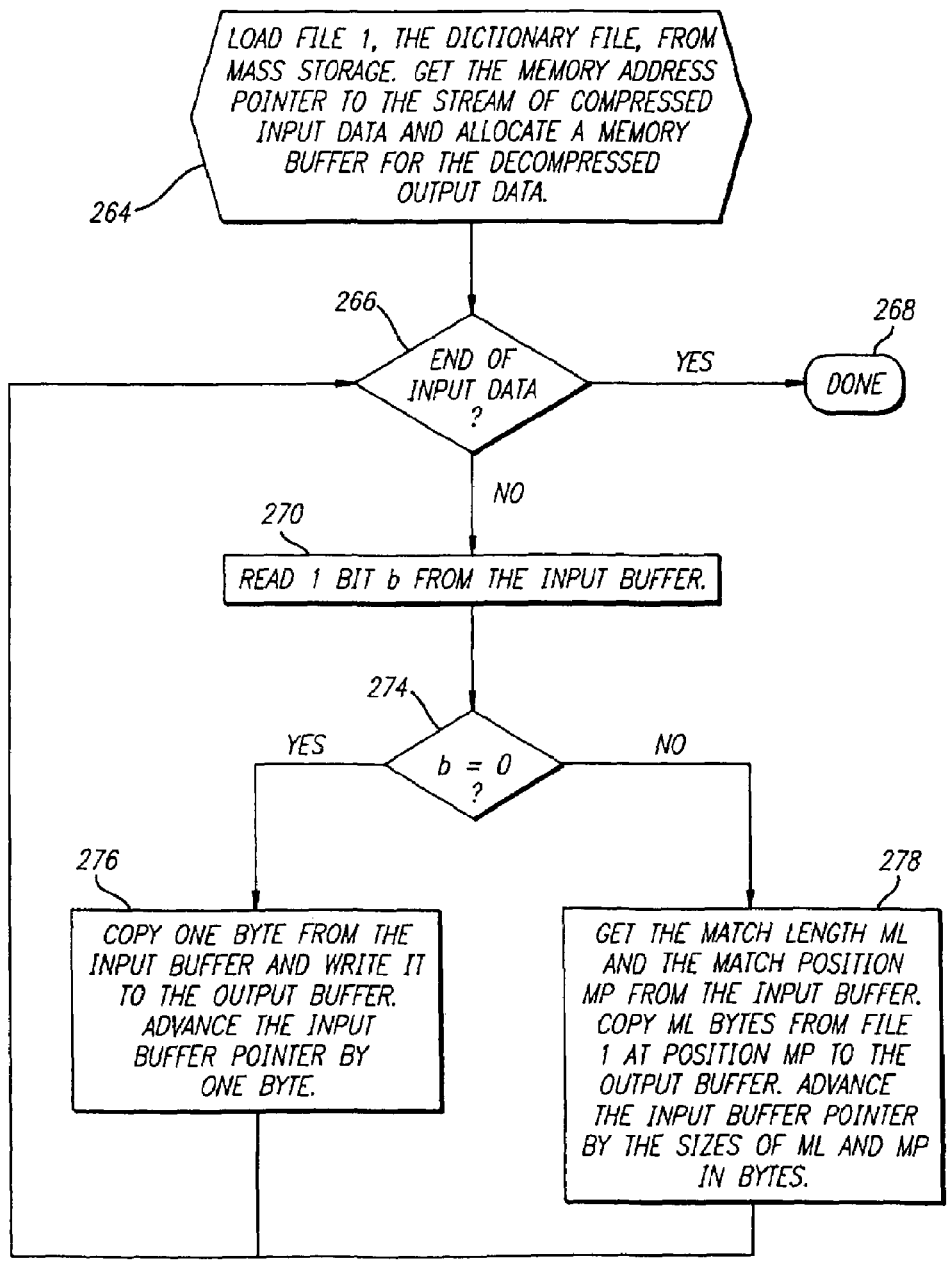
FIG. 19(b) is a flow chart of an algorithm for data decompression of the compression algorithm illustrated in FIG. 19(a)

As discussed in detail below, at the user end, the data blocks are correspondingly decompressed in accordance with the algorithm 262 illustrated in FIG. 19(b). The dictionary file, file 1, is initially loaded from mass storage (step 264). The memory address pointer to the stream of compressed input data and retrieved and the memory buffer for the decompressed output data is allocated. It is next determined, whether the end of the input data has been detected (step 266). If so, the decompression routine is complete (step 268). If not, one bit b from the input buffer is read (step 270). It is then determined whether b=0 (step 274). Is so, one byte from the input buffer is copied and written to the output buffer. The input buffer pointer is then advanced by one byte. The algorithm 262 returns to step 266 and continuously iterates until the end of the input data is detected (step 268).

If in step 274, b does not equal 0, the match length ML and the match position MP is retrieved from the input buffer (step 278). ML bytes are copied from file 1 at position MP to the output buffer. The input buffer pointer is advanced by the sizes of ML and MP in bytes. The algorithm 262 returns to step 266 and continuously iterates until the end of the input data is detected (step 268).

f. Wireless Data Format Encoding.

Where the method of transmission is paging, all outgoing messages are preferably encoded to 7/8 bit data or true 8 bit data for broadcast over paging networks. After the data is received at the user end, it is correspondingly decoded.

With respect to VBI and satellite transmission, all outgoing messages are preferably encoded to true 8 bit data.

g. Addresses.

In accordance with the present invention, outbound data will be segmented and sent to the user by way of the user receiver 32 utilizing common and unique addresses. Addresses are numbers used by wireless receiving devices to identify messages targeted to a user. Addresses are usually stored in programmable read only memory (PROM) in the receiver hardware 32. If the address to which a message is transmitted matches a address stored in the receiver 32, then the receiver 32 will process the message. Otherwise, the message will be ignored. In a typical configuration, general "basic services" are wirelessly transmitted on global common addresses, electronic mail and point-to-point messages are transmitted on personalized or unique addresses, and combined premium services and pay-per-view events are grouped together and transmitted on common addresses. Alternatively, the combined premium services and pay-per-view events may be sent on unique addresses as well.

h. Request for Additional Services.

The central broadcast server 34 additionally includes telephone and/or modem interfaces for receiving remote request from users to obtain additional or modify existing services. For example, a user from a personal computer 14 or other computing device, can request additional services or modify existing services by telephoning or modeming the central broadcast server 34, which automatically and wirelessly transmits the new or modified services. Modification of subscribed services may also be performed via the Internet and World Wide Web.

i. Simultaneous Wired Transmission.

In accordance with an alternate embodiment of the invention, as explained in detail below, the information provided from the information sources 12 and transmitted to the central broadcast server 34 to be consolidated in accordance with the present invention and then transmitted wirelessly nationwide to personal computers 14 and other computing devices as described in detail above can also be sent simultaneously via a wired connection to the same personal computers 14 and computing devices having Internet/World Wide Web access (direct or via on-line service providing Internet and Web access). In particular, the data processed at the central broadcast server 34, in addition to being transmitted wirelessly, is simultaneously made available through wired connection to a specific web site on the Internet. A user can thus connect to the Web via the Internet and receive information through wired means. Receiving Means.

Referring to FIG. 1, a user receiver 32, connected to a personal computer 14 or computing device, receives wireless transmissions sent by the central broadcast server 34. The user receiver 32 preferably includes an Industry-Standard Architecture (ISA) board with a I C interface to an external wireless receiver and utilizes on-board POCSAG, Motorola's FLEX™ protocol or other wireless receiving device receiving and decoding. In accordance with an advantage of the present invention, Motorola's FLEX™ decoding allows for upgradeability to future receiver protocols without requiring replacement of the internal ISA board. The user receiver 32 also includes an indicator, such as a flashing LED, which indicates reception of incoming messages. As described in detail below, the user receiver 32 includes physical addresses for filtering data prior to being transferred to the personal computer 14. The user receiver 32 may be a specially designed or commercially available receiving unit.

Filtering.

In accordance with the present invention, filtering of information can be accomplished both at the user receiver 32 and personal computer 14 or computing device. Messages are electronically sent to nationwide and local wireless broadcast networks using both physical and virtual addresses. Physical addresses are tags which reside in the hardware portion in the user receiver 32.

In addition to standard physical addresses, the present invention implements a virtual address as illustrated in FIG.

14 and described in detail below. In particular, the virtual addresses reside in the software of the user computer 14. Virtual addresses provide additional filtering of incoming data from the user receiver 32. For example, a message may be received by all receivers 32, but if the message is targeted to a specific virtual address, then only those installations in which that virtual address is activated will process the message. In accordance with an advantage of the present invention, virtual addresses may be activated and deactivated through the broadcast network, allowing for external control over the reception of services in a particular installation. It will be appreciated by those skilled in the art that information filtering can be accomplished utilizing virtual addresses only. Virtual addresses can allow for unlimited filtering of messages on the user end. However, this may increase the resource usage of the personal computer 14. Correspondingly, information filtering can be accomplished by utilizing physical addresses only.

A higher level of filtering based on message category and content is also provided. Users can set various filters based on a variety of preferences at information category or specific content levels to allow for automated filtering of incoming information. At the category level, users can control which categories of information received from the broadcast network are processed and which are discarded. For example, if a user were not interested in sports, all sports information categories, such as baseball, football, golf, etc. can be selected for discarding. A the specific content level, a user can select which subcategories of information within a particular information category will be processed. The user selectable subcategories depend on the type of information contained in that category. Subcategories may include, but are not limited to, source providers for headline news stories, specific industry segments (e.g., electronics, computers, communications, industrial, etc.) for business news, specific teams for sports categories, particular states and games for lottery results, and stocks for which quotes are displayed. For example, a user that wishes to have scores displayed only for baseball games involving the New York Yankees or New York Mets can set the filter for the baseball viewer to discard game results for all teams except those two.

Figure 14:
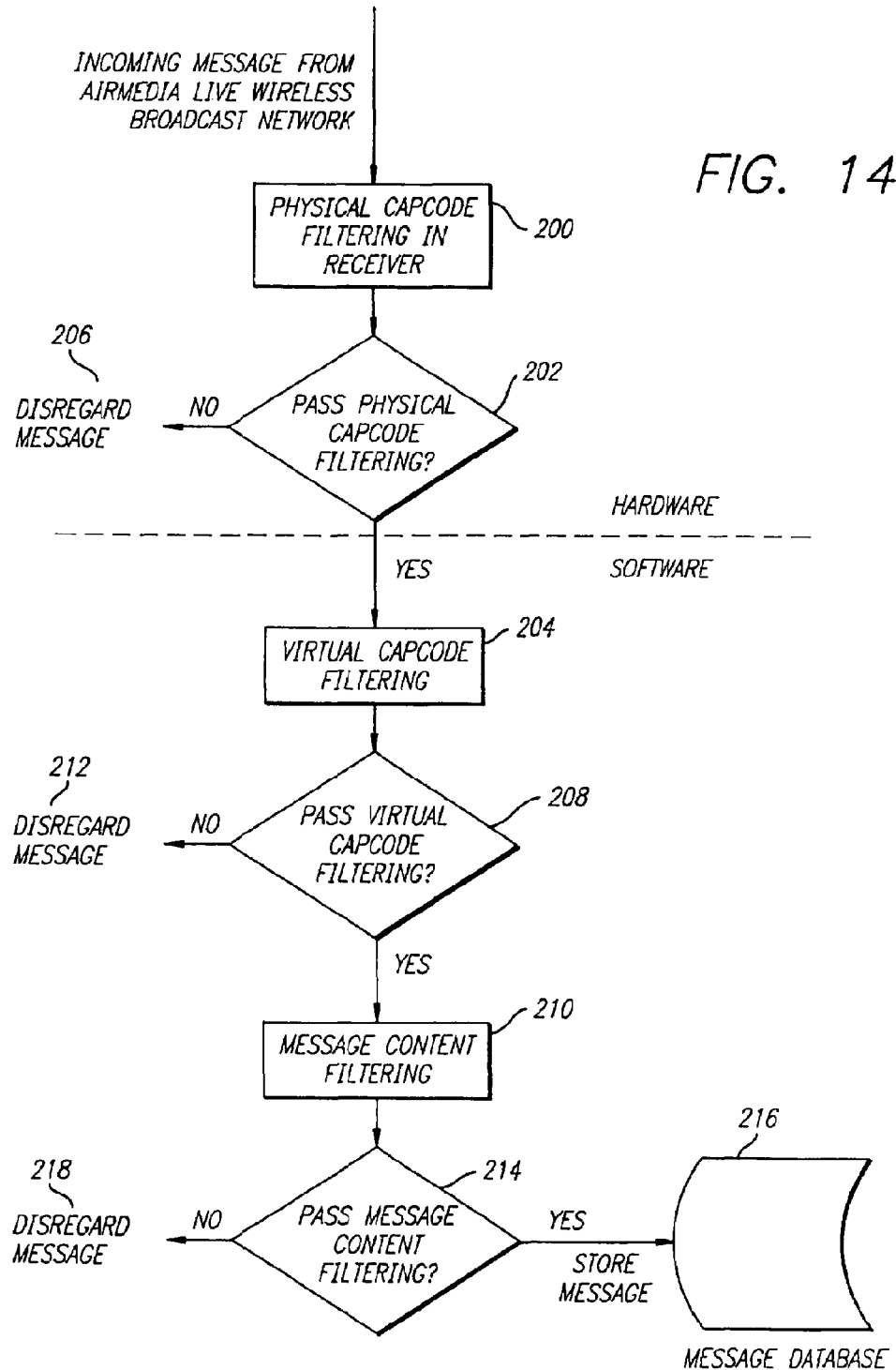
FIG. 14 is a flow chart of an algorithm for address and message filtering in accordance with the present invention.

Filtering is accomplished prior to information being transferred to the personal computer's hard drive 14, therefore conserving the personal computer's resources. Referring to FIG. 14, a flow chart of an algorithm for message processing using filtering in accordance with the present invention is illustrated. An incoming message from the central broadcast server end 34 after processing as described above is applied to the receiver hardware 32 (step 200). Physical address filtering in the receiver hardware is then used to determine whether the message should be passed on for further virtual address filtering (step 202). If the message passes physical address filtering, the message is applied to virtual address filtering (step 204). Otherwise, the message is disregarded (step 206). Virtual address filtering is then used to determine whether the message should be passed (step 208) on for further message content filtering (step 210). If not, the message is disregarded step 212). Message content filtering then determines (step 214) whether the message should be stored in the message database (step 216) for further processing and transmission to the user or disregarded (step 218).

Figure 15:
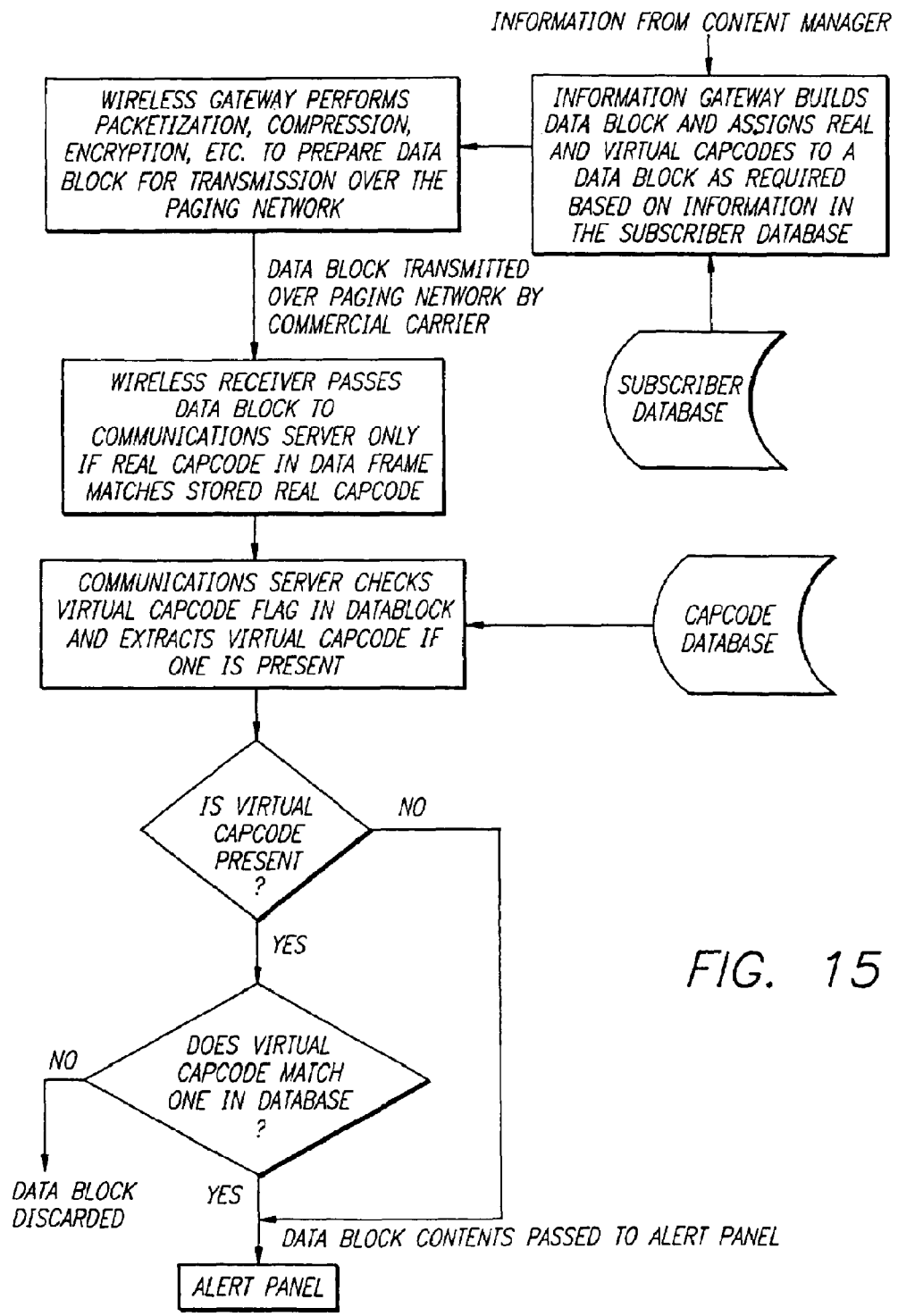
FIG. 15 is a detailed flow chart of the algorithm illustrated in FIG. 14 for targeting data to a user utilizing physical and virtual addresses.

The process of targeting data to an user utilizing real and virtual addresses is illustrated in FIG. 15. Data blocks are built in the information gateway 134 and all applicable real and virtual addresses are determined based on the type of information in the data block and user subscription data from the subscriber database 130. If a data block is to be targeted to a specific virtual address, the virtual address is inserted by the information gateway 134 into the virtual address field of the data block header and the virtual address flag is set. The wireless gateway 136 provides the interface to the wireless transmission network. It prepares data for transmission over the network and implements real addresses in the proper data frames as specified by the standard transmission protocol that is used. At the receiving end, arriving data is first filtered via real addresses in the wireless receiver 32 followed by virtual address filtering in the communications server 38. The communications server 38 first checks the virtual address flag in the data block header. If it is not set, then the data block is passed onto the alert panel 50 for storage and display. If this flag is set, the communications server 38 determines if the virtual address in the data block header matches one in the virtual address database. If there is a match, then the data block is passed onto the alert panel 50. If there is no match, then the data block is discarded.

Message Server Design.

Figure 10:
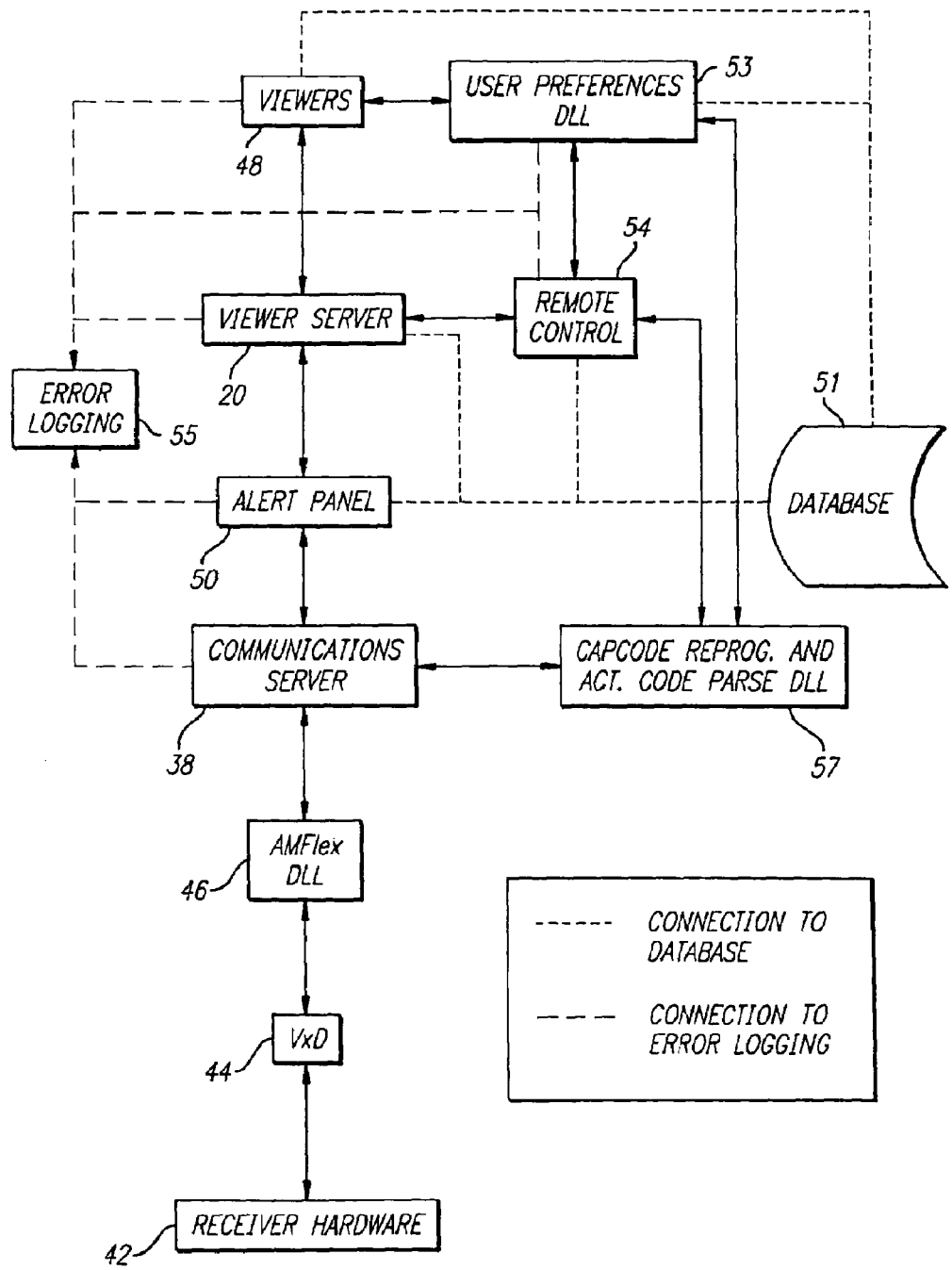
FIG. 10 is a detailed schematic diagram of the message server design illustrated in FIG. 1.

Referring to FIGS. 1 and 10, the message server design 18 includes a communications server 38, user interface alert panel 50 and viewer server 58.

a. Driver.

As is illustrated in FIG. 10, the driver 44 is preferably a Windows 95 driver for the wireless device hardware 42, although another compatible device may be used as well. The driver 44 provides an interface to access received data and control the hardware 42, as well as inform applications as to the status of the receiver hardware 42.

b. Interface.

The interface 46 for the wireless device is preferably an AmFlex DLL 46, although another compatible device may be used as well. The interface 46 is used to pass the data received from the wireless device to the communications server 38 for processing and distribution to other software components. It also provides a means by which the communications server 38 can program the device hardware to receive specific messages and also allows the communications server 38 to determine hardware status.

c. Communications Server.

The communications server 38 receives data from the wireless device via the interface 46, extracts the different types of data blocks (messages), passes public data blocks to the user interface alert panel 50 and processes private data blocks locally. The communications server 38 is also responsible for initializing the wireless device and maintaining the address database which determines which received messages will be processed. In addition, it provides diagnostic data on received messages for software debug purposes.

In operation, the communications server 38 is notified of incoming data packets by the driver 44 via the interface 46 through a software callback function. Once data packets are received by the communication server 38, it recombines, decompresses, decrypts, filters via virtual addresses as previously discussed, and error corrects the data packets using techniques corresponding to the processing done at the central broadcast server 34 end. In particular, the communication server 38 initially verifies the integrity of the data packets received using common error correction techniques. After error correction, the data packets are unpacketized and entire messages are assembled. After assembly, the communication server 38 verifies once again that the integrity of the message is maintained. The message is then decrypted using the common password previously established. The data signature on the message is also checked to verify the integrity of the data. The messages are uniquely encoded so that it is known which data packet belongs to which message. The messages are stored in a database and when a complete message is formed, it is transmitted to one or more devices that are registered with the communication server 38. As shown in FIG. 10, the complete message may be transmitted to the user interface alert panel 50, shown in detail in FIGS. 3 and 4 and discussed in detail below. Thus, once the data packets are successfully read off the driver 44, the data is error corrected, decompressed, decrypted and assembled into a complete message. The communications server 38 then notifies the user interface alert panel 50.

d. User Interface Alert Panel.

Figure 20:
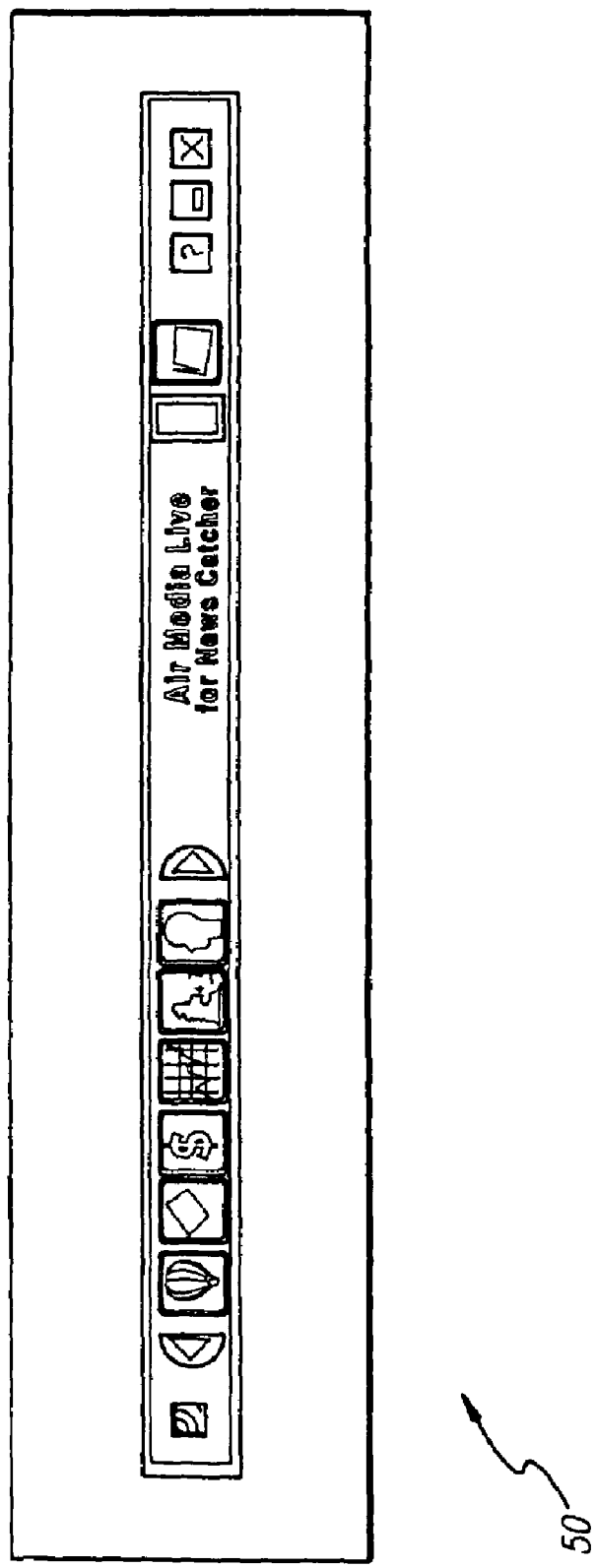
FIG. 20 is an illustration of a user interface alert panel as seen by a user.

Referring to FIG. 10, the user interface alert panel 50 is the main user interface for the applications software. The user interface alert panel 50, which appears to a user as shown in FIG. 20, is the liaison for messages broadcast from the communications server 38 and delivered to the viewer server 20. The user interface alert panel 50 performs all message archiving to the messages database. The main functions of the user interface alert panel 50 are (I) initialization, (ii) processing EMIT messages, and (iii) timing events. The user interface alert panel 50 is run when the user double clicks on a specific icon or selects the application from a start menu, such as the Windows 95 start menu, and is responsible for other applications, such as launching the communications server 38 and viewer server 20 and passing messages received from the communications server 38 to the viewer server 20. The user interface alert panel 50 also displays "fly-in" graphics and icon buttons to alert the user that a new message has been received, allows the user to open a viewer 48 to examine a received message by clicking on the viewer icon button for that message, and maintains the received messages database. The latter includes saving new messages in the database and deleting old messages after a certain period of time, as explained in detail below. The user also accesses the remote control 54 from the user interface alert panel 50 by clicking a remote control icon.

(I) Initialization.

Figure 21:
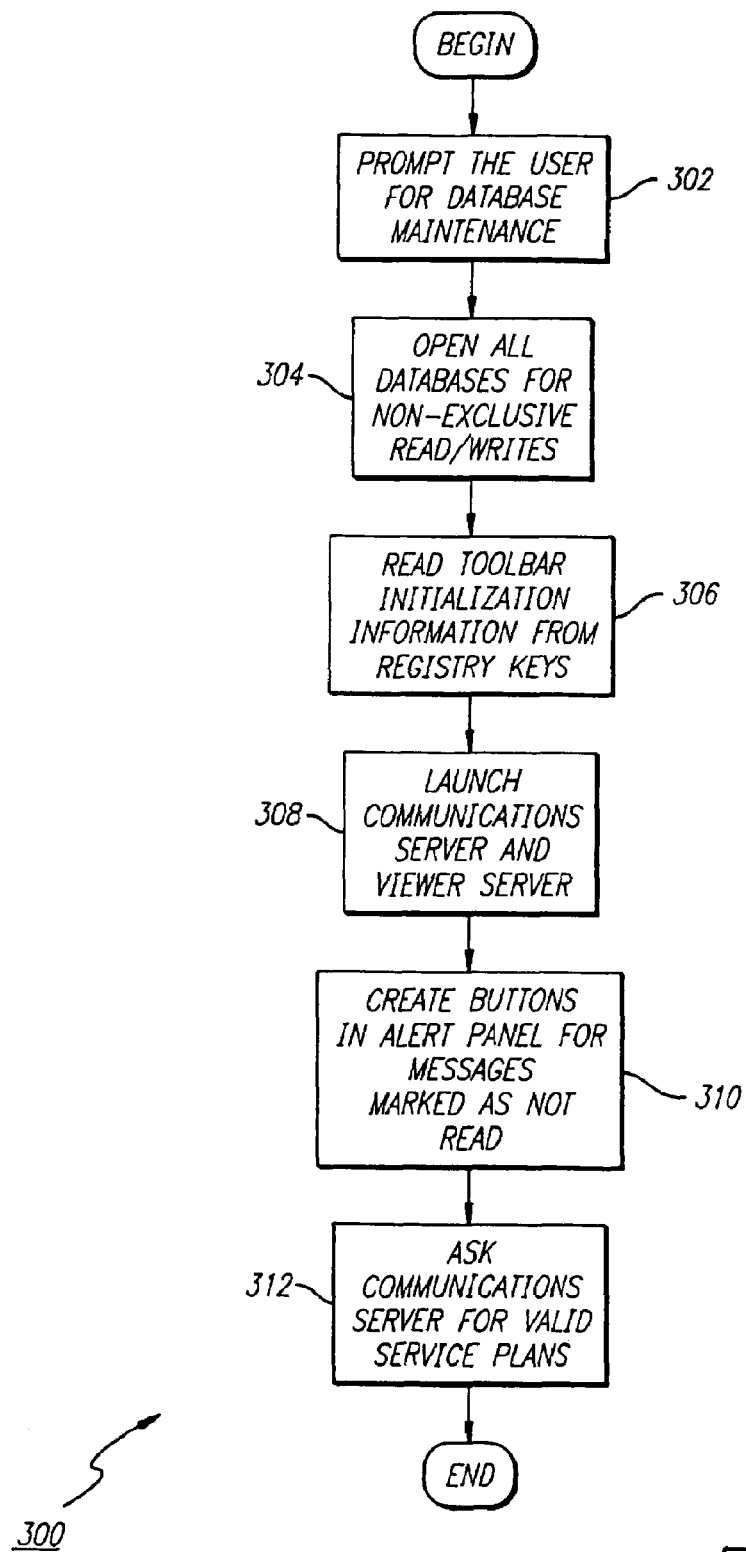
FIG. 21 is a flow chart of an algorithm for implementing the initialization procedure for the user interface alert panel illustrated in FIG. 20.

FIG. 21 is a flow chart of an algorithm 300 for implementing the initialization procedure for the user interface alert panel 50 in accordance with the present invention. In step 302, during initialization, the user is prompted for database management (compress the message database). In particular, the user interface alert panel 50 will determine if there are more than a predetermined number of messages written into the database 51. In the preferred embodiment, the predetermined number of messages is 2000+, although one skilled in the art will recognize that any number of messages may be used. If the predetermined number is exceeded, records which have been previously marked for deletion are removed from the database 51. Marked records are typically records which have been read by a viewer and are not targeted for any of the other viewers or applications, yet physically remain in the database. These records are removed when the predetermined number of messages is met, thereby only leaving those records which need to be read.

Following database management, the databases 51 are opened for non-exclusive read/writes (step 304). In accordance with the present invention, the three mains databases are the (a) messages database which holds all the messages, (b) SYSAPPS database or systems applications database which holds the viewer specific information such as what is executable, what needs to be run for that viewer to be launched, etc. and (c) V groups database which contains a list of all viewers, their alias names and descriptions.

The next step during initialization involves reading the tool bar initialization information from the registry keys (step 306). In particular, the docking location of the user interface alert panel 50 is determined. The user interface alert panel 50 is dockable at all the corners of the display and can also be floated at the center. The animation defaults are also determined because in the customization for the user interface alert panel 50, the user can turn off the fly-in sequence, buttons animated and/or sound files being played. Which winsock ports need to be used to talk to the communications server 38 and viewer server 20 are also determined at initialization.

The next step is during initialization is to launch the communications server 38 and viewer server 20 (step 308). After the executables for the communications server 38 and viewer server 20 have been launched, the communications server 38 is logged into as a client and the viewer server 20 is logged into as a server such that each knows about the user interface alert panel 50.

Then, buttons are created in the user interface alert panel 50 for messages marked as not read (step 310). For example, some records in the message database 51 are not read because the user closed the user interface alert panel 50 before reading them. In accordance with the present invention, buttons are created on the user interface alert panel 50 for those messages.

Finally, the communications server 38 is queried for valid service plans which include but are not limited to E-mail, premier services and power up services (step 312).

(II) Process EMIT Messages.

Figure 22:
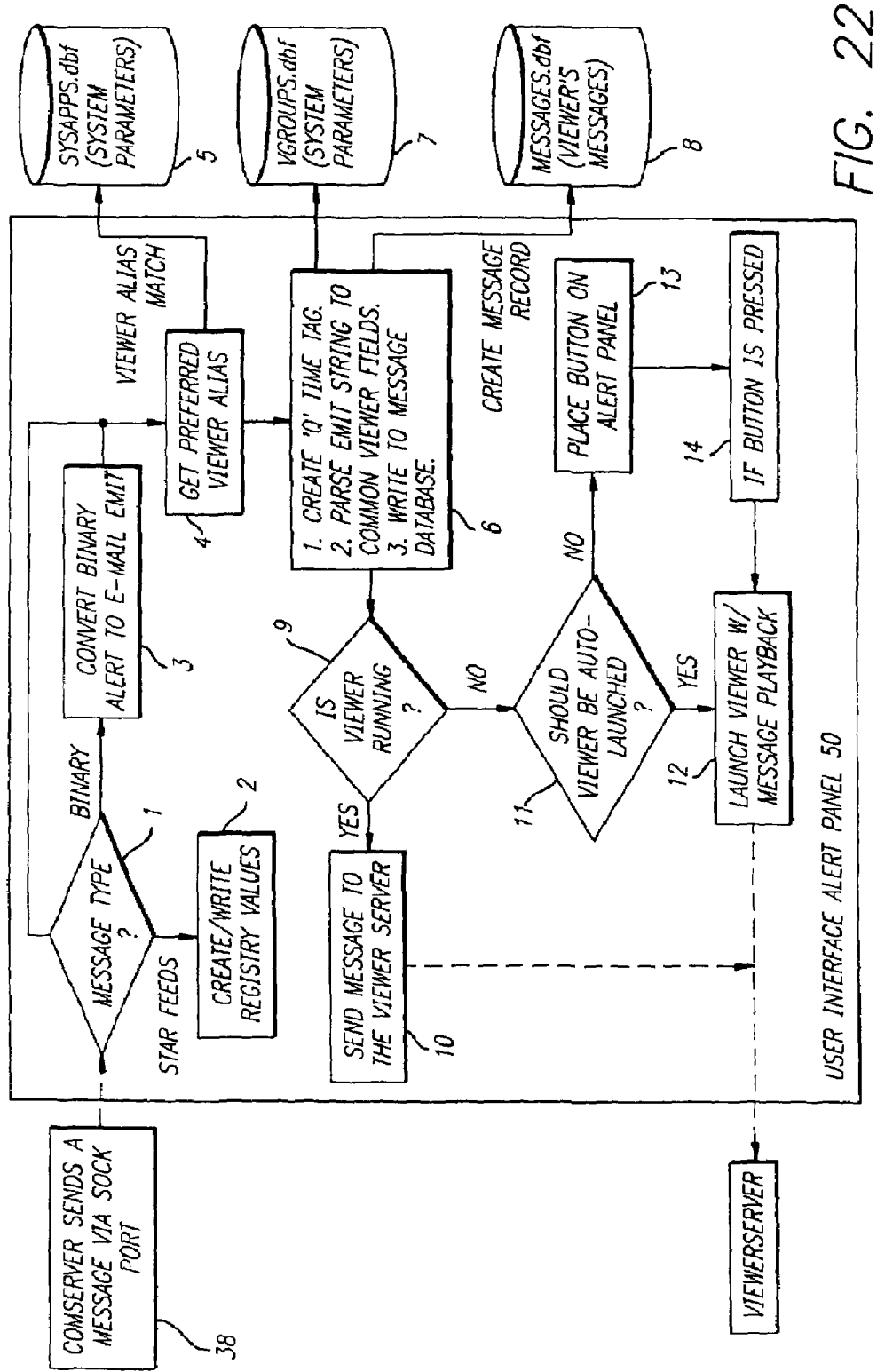
FIG. 22 is a flow chart of the algorithm for implementing process EMIT messages procedure for the user interface alert panel.

FIG. 22 is a flow chart of the algorithm for implementing process EMIT messages procedure for the user interface alert panel 50. A message or feed from the communications server 38 via the winsock port is initially applied to the user interface alert panel 50. In step 1, the user interface alert panel 50 determines what feed type is present, i.e. whether the message is a binary, star or EMIT type feed.

A typical binary type feed is an E-mail message. The binary feed is, as discussed in detail below, decompressed into a common EMIT feed and processed as a normal feed.

A typical EMIT type feed involves common user information such as messages for football, scoreboard viewers, horoscope, lottery etc.

Figure 23:
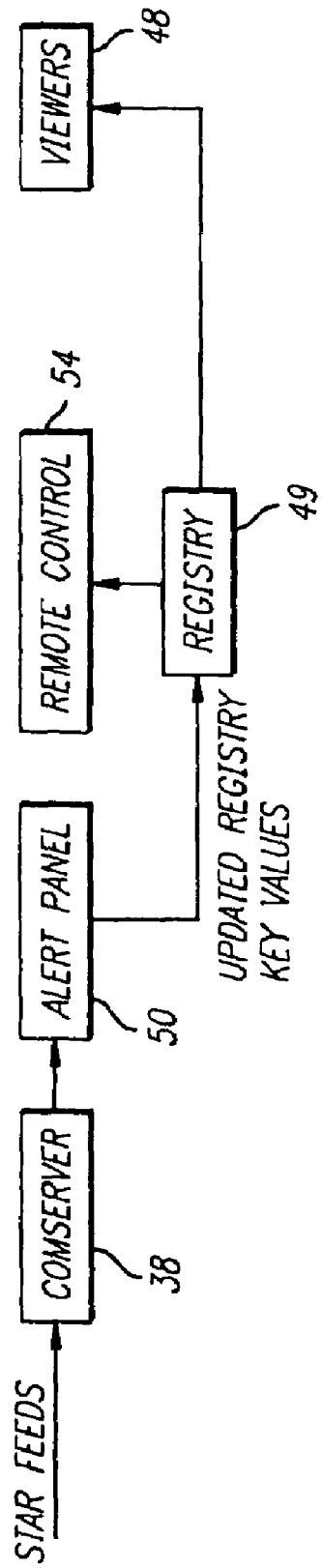
FIG. 23 is a block diagram illustrating how star feed messages are processed in accordance with the present invention.

A typical star type feed involves a registry value change which creates or updates the appropriate registry key(s). In many cases, a star feed involves a visual change to one of the viewers 48. For example, a star feed will create/write registry values to reflect a change in advertisement on a particular viewer 48 (step 2). Star feeds are thus special feeds in that they can change register keys which point to bitmap files, source names, URL sources and so forth. In particular, referring to FIG. 23, star feeds are received by the communications server 38 and passed to the user interface alert panel 50 for processing. The registry values updated by star feeds are read by other components and the changes programmed by the star feeds are then put into effect. In operation, the user interface alert panel 50 first determines if a message is a star feed by checking the message tag to determine if it contains the star feed indicator, preferably "*=". It then parses the star feed extracting the component code and the registry key values to be updated. The updated key values are then written to the registry 49 where they are accessed by other components, such as the remote control 54 and the viewers 48. The basic structure of a star feed message is shown as follows: [0170] FEED_TAG_V=COMPONENT_CODE_P= REGISTRY_KEY_VALUES where [0171] FEED_TAG=the message tag code ("*=" for star feeds) [0172] COMPONENT_CODE=a two letter code indicating to which component the star feed applies (e.g., BB for baseball viewer, RC for remote control, etc.) [0173] REGISTRY_KEY VALUES=one or more sequences of the following parameters for the specified component: registry key, full file path name flag (0 or 1) if the key value contains a file name, and the registry key value. In a typical example, bitmaps for the Internet-baseball score button are changed as well as the URL for the source: [0174]*=. about.V=BB.about.P=Ad1;0;shared\bmps\SprtNet.bmp|TVB;0;shared\bmps\SprtNetU.bmp|Adb;0; shared\bmps\SprtNet.bmp|ADB;0;shared\b-mps\SprtNet U.bmp{cube root}Ad1U;2;http://www.sportsnetwork.com: 80 In the example, new bitmap files SprtNetU.bmp, SprtNet-.bmp and new URL http://www.sportsnetwork.com are added to the registry settings for the Baseball viewer. Where a new bitmap or other file name is specified in a star feed, the new file will have been previously received from the wireless broadcast network by the communications server 38 via the binary file transfer capability. This process is transparent to the user.

If in step 1, it is determined that the feed is a binary type feed, the binary feed is converted to a common EMIT string format (step 3). When the message is in the EMIT string format, a record is added to the message database by first determining the preferred viewer for the feed (step 4) and then by parsing out the EMIT string to common viewer fields (step 6).

In particular, to determine the preferred viewer for the feed (step 4), a filter field from the SYSAPPS table is compared to the EMIT string (step 5). In a typical configuration, approximately thirty viewers 48 are available and the user interface alert panel 50 determines which viewer 48 will be able to read the information. The preferred viewer is the actual icon which will fly up to the user interface alert panel 50. To obtain a viewer alias match, the user interface alert panel 50 obtains the necessary information by looking at the systems applications (SYSAPPS) table or database. By comparing a filter field from the SYSAPPS database to the EMIT string, the user interface alert panel 50 determines which viewer 48 is the preferred viewer and which viewer 48 should fly up to the user interface alert panel 50. For example, for a football related message, the filter fields from the SYSAPPS database would be reviewed against the football related message to determine the viewer alias match.

In accordance with the present invention, level tags further define the EMIT message so when the comparison is executed in SYSAPPS table, it can be determined which feed is for which viewer (level tag 1 5). A typical sample preferred filtering string is as follows: [0178] 1=N,2=N,N=*,R!=*, 1=N,2=N,h=*,R!=* Under the sample preferred filtering string, the level tags are 1=N, 2=N. By comparing 1=N, 2=N against the sample EMIT feed, it knows that this is a news marquee feed.

After a viewer alias match is achieved, a "Q" time flag or time flag reflecting the local time at which the message arrived at a user is created (step 6). The EMIT string is then parsed into common viewer fields and written to a message database 51 (step 8). The common fields include but are not limited to level tags, data and time, titles, source and content.

In the VGROUPS, there is a description for each viewer—a text typed out in a particular field. If you put the mouse over one of the buttons on the alert panel, on the bottom, it will say what this is. That description is pulled from VGROUPS (step 8).

After the EMIT feed is recorded to the message database 51 (step 8), the message is broadcast to the preferred viewer via the viewer server (steps 9 14). Initially, it is determined whether the viewer is running (step 9). If the viewer is running, e.g. football viewer is already running, the message is sent directly to the viewer server (step 10).

If the viewer is not running, it is determined whether the viewer should be auto launched (step 11). If auto-launch has been turned on for this viewer, then the viewer with message playback is launched. For example, for a football type feed, the viewer preferences are reviewed and if the user is setup for automatic launch of football, the football viewer with message playback is launched (step 12).

If the preferred viewer is not running, the fly-in sequence comprising a) creating a fly-in animation object, b) playing a viewer specific wave file, c) animating a button on the user interface alert panel 50, and d) placing a static button on the user interface alert panel 50, is initiated (step 13). In particular, a fly-in animation object is initially created. The fly-in animation object is an actual icon shown flying in from the opposite edge to the user interface alert panel 50. In accordance with an advantage of the present invention, fly-ins alert the user that new data is available for viewing. Fly-ins are small windows displaying animated graphics representing a particular message type, e.g. E-mail, which moves from the bottom right part of the user display screen to the user interface alert panel 50 whenever a new message of that particular type is received. If the user interface alert panel 50 is in a floating state, then the fly-in animation objects flies in from a random edge. At the same time the fly-in occurs, a viewer specific sound wave file is initiated. A button is then animated on the user interface alert panel 50. Finally, a static button which the user can press to launch the viewer is placed on the user interface alert panel 50 (step 13) and when depressed (step 14), will launch a viewer with message playback (step 12). For example, for a football feed, a fly-in animation object in the form of a football lands on top of the user interface alert panel 50, a trumpet will play followed by a button animated on the alert panel 50, which typically spins around and finally a static button appears on the alert panel 50. Fly-in graphic and default sound effects reflect message type. For example, for a golf feed, a golf tournament fly-in includes an image of a golf ball and the sound of a golf ball falling into a cup.

When the static button on the user interface alert panel is pressed (step 13), the viewer with message playback option is launched (step 12). The message is sent to the viewer server 20 which is the actual application which physically launches the viewer 48.

(iii) Timely Events.

The user interface alert panel will periodically and automatically perform the following functions: (1) check messages that require a mark for deletion, (2) check for valid service plans, (3) check for delayed broadcasts, and (4) implement fly-in graphics for new messages, each of which is described in detail below.

(1) Check Messages that Require a Mark for Detection.

Each viewer has an entry in the SYSAPPS table that specifies the lifetime of the messages. A comparison is made to the message database and if a record needs to be marked for deletion, an "X" is placed in the MSG_READ field. In a preferred embodiment, this function is performed every 24 hours. The user interface alert panel 50 will decide, based on the information in the SYSAPPS table, how long a message should be kept for a particular viewer 48. For example, for a football viewer, if it is only desirable to see messages 2 days old, the user interface alert panel 50 will check against that field and when 2 days has transpired, proceed to mark those records for deletion.

(2) Check for Valid Service Plans.

The user interface alert panel 50 will also periodically check for valid service plans. Service plans typically dictate what kinds of feeds are available to a user. All valid plans are recorded in the registry so that other modules can read the information. The service plan checking preferably occurs at initialization and every 5 minutes thereafter. The user is also prompted with "plan expiration reminders."

(3) Check for Delayed Broadcasts.

The user interface panel 50 also checks for delayed broadcasts which allow messages to be submitted for future broadcast. If a date and time has arrived for a delayed message, the MSG_READ field will be changed from "B" to "N" and a button will be placed on the user interface alert panel 50. Delayed broadcasts are preferably checked every five minutes. The user interface panel 50 thus checks every 5 minutes for special records that need to be shown to the user and then will change a particular field in the message database—the "B" to "N" so that next time it will not rebroadcast the same message again.

(4) Implement Fly-In Graphics Means for New Messages.

The user interface alert panel 50 performs fly-in graphics for new messages received from the communications server 38 if this option has been selected by the user.

e. Viewer Server.

Referring to FIG. 10, the viewer server 20 provides the means by which other components can initiate the execution of viewers 48 to display messages received from the broadcast network. This includes launching a particular viewer 48 upon command, parsing messages, and providing data extracted from the messages to the viewers 48 for display. The viewer server 20 also acts as the interface between the viewers 48 and the messages data base 51. Functionality of the viewer server 20 is accessed through the Viewer Server Applications Programming Interface (VSAPI).

Figure 24B:
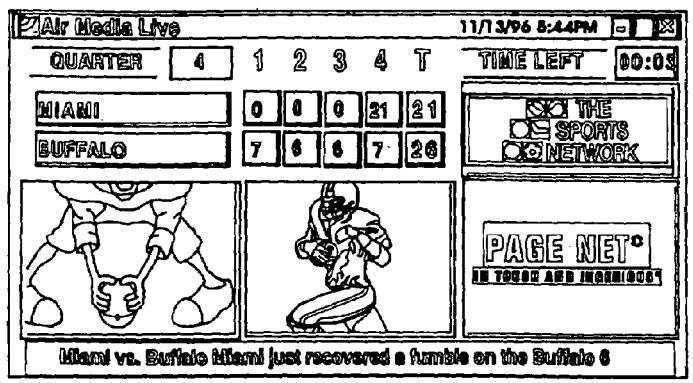
FIG. 24(b) is a depiction of a football viewer.
Figure 24C:
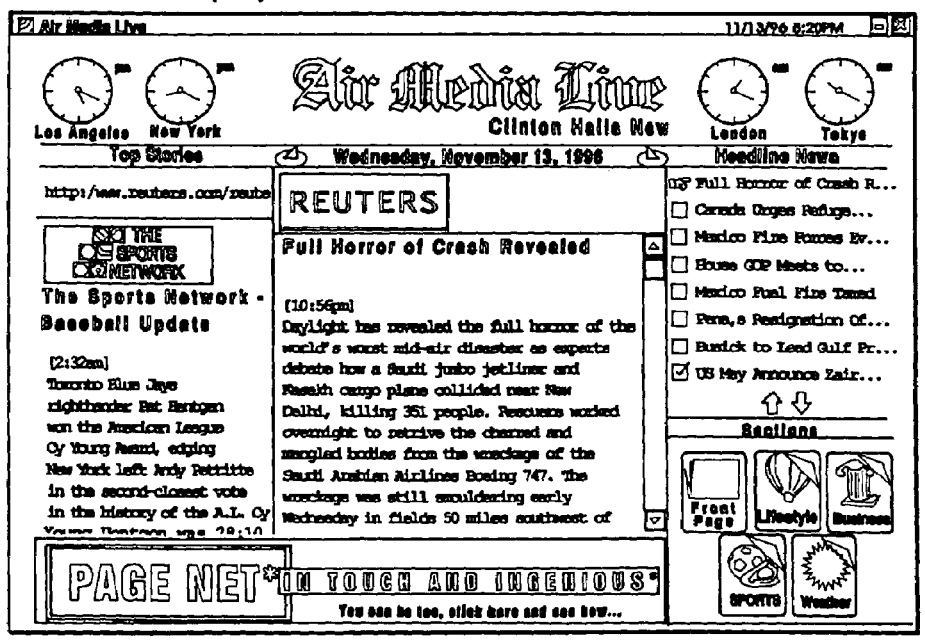
FIG. 24(c) is a depiction of a newspaper viewer.
Figure 24D:
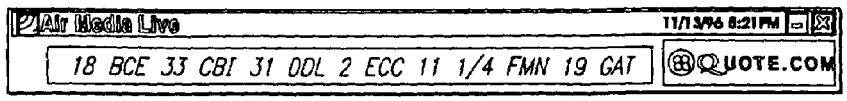
FIG. 24(d) is a depiction of a stock ticker viewer.

The viewer server 20 serves the global control preferences across all viewers and allows common controls to be shared by viewers requiring similar functions. In accordance with the present invention, three different classes of user interface are present. One class, the viewer class, views a particular type of information, such as baseball or electronic mail. A second class, the viewer controller, is able to start and stop the other class, the viewers class. For example, in operation, the viewer controller resembles a remote control and enables a user to turn the viewers on and off. By utilizing the remote control, a user can thus automatically bring up a baseball viewer and baseball information will be automatically displayed in that viewer. For illustrative purposes, FIGS. 24 (*a*), (*b*), (*c*) and (*d*) are depictions of a market scoreboard viewer, a football viewer, a newspaper viewer and stock ticker viewer, respectively.

In particular, in accordance with the feed format of the present invention, information is broken into logical information categories at the central broadcast server 34 end which matches viewers 48 which exist on the user end. The viewer server 20 ties into the viewers 48 so that an actual feed, such as an electronic mail notification feed, baseball sports feed or headline feed, is established. In accordance with the present invention, the data at the server end is classified into various formats to be able to indicate what type of a feed is present. This is accomplished by placing tags in front of various words that break it up into a type of information, such as a headline story, electronic mail story, financial story, and the like. This is the basis of the EMIT format which was described previously.

When this data arrives on the user side, the viewer server 20 reads the message including the codes and determines what type of message is being sent. Thus a viewer that is capable of displaying baseball information only receives baseball information.

In accordance with an alternative embodiment of the invention, another viewer controller which enables both incoming information as well as past information to be viewed can be utilized. Thus, for example, a user can bring up a baseball game that occurred earlier in the day. In operation, the viewer controller talks to the viewer server 20 and indicates that it wants to bring up a particular viewer. The viewer server 20 then activates and launches that particular viewer.

Preference viewers enable each of the viewers in a common user interface to show any preference information it has. The preferences viewers can be programmed to provide various kinds of information. For example, the preferences viewer can be directed to information relating to baseball teams. Another preferences viewer can be directed to stock market information. The preferences viewer can be further programmed to provide indication of events which are currently happening. For example, if the price of a stock, such as IBM, goes above a certain amount, such as $100.00 per share, a stock market crawl viewer will come up to the foreground immediately and flash a red light.

f. Remote Control.

The remote control 54, as shown in FIG. 7, provides a user interface for opening, closing and controlling viewers (viewer management), for maintenance of user settings and preferences, and for viewing the latest broadcast network news. It also maintains a message history log which allows the user to view previously received messages. Viewer control functions include mute, pause and volume level control for the viewer audio device. The remote control 54 is launched through the user interface alert panel 50.

g. Viewers.

Viewers 18, opened through the user interface alert panel 50 or remote control 54, are the means by which data received from the broadcast network is displayed to the user. There are separate viewers for each of the different types of information provided over the network. Viewers 48 are capable of reading and displaying various message formats and contain preferences governing viewer actions. Viewers generally include, but are not limited, to graphics, data, sound files, and launch icons.

When each of the viewers 48 is installed, it goes through a registration process with the viewer server 20 and the viewer server 20 stores entries in the database that keep track of each of the viewers by way of the viewer table. A filtering means is provided for each viewer for filtering particular types of messages a viewer can look at. For example, a baseball viewer who wants to look at messages relating to baseball information has two filtering means-one for saving information in a database and another filter for indicating that this is the type of information that should immediately be brought up to the viewer. Thus, if a viewer is interested in Dodger baseball games, such games would instantly be brought up by the second filter. Moreover, if a viewer desires to save all of the games in the national league, the filter for saving such information would be implemented h. User Preferences Dynamic Link Library DLL).

The User Preferences Dynamic Link Library (DLL) 53 allows the user to precisely specify what information is to be displayed by the Viewers 48 and how this information will be displayed and enters various related information, such as, the name of the user's Internet browser and activation codes for activating service plans. For example, the user can select the teams for which baseball or football scores will be shown, the sources of news stories, and the speed at which text is scrolled in Marquee type viewers. The User Preferences DLL 53 is accessed via the remote control 54 or through any open viewer 48.

i. Address Reprogramming and Activation Code Parsing DLL

Figure 11:
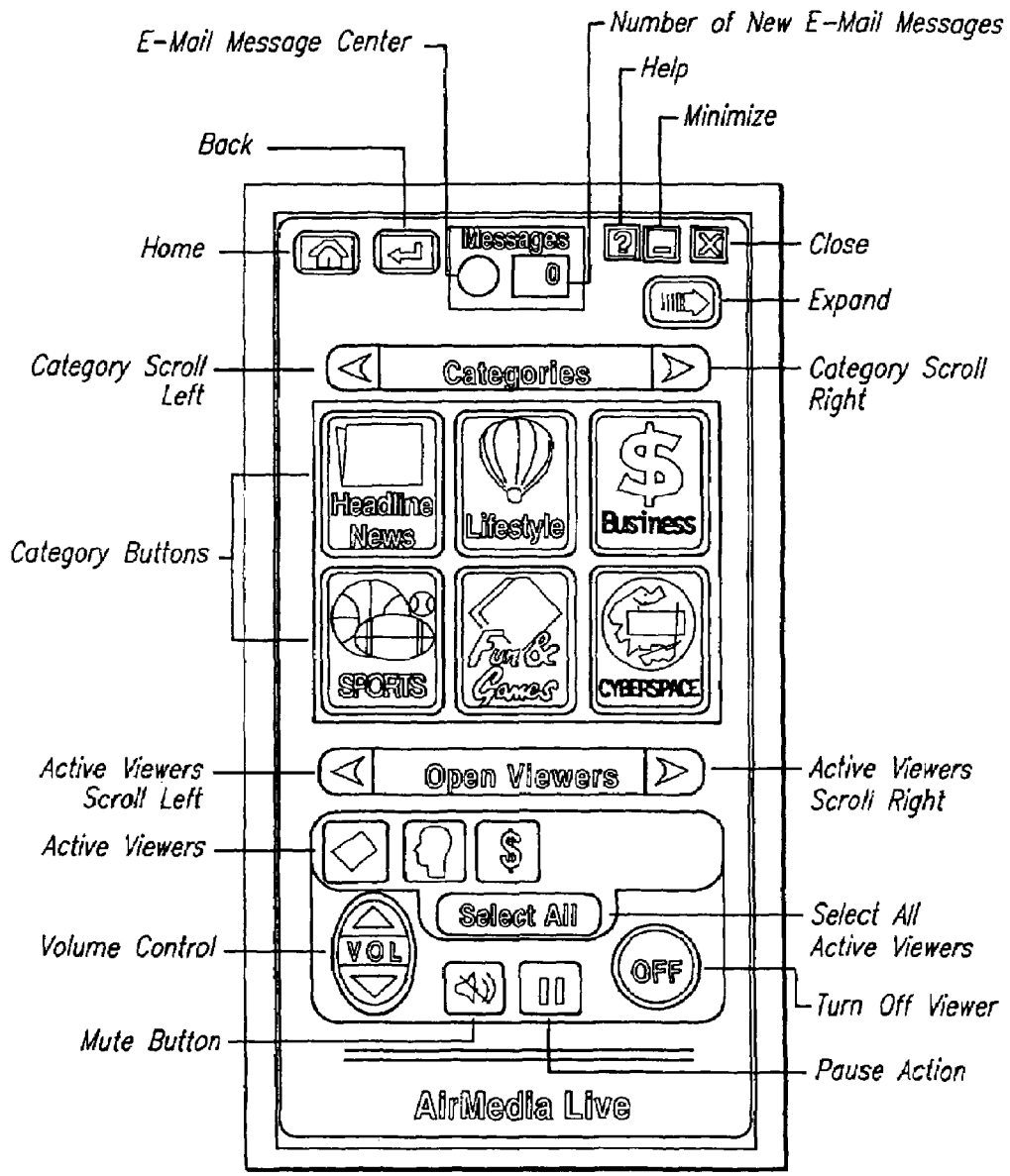
FIG. 11 is an illustration of a user remote interface for controlling the computer interface in accordance with the present invention.

The address reprogramming and activation code parsing DLL 57 parses and validates service plan activation codes received over the wireless broadcast network or entered by the user and address reprogramming messages received over the network. Activation codes and address reprogramming messages control what broadcast network messages the user is allowed to receive. The code parsing DLL is used by the communications server 38, remote control 54 (FIG. 11) and user preferences DLL 53.

j. Error Logging.

Error Logging 55 provides a means by which all other components can record the occurrence of errors or potential problem conditions in a log file. The error log can be a valuable aid to technical support in diagnosing problems a user may encounter in running software: The log file is preferably in ASCII text format and can be viewed by any word processor or text editor, such as, Microsoft Word or Notepad.

k. Operation of Received Message Data Flow.

In operation, when a new message is received from the broadcast network, the communications server 38 receives a new data block from the wireless device 42 via the driver 44 and wireless interface 46. Depending on the data block type, the communications server 38 either processes it locally or passes it to the user interface alert panel 50. The user interface alert panel 50 receives a data block from the communications server 38, stores it in the messages data base 51, displays an icon for the particular message type and generates a fly-in or other means for notification such as an audio and/or visual alert for the new message if that option is selected by the user. If the user clicks on the icon for the new message, the user interface alert panel 50 sends a command to the viewer server 20 to open the appropriate viewer 48 to display the contents of the message. Alternatively, a viewer 48 to display the new message can be launched through the remote control 54. Upon receiving the command to open a viewer 48, the viewer server 20 parses the message, launches the viewer 48 and passes to it the data to be displayed. The viewer 48 displays the message data received from the viewer server 20 and commands the viewer server 20 to mark the message as "read" in the data base. At any step in the process, if an error condition is detected, it is recorded in the error log 55.

l. E-mail Alerts.

Figure 13:
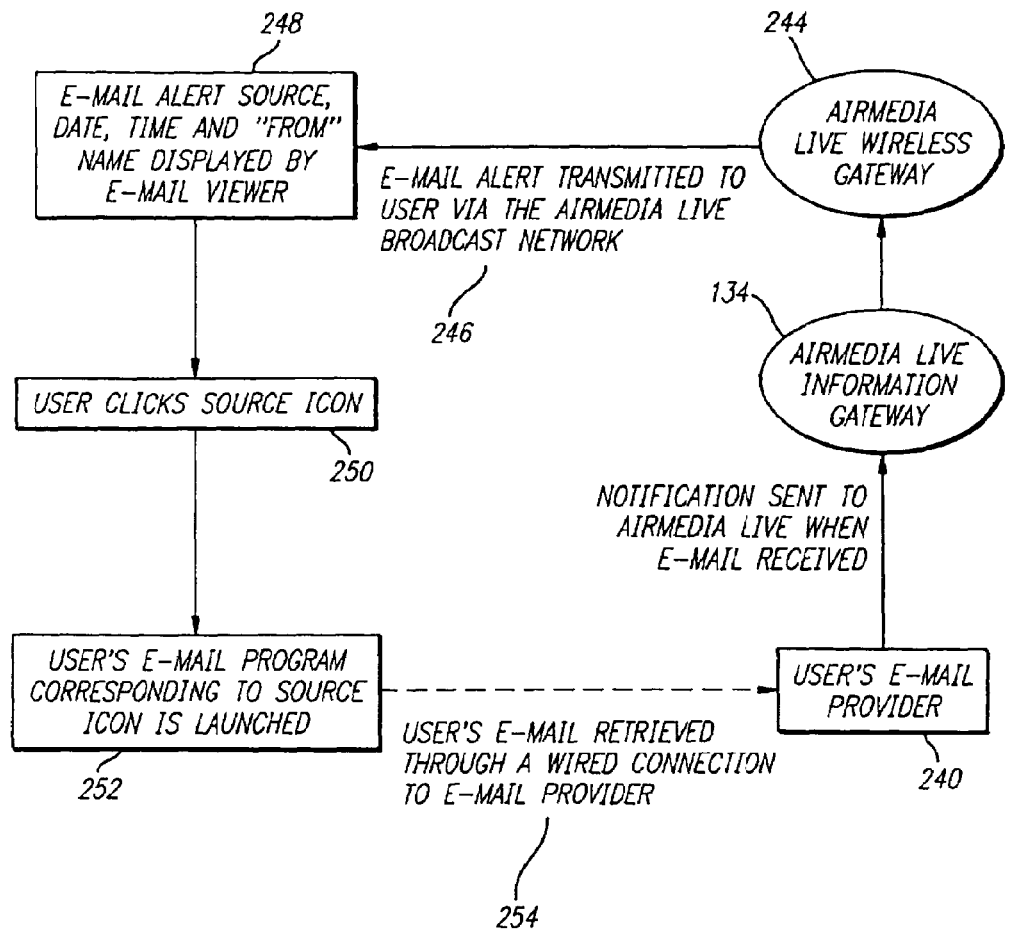
FIG. 13 is a flow chart of an algorithm for generating and processing E-mail alerts in accordance with the present invention.

FIG. 13 is a flow chart of an algorithm for generating and processing E-mail alerts in accordance with the present invention. In accordance with the present invention, a user may be instantly notified of E-mail messages without being connected to an E-mail service provider. Referring to FIG. 13, when a user receives an E-mail message (step 240), the user's provider sends an E-mail notification to central broadcast server (step 244). Upon receiving this notification, the central broadcast server transmits an E-mail alert message to the user's computer through the broadcast network (step 246). When the alert message is received by the software application in the user's computer, an animated visual and/or audio notification is triggered, or the e-mail viewer automatically pops up, depending on the mode of operation selected by the user (step 248). In the first case, an E-mail alert icon appears on the alert panel and the E-mail viewer can be launched in the same manner as viewers for news alerts (i.e. by clicking the icon or through the remote control). An E-mail alert contains the provider ID code number and the "From" name (E-mail address of the sender). One skilled in the art will recognize that the alert is not limited to the provider ID code number and name. Rather, the E-mail alert could include a header, whole message etc. The E-mail viewer displays an icon corresponding to the provider ID, the date and time the alert was received, and the sender's E-mail address. To read an E-mail message, the user simply clicks the associated icon (step 250) which causes the E-mail program for the particular provider to be launched (step 252). The user's E-mail can then be retrieved through a wired connection to the E-mail provider (step 254). One skilled in the art will recognize that E-mail alerts may be received from more than one source. For example, a user may receive an E-mail alert from an Internet E-mail provider and America On-Line or CompuServe.

User Wireless On-Line Guide.

In accordance with the present invention, a wirelessly transmitted on-line guide provides a detailed schedule of when certain information, such as upcoming events, forums and chat sessions, will be transmitted. With ongoing wireless broadcasts, the information in the on-line guide is maintained up-to-date. In particular, the on-line guide can notify a user just before an event is about to happen on the Internet, therefore eliminating the need to manually keep track of upcoming events. The user indicates which events are important, and the on-line guide reminds the user via an alarm including a visual and sound alert of the events at a predetermined time, such as minutes, before each occurs. The user can then click on the event and a connection to the event's location on the Internet is made through the user's standard Internet browser and Internet service provider. Alternatively, a user can specify that a connection to the event location via the user's Internet browser and Internet service provider be made automatically when the selected event is about to occur.

URL Broadcast and Hot Links.

Referring to FIG. 1, the URL broadcast and hot links 22 back to the information source 12 is shown. In accordance with the present invention, very short notification centric messages such as news headlines from information sources 12, such as Internet, on-line services and other information providers, are transmitted to the computer 14 by wireless transmission. A user, from a computer 14, can make a wired connection 24 back to the information source 12 to obtain more detailed information. In accordance with the present invention, attached to each of the notification centric messages is a universal resource locator (URL) code 22 as well as related Internet address information. This allows the user, by clicking on an icon that is embedded in the message, to make a wired or wireless connection 24, either through a modem, TC/IP or LAN-type connection, and automatically establish a link back to the information source 12. The user can thus go directly to the specific site that the information came from. In a typical example, the specific site can be ten pages deep. Thus, in accordance with an advantage of the present invention, information sources 12 such as the Internet and other on-line services, which are typically overwhelming particularly with respect to locating a story, are easily accessible. The present invention allows a user to pinpoint and locate the specific information the user was alerted to. The user can thus hit one button which establishes the connection 24 and takes the user directly to the location where the information is located.

Figure 12:
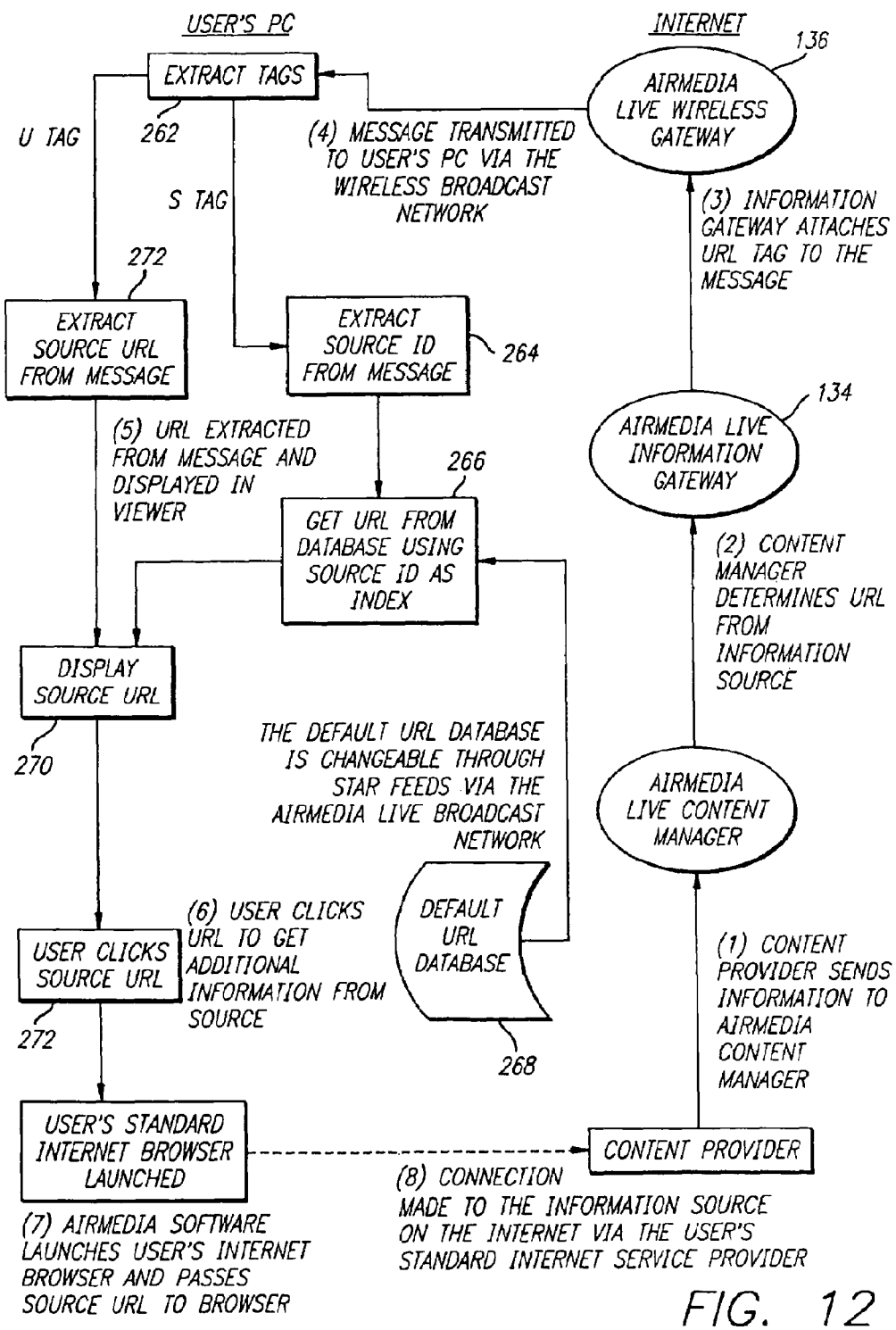
FIG. 12 is a flow chart of an algorithm for extracting and processing the Internet source URL for messages broadcast over the wireless communication network illustrated in FIG. 1.

FIG. 12 is a flow chart of an algorithm for extracting and processing the Internet source URL for messages broadcast over the wireless communication network illustrated in FIG. 1. In accordance with the present invention, the Internet source for a news item alert is broadcast as part of the alert message itself (step 260). The message contains a number of tags delineating the various parts of the message. In the preferred embodiment, tags "S=" and "U=" identify the Internet source where detailed information about the news alert may be found. For those messages which always originate from the same list of default sources, the "S" tag only applies (step 264). Following the "S=" tag is a letter code corresponding to the Internet URL. For example, the letter code for an alert from the Reuters News Service is "W". The actual URL, http://www.reuters.com, is obtained by using the letter code as an index into the alert source database of the present invention (step 266). URL's in the alert source database may be updated by Star Feed messages in case changes in the default URL's are necessary (step 268). For messages whose sources are not limited to a default set, the "U" tag conveys the Internet source (step 272). Following the "U=" tag is the actual URL source of the message (e.g. U=http://www.universalnews.com). Wireless throughput is conserved by transmitting the full URL only in those cases where the source is not restricted to being a member of a fixed set. The source URL is displayed at the end of the alert message text (step 270). A user with a wired or wireless connection to the Internet can go directly to the alert source simply by clicking the URL (step 270). A connection to the alert source on the Internet is thus provided.

Over the Air Programming.

Services received and various operational characteristics at the user end can be programmed by the central broadcast server 34 through the wireless broadcast network. This is accomplished primarily through Star Feeds and service activation/deactivation codes. Star Feeds, which have been described in detail above, are special messages which allow parameters controlling viewer operation to be modified from the central broadcast server 34. Activation/deactivation codes determine which services a user is allowed to receive. For example, if a user subscribes to e-mail alerts, this service can be turned on for that specific user through an e-mail alert activation code message transmitted to the user site via the wireless broadcast network. Conversely, if a user stops subscribing to a service, that service can be turned off through a deactivation code message. Additionally, the capability exists for binary file transfer from the central broadcast server 34 to add new executable files or replace existing ones with newer versions. In this way, new or updated viewers can be installed directly through the wireless broadcast network.

Billing and Activation Server.

Referring to FIG. 1, users may remotely request additional services or modify existing services from the personal computer 14 or other computing device through a billing and activation server 64 which communicates with the central broadcast server 34. By telephone or modem communication, a user can contact the billing and activation server 64 which in turn communicates with the central broadcast server 34. Once such a request has been processed by the central broadcast server 34, the server 34 wirelessly transmits an activation code directly to the message server 18 to activate additional or modify existing services. By matching the serial number contained in the broadcast message with the users serial number, the user software will program a receiver board in the user receiver 32 to begin receiving additional or modified services. Thus according to an advantage of the present invention, users can remotely adjust services from their personal computers 14 or other computing devices.

Simultaneous Wired Transmission.

In accordance with an alternate embodiment of the invention, the information provided from the information sources 12 and transmitted to the central broadcast server 34 to be consolidated in accordance with the present invention and then transmitted wirelessly nationwide to personal computers 14 and other computing devices as described in detail above can also be sent simultaneously via a wired connection to the same personal computers 14 and computing devices having Internet/World Wide Web access (direct or via on-line service providing Internet and World Wide Web access). In particular, the data processed at the central broadcast server 34, in addition to being transmitted wirelessly, is simultaneously placed on Web pages on the Internet. A user can thus connect to the Web via the Internet. In operation, to access data sent by the central broadcast server 34, a user makes a connection via the Internet to the World Wide Web server and delivers its URL request. The request is acknowledged by the Web server, which then sends the requested data to the user. Thus, a user can receive real time data/information in the form of voice, video data or a combination thereof by accessing the World Wide Web.

It will be appreciated by persons skilled in the art that the present invention is not limited to what has been shown and described hereinabove, nor the dimensions of sizes of the physical implementation described immediately above.

The invention claimed is:

1. A method for transmitting data to selected remote computing devices comprising:
    receiving data from one or more information providers, wherein each information provider comprises a provider of one or more related categories or subcategories of information;
    parsing the data by one or more parsers, wherein parsing comprises breaking or dividing the received data into components whose content or format can be analyzed, processed, or acted upon;
    building data blocks from the parsed data;
    assigning addresses to the data blocks;
    preparing the data blocks for transmission as messages to the selected remote computing devices;
    transmitting the messages to the selected remote computing devices and notifying the selected remote computing devices of receipt of the received data whether the selected remote computing devices are online or offline to the information providers of the received data.

2. The method of claim 1 comprising building data blocks and assigning addresses to the data blocks based on information in a subscriber database.

3. The method of claim 1 wherein at least some messages include an address for obtaining information from the information providers.

4. The method of claim 1 comprising sending at least one message which when activated on the selected remote computing devices allows display of data.

5. The method of claim 1 comprising transmitting messages to the selected remote computing devices to add, remove, modify or control viewers on the selected remote computing devices.

6. The method of claim 1 comprising transmitting first messages to the selected remote computing devices to trigger activation or cause modification of second messages on the selected remote computing devices.

7. The method of claim 1 comprising sending messages to the selected remote devices to activate other messages on the selected remote devices according to a schedule.

8. The method of claim 1 comprising transmitting messages to the selected remote computing devices to trigger activation of advertising or promotional messages on the selected remote computing devices.

9. The method of claim 1 comprising transmitting messages to the selected remote computing devices to activate or modify services to the selected remote computing devices.

10. The method of claim 9 comprising receiving requests from users for additional services or for modification of existing services, processing the requests, and transmitting messages to activate the additional services as requested or to modify the existing services.

11. The method of claim 10 comprising wireless or wired transmission of the activation and modification messages to the selected remote computing devices.

12. The method of claim 9 comprising transmitting the messages to activate or modify services in response to corresponding status of users' subscriptions.

13. The method of claim 1 comprising transmitting messages for causing a process or transaction on the selected remote computing devices to occur.

14. The method of claim 1 wherein the selected remote computing devices each comprise a computing device and a receiver in communication with the computing device.

15. The method of claim 14 wherein at least some of the receivers and the remote computing devices each are part of the same apparatus.

16. The method of claim 1 wherein the messages include addresses for the selected remote computing devices to obtain the received data.

17. The method of claim 1 comprising specifying priorities for the received data based upon categories, deciding which received data to reject, applying scheduling rules to determine when to transmit messages to the selected remote computing devices, determining formats for the messages, and determining which users of the selected remove devices should be sent messages.

18. The method of claim 1 comprising transmitting the messages to message servers for notifying appropriate viewers on the selected remote computing devices of incoming data for which the viewers are registered.

19. The method of claim 1 comprising receiving requests for additional services on the selected remote computing devices and automatically transmitting the additional services to the selected remote computing devices.

20. The method of claim 19 wherein the requests are received from computing devices other than the selected computing devices.

21. The method of claim 1 comprising receiving requests to modify services on the selected remote computing devices and automatically transmitting messages to the selected remote computing devices to modify the services.

22. The method of claim 1 comprising notifying the selected remote computing devices of receipt of the received data whether the selected remote computing devices are in an on state or an off state.

23. The method of claim 22 wherein the selected remote computing devices are in a powered off state when off, and in a powered on state when on.

24. The method of claim 22 wherein the selected remote computing devices are in a powered on state when off.

25. The method of claim 1 comprising wireless or wired transmission of messages to the selected remote computing devices.

26. The method of claim 1, wherein the categories include breaking headlines, financial information, arrival of new email, weather, sports, games and lotto.

27. The method of claim 1 wherein selected remote computing devices have viewers, and the viewers comprise application software for receiving and displaying information received from the information providers.

28. The method of claim 1 wherein a first server system performs the receiving, the parsing, the building, the assigning and the preparing; the method further comprising a billing and activation server communicating with the first server system with respect to services delivered to the selected remote computing devices.

29. The method of claim 1 wherein the selected remote computing devices are at least one of personal computers, general purpose computers, televisions, telephones, and appliances.

30. The method of claim 1 wherein the selected remote computing devices each have a least two viewers, and each viewer corresponds to a respective, different, specific information provider.

* * * * *